United States Patent
Wang et al.

(10) Patent No.: US 12,170,563 B2
(45) Date of Patent: Dec. 17, 2024

(54) BEAM INFORMATION DELIVERY FOR SCELL BEAM FAILURE RECOVERY OPERATION IN NR

(71) Applicant: Apple Inc., Cupertino, CA (US)

(72) Inventors: Guotong Wang, Santa Clara, CA (US); Yushu Zhang, Beijing (CN); Alexei Davydov, Santa Clara, CA (US); Gang Xiong, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 17/437,804

(22) PCT Filed: May 8, 2020

(86) PCT No.: PCT/US2020/032158
§ 371 (c)(1),
(2) Date: Sep. 9, 2021

(87) PCT Pub. No.: WO2020/231832
PCT Pub. Date: Nov. 19, 2020

(65) Prior Publication Data
US 2022/0149922 A1     May 12, 2022

Related U.S. Application Data

(60) Provisional application No. 62/846,354, filed on May 10, 2019.

(51) Int. Cl.
*H04W 76/19* (2018.01)
*H04B 7/06* (2006.01)
(Continued)

(52) U.S. Cl.
CPC ......... *H04B 7/0695* (2013.01); *H04B 7/0626* (2013.01); *H04B 7/088* (2013.01);
(Continued)

(58) Field of Classification Search
CPC .... H04B 7/0695; H04B 7/0626; H04B 7/088; H04L 5/0051; H04W 56/001; H04W 76/19; H04W 76/15; H04W 16/28
See application file for complete search history.

(56) References Cited

U.S. PATENT DOCUMENTS

| 8,526,389 B2 * | 9/2013 | Dinan | H04W 72/27 |
| | | | 455/425 |
| 10,893,431 B2 * | 1/2021 | Liou | H04W 16/28 |

(Continued)

FOREIGN PATENT DOCUMENTS

| CN | 109391409 | 2/2019 |
| WO | 2018232090 | 12/2018 |

(Continued)

OTHER PUBLICATIONS

Cirik et al. U.S. Appl. No. 62/824,717, filed Mar. 27, 2019 (Year: 2019).*

(Continued)

*Primary Examiner* — Wutchung Chu
(74) *Attorney, Agent, or Firm* — Kowert, Hood, Munyon, Rankin & Goetzel, P.C.

(57) ABSTRACT

Apparatuses, systems, and methods for providing beam information for secondary cell beam failure recovery in a wireless communication system. A wireless device and a cellular base station may establish a wireless link, according to which the wireless device may be configured to communicate using a primary cell and a secondary cell. The wireless device may detect beam failure on the secondary cell. The wireless device may send an indication of the beam failure recovery to the cellular base station. The wireless device may receive information configuring candidate transmit beam reference signals for performing beam recovery on the secondary cell. The wireless device may perform beam
(Continued)

identification and report on any new transmit beam(s) identified by the wireless device.

20 Claims, 21 Drawing Sheets

(51) Int. Cl.
   *H04B 7/08*    (2006.01)
   *H04L 5/00*    (2006.01)
   *H04W 56/00*   (2009.01)
(52) U.S. Cl.
   CPC ......... *H04L 5/0051* (2013.01); *H04W 56/001* (2013.01); *H04W 76/19* (2018.02)

(56) References Cited

U.S. PATENT DOCUMENTS

| | | | |
|---|---|---|---|
| 11,089,530 B2* | 8/2021 | Zhou | H04W 36/0058 |
| 11,419,173 B2* | 8/2022 | Deenoo | H04W 76/16 |
| 2020/0221429 A1* | 7/2020 | Li | H04L 5/0053 |
| 2020/0260300 A1* | 8/2020 | Cirik | H04W 24/08 |
| 2020/0266876 A1* | 8/2020 | Yu | H04W 80/02 |
| 2020/0350973 A1* | 11/2020 | Cirik | H04W 74/0833 |
| 2021/0058130 A1* | 2/2021 | Zhu | H04W 72/23 |
| 2021/0068162 A1* | 3/2021 | Agiwal | H04L 5/0023 |
| 2021/0153245 A1* | 5/2021 | Tooher | H04W 74/006 |
| 2022/0070053 A1* | 3/2022 | Matsumura | H04W 72/21 |
| 2022/0103226 A1* | 3/2022 | Huang | H04B 7/0695 |
| 2022/0131591 A1* | 4/2022 | Huang | H04B 7/0695 |
| 2022/0158714 A1* | 5/2022 | Matsumura | H04W 76/19 |
| 2022/0217592 A1* | 7/2022 | Cirik | H04W 36/0079 |
| 2023/0113362 A1* | 4/2023 | Song | H04B 7/0695 370/329 |

FOREIGN PATENT DOCUMENTS

| | | | | |
|---|---|---|---|---|
| WO | 2019032882 A1 | 2/2019 | | |
| WO | 2019033072 A1 | 2/2019 | | |
| WO | WO-2020231832 A1 * | 11/2020 | ........... | H04B 7/0626 |

OTHER PUBLICATIONS

Mediatek Inc., "Summary on Remaing Issues on Beam Failure Recovery"; 3GPP TSG RAN WG1, Meeting #92; R1-1803362; Athens, Greece; Feb. 2018; 26 pgs.

Qualcomm Incorporated, "Beam Recovery Procedures"; 3GPP TSG RAN WG1, Meeting #92; R1-1802824; Athens, Greece; Feb. 2018; 11 pgs.

International Search Report and Written Opinion for International Application No. PCT/US2020/032158; mailed Jul. 13. 2020; 14 pgs.

Office Action for CN Patent Application No. 2020800346376; Mar. 1, 2024.

Mediatek Inc "Summary 2 on Remaing issues on Beam Failure Recovery"; 3GPP TSG RAN WG1 Meeting #92 R1-1803441; Feb. 26, 2018.

* cited by examiner

```
-- ASN1START
-- TAG-BEAMFAILURERECOVERYCONFIG-START

BeamFailureRecoveryConfig ::=        SEQUENCE {
    rootSequenceIndex-BFR            INTEGER (0..137)
OPTIONAL, -- Need M
    rach-ConfigBFR                   RACH-ConfigGeneric
OPTIONAL, -- Need M
    rsrp-ThresholdSSB                RSRP-Range
OPTIONAL, -- Need M
    candidateBeamRSList              SEQUENCE (SIZE(1..maxNrofCandidateBeams)) OF
PRACH-ResourceDedicatedBFR   OPTIONAL, -- Need M
    ssb-perRACH-Occasion             ENUMERATED {oneEighth, oneFourth, oneHalf, one,
                                                 two, four, eight, sixteen}
OPTIONAL, -- Need M
    ra-ssb-OccasionMaskIndex         INTEGER (0..15)
OPTIONAL, -- Need M
    recoverySearchSpaceId            SearchSpaceId
OPTIONAL, -- Need R
    ra-Prioritization                RA-Prioritization
OPTIONAL, -- Need R
    beamFailureRecoveryTimer         ENUMERATED {ms10, ms20, ms40, ms60, ms80, ms100,
ms150, ms200}        OPTIONAL, -- Need M
    ....
    [[
    msg1-SubcarrierSpacing-v1530     SubcarrierSpacing
OPTIONAL -- Need M
    ]]
}

PRACH-ResourceDedicatedBFR ::=        CHOICE {
    ssb                              BFR-SSB-Resource,
    csi-RS                           BFR-CSIRS-Resource
}

BFR-SSB-Resource ::=                  SEQUENCE {
    ssb                              SSB-Index,
    ra-PreambleIndex                 INTEGER (0..63),
    ...
}

BFR-CSIRS-Resource ::=                SEQUENCE {
    csi-RS                           NZP-CSI-RS-ResourceId,
    ra-OccasionList                  SEQUENCE (SIZE(1..maxRA-OccasionsPerCSIRS)) OF
INTEGER (0..maxRA-Occasions-1)    OPTIONAL,  -- Need R
    ra-PreambleIndex                 INTEGER (0..63)
OPTIONAL,  -- Need R
    ...
}

-- TAG-BEAMFAILURERECOVERYCONFIG-STOP
-- ASN1STOP
```

*FIG. 8*

| Attribute | Value for BLER |
|---|---|
| DCI format | 1-0 |
| Number of control OFDM symbols | Same as the number of symbols of RMSI CORESET |
| Aggregation level (CCE) | 8 |
| Ratio of hypothetical PDCCH RE energy to average SSS RE energy | 0dB |
| Ratio of hypothetical PDCCH DMRS energy to average SSS RE energy | 0dB |
| Bandwidth (MHz) | Same as the number of PRBs of RMSI CORESET |
| Sub-carrier spacing (kHz) | Same as the SCS of RMSI CORESET |
| DMRS precoder granularity | REG bundle size |
| REG bundle size | 6 |
| CP length | Same as the CP length of RMSI CORESET |
| Mapping from REG to CCE | Distributed |

FIG. 11

| Attribute | Value for BLER |
| --- | --- |
| DCI format | 1-0 |
| Number of control OFDM symbols | Same as the number of symbols of CORESET QCLed with respective CSI-RS for BFD |
| Aggregation level (CCE) | 8 |
| Ratio of hypothetical PDCCH RE energy to average CSI-RS RE energy | 0dB |
| Ratio of hypothetical PDCCH DMRS energy to average CSI-RS RE energy | 0dB |
| Bandwidth (MHz) | Same as the number of PRBs of CORESET QCLed with respective CSI-RS for BFD |
| Sub-carrier spacing (kHz) | Same as the SCS of CORESET QCLed with respective CSI-RS for BFD |
| DMRS precoder granularity | REG bundle size |
| REG bundle size | 6 |
| CP length | Same as the CP length of CORESET QCLed with respective CSI-RS for BFD |
| Mapping from REG to CCE | Distributed |

FIG. 12

| Configuration | $T_{Evaluate\_BFD\_SSB}$ (ms) |
|---|---|
| non-DRX | $max([50], ceil(5*P)*T_{SSB})$ |
| DRX cycle ≤ 320ms | $max([50], ceil(7.5*P)*max(T_{DRX}, T_{SSB}))$ |
| DRX cycle > 320ms | $ceil(5*P)*T_{DRX}$ |
| Note: $T_{SSB}$ is the periodicity of SSB in the set $\bar{q}_0$. $T_{DRX}$ is the DRX cycle length. | |

FIG. 13

| Configuration | $T_{Evaluate\_BFD\_SSB}$ (ms) |
|---|---|
| non-DRX | $max([50], ceil(5*P*N)*T_{SSB})$ |
| DRX cycle ≤ 320ms | $max([50], ceil(7.5*P*N)*max(T_{DRX}, T_{SSB}))$ |
| DRX cycle > 320ms | $ceil(5*P*N)*T_{DRX}$ |
| Note: $T_{SSB}$ is the periodicity of SSB in the set $\bar{q}_0$. $T_{DRX}$ is the DRX cycle length. | |

FIG. 14

| Configuration | $T_{Evaluate\_BFD\_CSI-RS}$ (ms) |
|---|---|
| non-DRX | $max([50], [M_{BFD} *P] * T_{CSI-RS})$ |
| DRX cycle ≤ 320ms | $max([50], [1.5 \times M_{BFD} *P]*max(T_{DRX}, T_{CSI-RS}))$ |
| DRX cycle > 320ms | $[M_{BFD} *P] * T_{DRX}$ |

Note: $T_{CSI-RS}$ is the periodicity of CSI-RS resource in the set $\bar{q}_0$.
$T_{DRX}$ is the DRX cycle length.

FIG. 15

| Configuration | $T_{Evaluate\_BFD\_CSI-RS}$ (ms) |
|---|---|
| non-DRX | $max([50], [M_{BFD} *P*N] * T_{CSI-RS})$ |
| DRX cycle ≤ 320ms | $max([50], [1.5 \times M_{BFD} *P*N]*max(T_{DRX}, T_{CSI-RS}))$ |
| DRX cycle > 320ms | $[M_{BFD} *P*N] * T_{DRX}$ |

Note: $T_{CSI-RS}$ is the periodicity of CSI-RS resource in the set $\bar{q}_0$.
$T_{DRX}$ is the DRX cycle length.

FIG. 16

BEAM INFORMATION DELIVERY FOR SCELL BEAM FAILURE RECOVERY OPERATION IN NR

PRIORITY INFORMATION

This application is a U.S. National Stage application of International Application No. PCT/US2020/032158, filed May 8, 2020, titled "BEAM INFORMATION DELIVERY FOR SCELL BEAM FAILURE RECOVERY OPERATION IN NR", which claims priority to U.S. provisional patent application Ser. No. 62/846,354, entitled "BEAM INFORMATION DELIVERY FOR SCELL BEAM FAILURE RECOVERY OPERATION IN NR," filed May 10, 2019, all of which are hereby incorporated by reference in their entirety as though fully and completely set forth herein.

FIELD

The present application relates to wireless devices, and more particularly to apparatus, systems, and methods for providing beam information for secondary cell beam failure recovery in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for providing beam information for secondary cell beam failure recovery in a wireless communication system.

According to the techniques described herein, a wireless device that has established a cellular link including being configured using a primary cell and a secondary cell may detect beam failure on the secondary cell. The wireless device may report the beam failure, and may be configured with candidate transmit beam reference signal resources to use to attempt to perform beam failure recovery for the secondary cell in response to reporting the beam failure. The wireless device may perform beam identification using the configured resources and report on any new transmit beams identified.

The candidate transmit beam reference signal resources may be configured in such a way that the wireless device is able to distinguish a reference signal type of each of the reference signal resources. For example, it may be the case that a list of candidate transmit beam reference signal resources that includes only one type of reference signal resources is provided, and an indication of a type of reference signal resources associated with the list may also be provided. As another possibility, multiple lists may be provided, each of which includes only one type of reference signal resources, and an indication of which type of reference signal resources is associated with which list may also be provided. As a further possibility, a list of candidate transmit beam reference signal resources that includes multiple types of reference signal resources could be provided, such that the wireless device is able to distinguish which candidate transmit beam reference signal resource is associated with which type of reference signal.

Additionally, the wireless device may report on any new transmit beam(s) identified by the wireless device in such a way that the serving cellular base station for the wireless device is able to identify the reference signal type(s) of the new transmit beam(s). For example, the wireless device could provide an indication of a new transmit beam, which could indicate from which list of multiple lists (and thus which type of reference signal resource, e.g., if each list is associated with only one reference signal type) of candidate transmit beam reference signal resources the new transmit beam is identified. As another possibility, the indication of the new transmit beam could include a candidate beam resource indicator for identifying which candidate transmit beam reference signal resource is associated with the new transmit beam. As a further possibility, the indication of the new transmit beam could include a reference signal indicator and an indicator of reference signal type for the new transmit beam. As a still further possibility, the indication of the new transmit beam could be provided using a resource configured to indicate a reference signal type associated with the new transmit beam.

The techniques described herein may be implemented in and/or used with a number of different types of devices, including but not limited to unmanned aerial vehicles (UAVs), unmanned aerial controllers (UACs), cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 8 illustrates aspects of a possible BeamFailureRecoveryConfig Information Element, according to some embodiments;

FIGS. 11-12 are tables illustrating examples of possible physical downlink control channel transmission parameters for SSB- and CSI-RS-based beam failure detection, according to some embodiments;

FIGS. 13-14 are tables illustrating examples of possible evaluation periods for performing SSB based beam failure detection in FR1 and FR2, according to some embodiments;

FIGS. 15-16 are tables illustrating examples of possible evaluation periods for performing CSI-RS based beam failure detection in FR1 and FR2, according to some embodiments;

Figure 1:
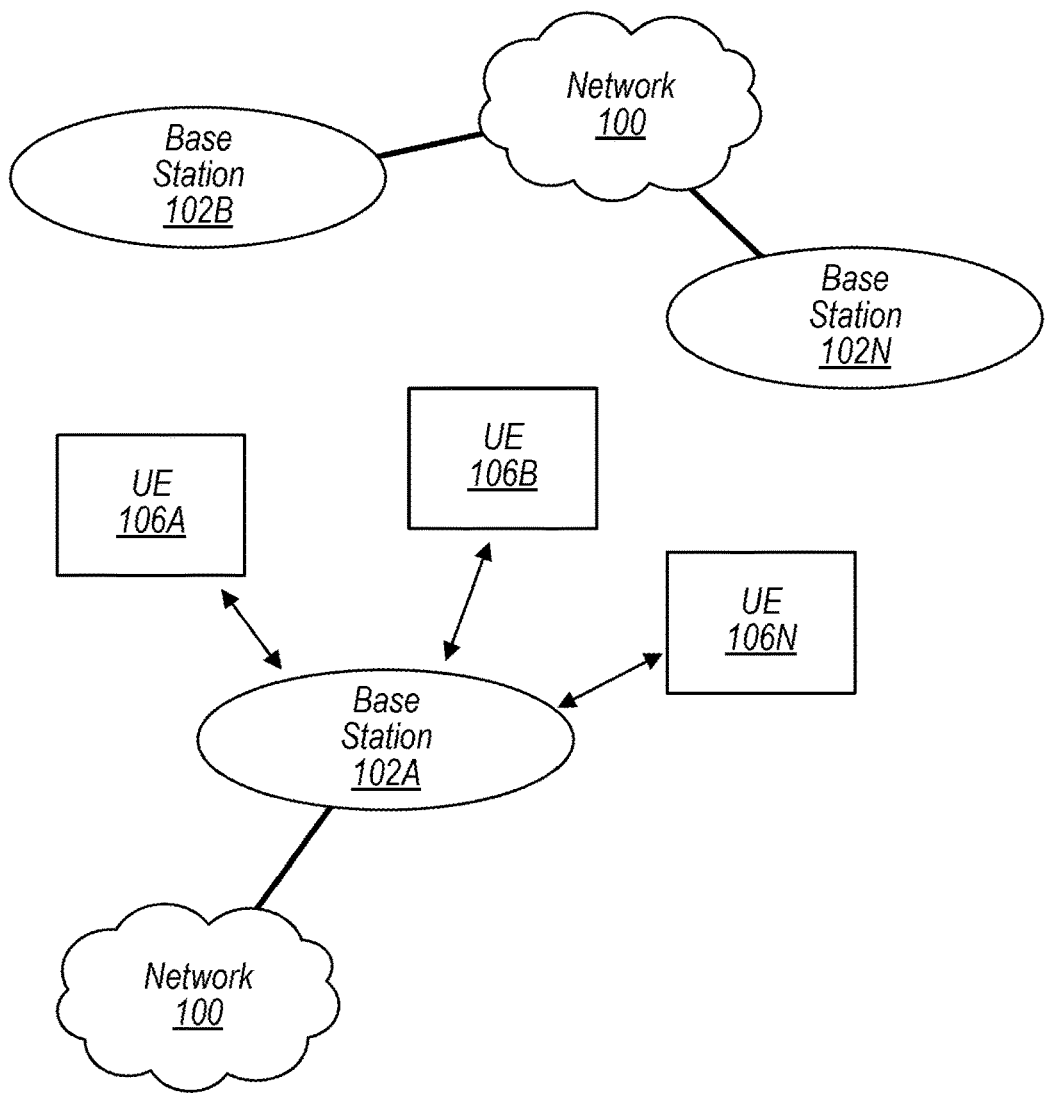
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
4G: Fourth Generation
5G: Fifth Generation
Rel: Release
NW: Network
RF: Radio Frequency
UE: User Equipment
BS: Base Station
gNB: Next Generation NodeB
GSM: Global System for Mobile Communication
UMTS: Universal Mobile Telecommunication System
LTE: Long Term Evolution
NR: New Radio
NR-U: NR Unlicensed
RAT: Radio Access Technology
TX: Transmission/Transmit
RX: Reception/Receive
UL: Uplink
DL: Downlink
CORESET: Control Resource Set
LBT: Listen Before Talk
MCOT: Maximum Channel Occupancy Time
CWS: Contention Window Size
HARQ: Hybrid Automatic Repeat Request
ACK: Acknowledgement
NACK: Negative Acknowledgement Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation.

As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
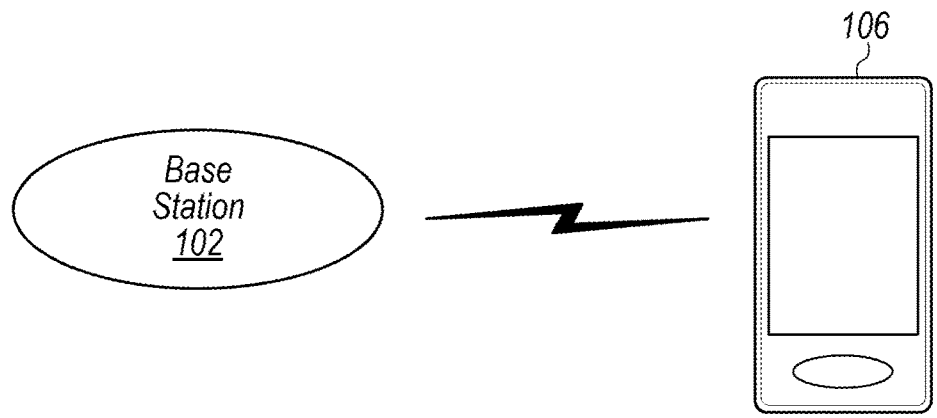
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, an unmanned aerial vehicle (UAV), an unmanned aerial controllers (UAC), an automobile, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
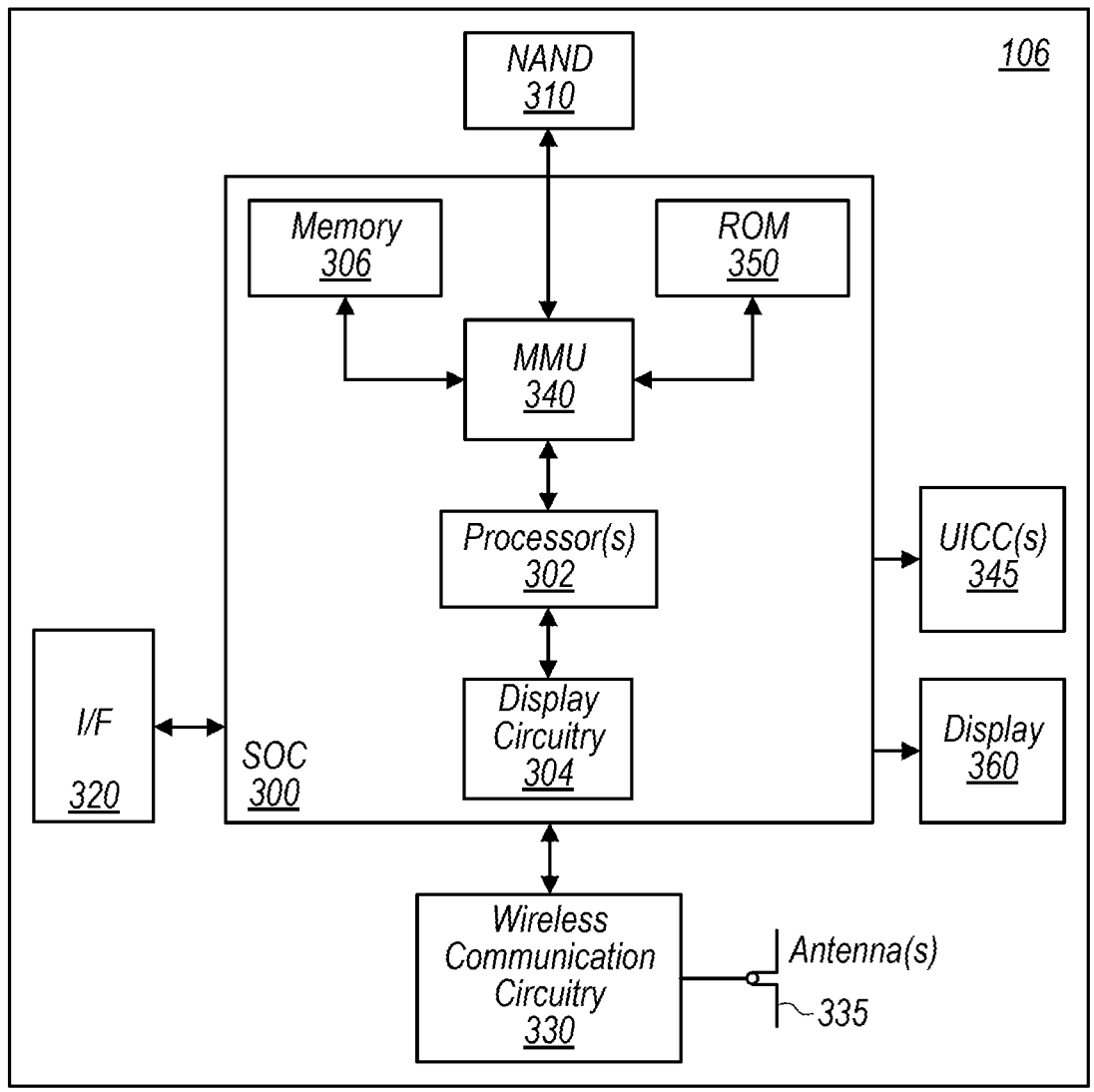
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
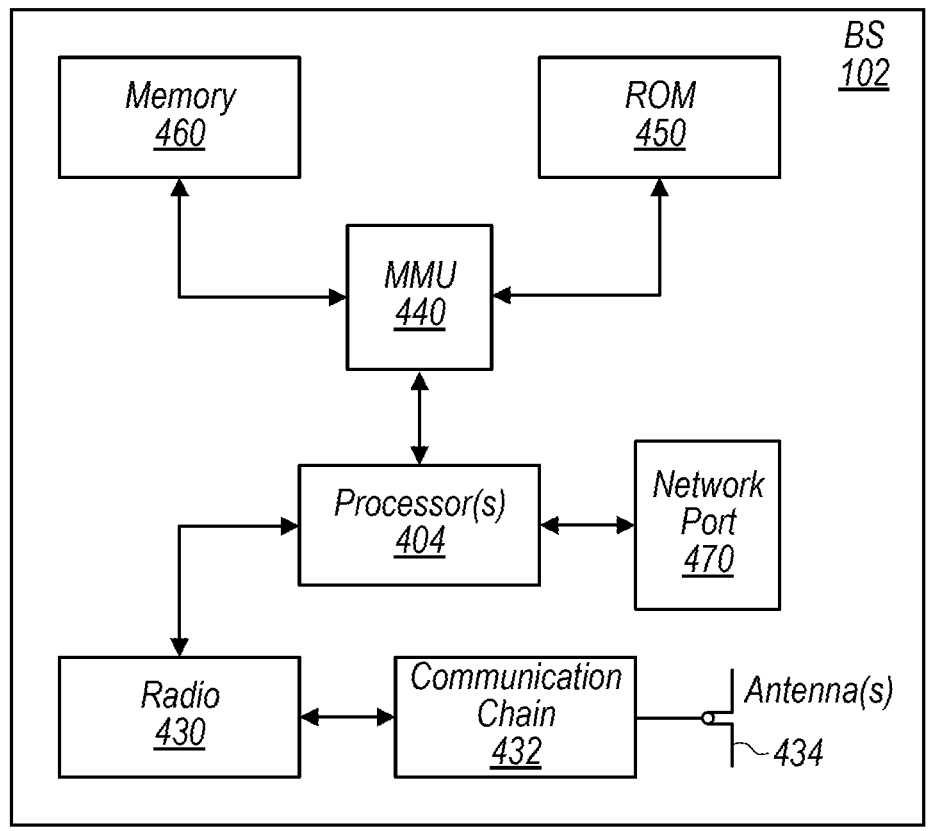
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
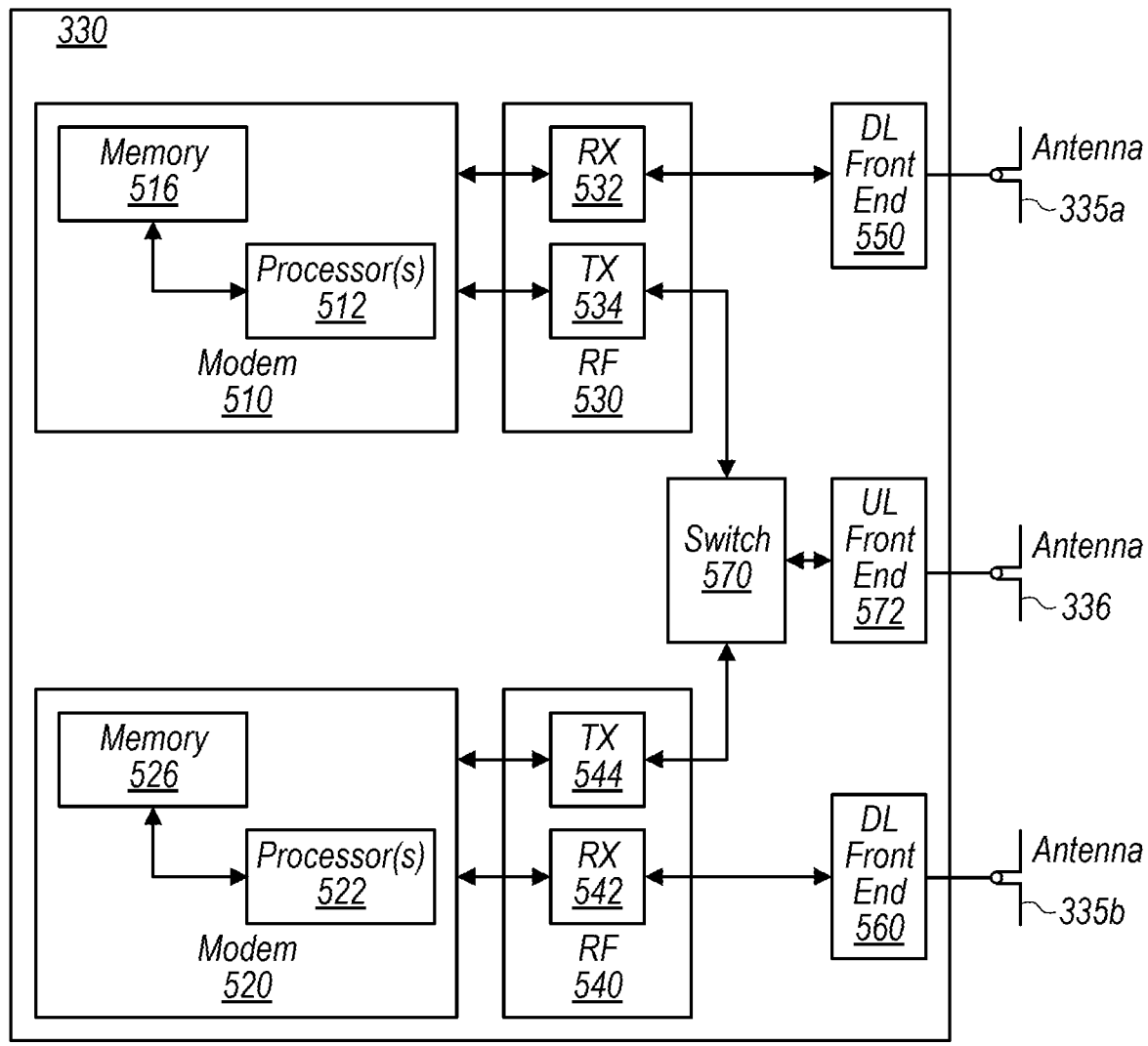
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
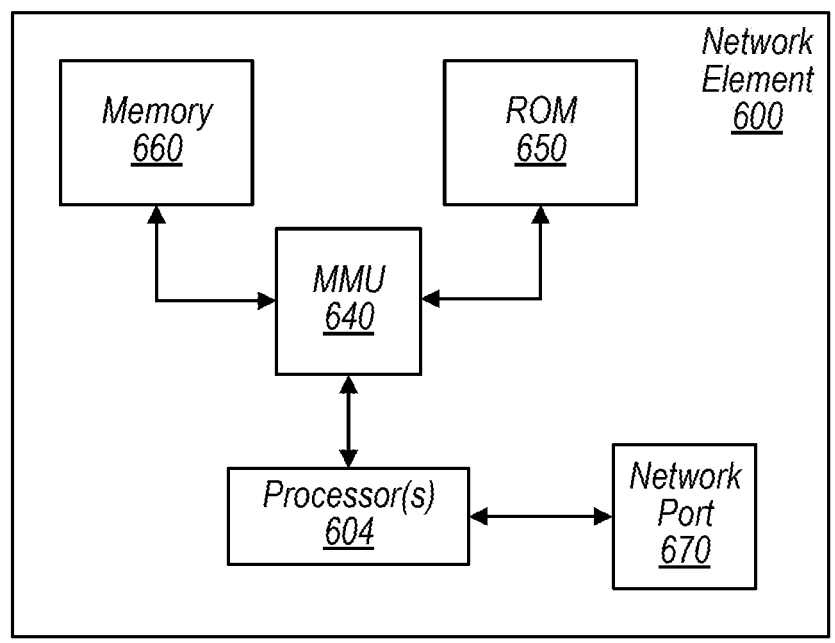
FIG. 6 illustrates an example block diagram of a network element, according to some embodiments.

FIG. 6—Exemplary Block Diagram of a Network Element

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
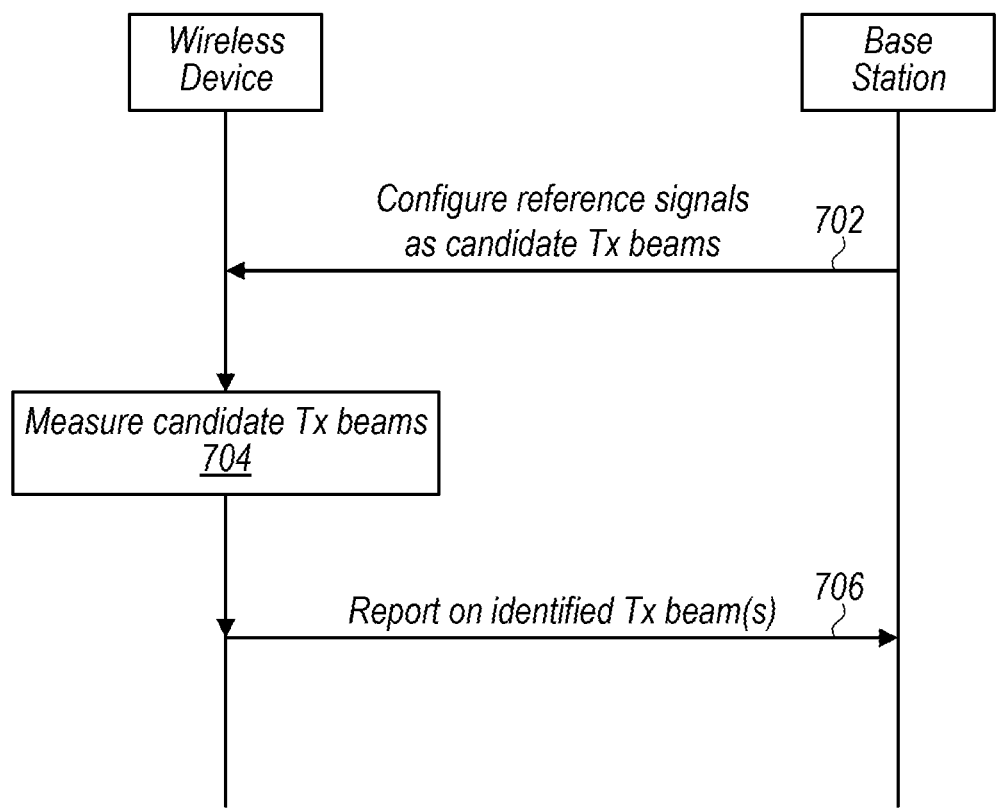
FIG. 7 is a communication flow diagram illustrating aspects of an example method for providing beam information for secondary cell beam failure recovery in a wireless communication system; according to some embodiments.

FIG. 7—Beam Information for Secondary Cell Beam Failure Recovery

New cellular communication techniques are continually under development, to increase coverage, to better serve the range of demands and use cases, and for a variety of other reasons. As new cellular communication technologies is developed and deployed, certain features may be included that are new or differ from previously developed and deployed cellular communication technologies.

Carrier aggregation and multiple connectivity communication techniques may include performing communication between a wireless device and a cellular network (e.g., via one or more cellular base stations) using multiple component carriers, potentially including the use of a primary cell and one or more secondary cells.

Additionally, at least some cellular communication techniques may utilize beamforming techniques, e.g., to improve the effective transmission range and power of transmitted signals. In order to support such beamforming based cellular communication, it may be important to perform beam management to select and maintain a good beam (or multiple beams) for performing cellular communication between a wireless device and a cellular base station (e.g., and potentially for each configured and active component carrier).

When beam failure occurs for a component carrier, it may accordingly be important to perform beam failure recovery, e.g., to identify a new transmit beam that can be used for the component carrier. When multiple component carriers are active and beam failure occurs on a secondary component carrier, it may be possible to utilize the primary component carrier to configure the beam failure recovery operation, e.g., including communicating regarding resources provided for attempting to identify a new transmit beam from a set of candidate transmit beams, and for reporting on any identified new transmit beam(s). However, at least in some instances, it may be possible that multiple types of reference signal resources can be configured as part of such beam failure recovery operation, which could potentially lead to ambiguity in the reporting of the new transmit beam(s) identified by a wireless device if a framework for handling such communications is not carefully designed. Accordingly, it may be useful to provide techniques for providing beam information for secondary cell beam failure recovery in a wireless communication system that support distinguishing between reference signal types when reporting on new transmit beam(s) identified by a wireless device for the secondary cell beam failure recovery.

FIG. 7 is a flowchart diagram illustrating an example of such a method for providing beam information for secondary cell beam failure recovery in a wireless communication system, at least according to some embodiments. Aspects of the method of FIG. 7 may be implemented by a wireless device such as a UE 106 illustrated in various of the Figures herein, a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may be configured to communicate with the cellular network via multiple component carriers, for example including a primary cell and a secondary cell. The wireless device may detect beam failure on the secondary cell, and may send an indication of the beam failure for the secondary cell to the cellular base station (e.g., via the primary cell).

In 702, the cellular base station may configure the wireless device with candidate transmit beam reference signal resources. In some instances, this may include providing a list (or multiple lists) of candidate transmit beam reference signal resources. As one possibility, each such list may include only one type of reference signal resources (e.g., only SSB resources, or only CSI-RS resources). In such a scenario, the cellular base station may be able to indicate to the wireless device which list to use to perform new transmit beam identification. This may help avoid ambiguity regarding which reference signal type is associated with the reported transmit beam by configuring the wireless device to perform the beam failure recovery using only one type of reference signal.

As another possibility, a list of candidate transmit beam reference signal resources that can include multiple types of reference signal resources (e.g., both SSB resources and CSI-RS resources) could be provided. In such a scenario, the wireless device may be configured to perform reporting on any new transmit beam(s) identified from the candidate transmit beam reference signal resources in such a manner as to facilitate the cellular base station being able to identify the reference signal type(s) of the new transmit beam(s).

In 704, the wireless device may perform measurements on the candidate transmit beam reference signal resources. The measurements could include reference signal received power (RSRP), reference signal received quality (RSRQ), signal to interference plus noise (SINR), and/or any of various other possible measurements, individually or in combination. Based on the measurements, the wireless device may perform beam identification, which may include identifying a new transmit beam, or possibly multiple new transmit beams, or determining that there is no new transmit beam identified among the candidate transmit beams. For example, the wireless device may be configured to select a beam (or multiple beams, e.g., up to a configured number) that most closely meets one or more specified criteria for new transmit beam identification. The specified criteria could include having a highest signal strength among the candidate transmit beams and also having a signal strength that is at least above a certain absolute signal strength threshold, as one possibility. Any number of other criteria (e.g., potentially using one or more metrics in addition or as alternatives to signal strength) may also or alternatively be used, according to various embodiments.

In 706, the wireless device may report on the identified transmit beam(s). This may include providing an indication of the identified transmit beam(s) that is configured to support the cellular base station being able to determine the candidate transmit beam reference signal resource associated with the identified transmit beam, including the type of reference signal of that candidate transmit beam reference signal resource.

For example, in some embodiments, the indication of the new transmit beam may include a reference signal resource indicator (RI), such as a synchronization signal block resource indicator (SSBRI) or channel state information reference signal resource indicator (CRI). In some instances, indication of the reference signal resource indicator alone may be sufficient to allow the cellular base station to identify the reference signal type, e.g., if the candidate transmit beam reference signal resources configured by the cellular base station were limited to being of only one reference signal type.

Alternatively, if multiple types of reference signal types are included in the candidate transmit beam reference signal resources configured by the cellular base station, the indication of the new transmit beam may include information sufficient to guarantee that both the cellular base station and the wireless device have the same understanding of which transmit being is being indicated by the wireless device.

For example, as one possibility, candidate beam resource indicators (CBRIs) may be defined for the candidate transmit beam reference signal resources configured by the cellular base station, and the indication of the new transmit beam may include a CBRI for the candidate transmit beam reference signal resource associated with the new transmit beam. Note that, at least in some instances, it may be possible that one of the defined CBRI values could be associated with no new transmit beam being identified by the wireless device, e.g., to provide a mechanism for the wireless device to report that the wireless device did not identify any new transmit beam from the candidate transmit beam reference signal resources configured by the cellular base station.

As another possibility, the indication of the new transmit beam may include a reference signal resource indicator (e.g., either a SSBRI or a CRI), as well as an indicator of a reference signal type associated with the new transmit beam (e.g., to indicate to the cellular base station whether the reference signal resource indicator is a SSBRI or a CRI).

As a still further possibility, the indication of the new transmit beam may include a reference signal resource indicator (e.g., either a SSBRI or a CRI), and may be transmitted using a resource configured to indicate a reference signal type associated with the new transmit beam. For example, one resource (e.g., a PUCCH or PRACH resource) could be configured for SSB based new beam identification, while another resource could be configured for CSI-RS based new beam identification.

As a still further possibility, it may be possible that multiple new transmit beams could be identified. Use of a specified resource to perform the reporting on the identified new transmit beam(s) may be one possible mechanism for indicating how many new transmit beams are being reported, in such a scenario. For example, one resource (e.g., a PUCCH or PRACH resource) could be configured for indicating that the wireless device has identified 1 new beam, another resource could be configured for indicating that the wireless device has identified 2 new beams, and so on.

The cellular base station may receive the indication(s) of the new transmit beam(s), and may determine to use the new transmit beam(s) for communicating with the wireless device via the secondary cell. Thus, the cellular base station and the wireless device may complete the beam failure recovery process, and may be able to resume communicating via the secondary cell using the new transmit beam(s).

Thus, using the techniques of FIG. 7, it may be possible to provide beam information for secondary cell beam failure recovery in a wireless communication system, in such a manner as to precisely identify a type of reference signal associated with a new transmit beam identified by a wireless device, at least according to some embodiments.

FIGS. 8-24 and Additional Information

FIGS. 8-24 illustrate further aspects that might be used in conjunction with the method of FIG. 7 if desired. It should be noted, however, that the exemplary details illustrated in and described with respect to FIGS. 8-24 are not intended to be limiting to the disclosure as a whole: numerous variations and alternatives to the details provided herein below are possible and should be considered within the scope of the disclosure.

In order to handle beam failure recovery (BFR) operation in NR Rel-15, it may be the case that the gNB configures a set of reference signal (RS) list(s), for example, synchronization signal (SS)/physical broadcast channel (PBCH) blocks (SSB) and/or channel state information reference signals (CSI-RS), for new candidate Tx beam identification. Each RS in the candidate beam list may be associated with a physical random access channel (PRACH) resource. When the UE (e.g., UE 1701 of FIG. 17) sends a BFR request (BFRQ) over PRACH, the new Tx beam information could be delivered implicitly to the gNB by the used PRACH resource. An example of a possible RRC configuration for the BFR in NR Rel-15 in which the parameter candidate-BeamRSList is configured for new beam identification is shown in FIG. 8. In particular, the BeamFailureRecovery-Config IE, as shown in FIG. 8, may be used to configure the UE with RACH resources and candidate beams for BFR in case of beam failure detection (BFD). See also 3GPP TS 38.321, clause 5.1.1. According to some embodiments, this information element may include some or all of the following fields.

BeamFailureRecoveryConfig field descriptions beamFailureRecoveryTimer
Timer for beam failure recovery timer. Upon expiration of the timer the UE does not use CFRA for BFR. Value in ms. Value ms10 corresponds to 10 ms, value ms20 corresponds to 20 ms, and so on.
candidateBeamRSList
A list of reference signals (CSI-RS and/or SSB) identifying the candidate beams for recovery and the associated RA parameters. The network configures these reference signals to be within the linked DL BWP (e.g., within the DL BWP with the same bwp-Id) of the UL BWP in which the BeamFailureRecoveryConfig is provided.
msg1-SubcarrierSpacing
Subcarrier spacing for contention free beam failure recovery. Only the values 15 kHz or 30 kHz (<6 GHz), 60 kHz or 120 kHz (>6 GHz) are applicable. See 3GPP TS 38.211, clause 5.3.2.
rsrp-ThresholdSSB
L1-RSRP threshold used for determining whether a candidate beam may be used by the UE to attempt contention free random access to recover from beam failure (see 3GPP TS 38.213, clause 6).
ra-prioritization
Parameters which apply for prioritized random access procedure for BFR (see 3GPP TS 38.321, clause 5.1.1).
ra-ssb-OccasionMaskIndex
Explicitly signalled PRACH Mask Index for RA Resource selection in 3GPP TS 38.321. The mask is valid for all SSB resources.
rach-ConfigBFR
Configuration of contention free random access occasions for BFR.
recoverySearchSpaceId
Search space to use for BFR RAR. The network configures this search space to be within the linked DL BWP (e.g., within the DL BWP with the same bwp-Id) of the UL BWP in which the BeamFailureRecoveryConfig is provided. The CORESET associated with the recovery search space cannot be associated with another search space. Network always configures this field when contention free random access resources for BFR are configured.
ssb-perRACH-Occasion
Number of SSBs per RACH occasion for CF-BFR, see 3GPP TS 38.213, clause 8.1.

BFR-CSIRS-Resource field descriptions csi-RS
The ID of a NZP-CSI-RS-Resource configured in the CSI-MeasConfig of this serving cell. This reference signal determines a candidate beam for beam failure recovery (BFR).
ra-OccasionList
RA occasions that the UE shall use when performing BFR upon selecting the candidate beam identified by this CSI-RS. The network ensures that the RA occasion indexes provided herein are also configured by prach-ConfigurationIndex and msg1-FDM. Each RACH occasion is sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots.
If the field is absent the UE uses the RA occasion associated with the SSB that is QCLed with this CSI-RS.
ra-PreambleIndex
The RA preamble index to use in the RA occasions associated with this CSI-RS. If the field is absent, the UE uses the preamble index associated with the SSB that is QCLed with this CSI-RS.

BFR-SSB-Resource field descriptions ra-PreambleIndex
The preamble index that the UE shall use when performing BFR upon selecting the candidate beams identified by this SSB.
ssb
The ID of an SSB transmitted by this serving cell. It determines a candidate beam for beam failure recovery (BFR).

For secondary cell (SCell) BFR operation in NR Rel-16, the BFRQ and new Tx beam information may be delivered via a primary cell (PCell). And there may be two approaches to delivering the new Tx beam information; one may include an uplink control information (UCI) or UCI-like approach, and the other may include a media access control (MAC) control element (CE) based approach. The new Tx beam could be based on SS/PBCH block (SSB) or CSI-RS. It may be the case that the gNB configures multiple SSB resources or CSI-RS resources for the candidate Tx beams. And it may be the case that the UE reports the SSB resource indicator (SSBRI) or CSI-RS resource indicator (CRI) to the gNB side to indicate the new Tx beam that has been identified.

However, one possible issue may include determining how to differentiate the CSI-RS beam or SSB beam in the new Tx beam information delivery. For example, if the gNB configures both SSB and CSI-RS for new Tx beam identification, it is possible that there could be some ambiguity regarding the new Tx beam information, potentially including whether the reported Tx beam is a SSB beam or a CSI-RS beam. Thus, it may be useful to introduce a scheme to guarantee that both the gNB and the UE have the same understanding on the delivered new Tx beam information.

Accordingly, the present disclosure provides such techniques, including various embodiments for SCell BFR operation in new radio (NR) systems.

Embodiments may include mechanisms to deliver a MAC CE based BFRQ, and transmission schemes for transmitting a gNB response to the BFRQ. Other embodiments may be described and/or claimed.

In order to differentiate the SSB and CSI-RS for new Tx beam, one possible approach may include putting some restriction(s) on the gNB configuration. For example, as one possibility, it may be the case that in the candidate-BeamRSList, only SSB or only CSI-RS could be configured.

In some embodiments, for SCell BFR, in the RRC configuration for new beam identification (e.g., candidate-BeamRSList) only SSB or only CSI-RS could be configured. If CSI-RS is configured, it may be the case that the UE reports CRI in the new Tx beam information delivered to gNB. If SSB is configured, it may be the case that the UE reportr SSBRI in the new Tx beam information delivered to gNB.

In some embodiments, the gNB may be able to configure multiple instances of a candidateBeamRSList, where each list can include either a group of SSB or a group of CSI-RS, and the corresponding list used for the UE to report new beam information can be indicated by DCI or MAC CE or RRC signaling.

Figure 9:
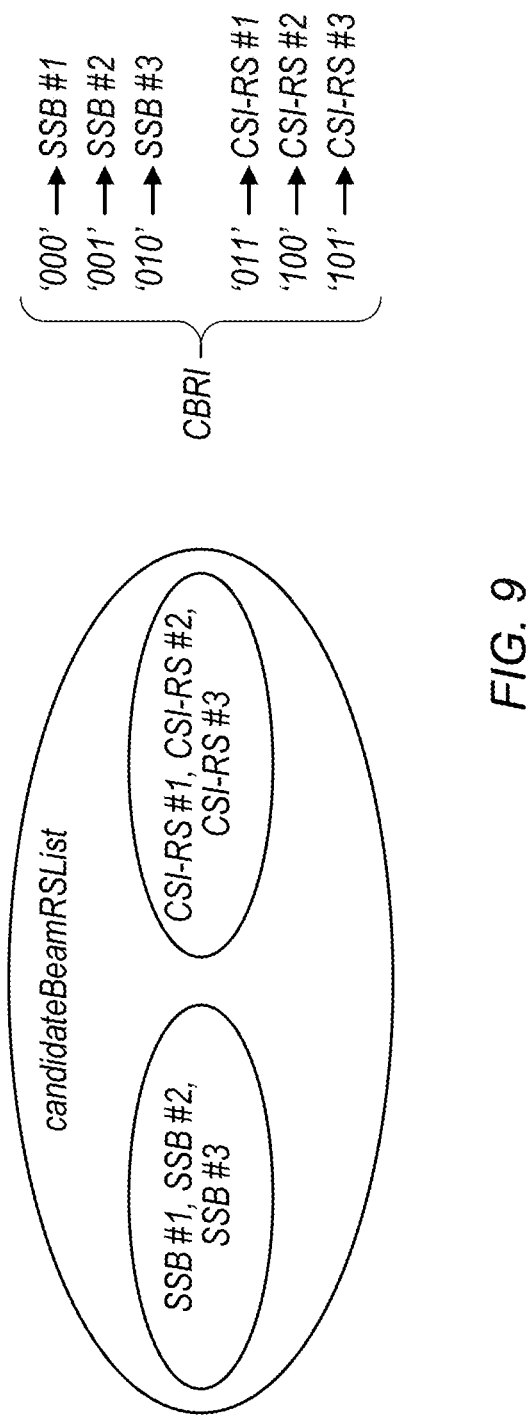
FIG. 9 illustrates aspects of a possible beam identification and reporting mechanism, according to some embodiments.

In some embodiments, for SCell BFR, in the RRC configuration for new beam identification (e.g., candidateBeamRSList), SSB and/or CSI-RS could be configured, and a candidate beam resource indicator (CBRI) may be defined to indicate one RS resource contained in the reference signal resource set provided by candidateBeamRSList including SSB and/or CSI-RS. In this embodiment, it may be the case that the UE reports the CBRI in the new Tx beam information delivered to the gNB (e.g., by UCI/UCI-like or MAC-CE). FIG. 9 shows example aspects of such an approach, according to some embodiments. As shown in FIG. 9, the candidate beam list could include 3 SSB and 3 CSI-RS. In such a scenario, it may be the case that the CBRI has 3 bits, e.g., to support reporting of any of the candidate beams. When UE cannot identify a new beam, a default CBRI value can be defined and considered to indicate "no new beam identified".

In another set of embodiments, for SCell BFR, in the RRC configuration for new beam identification (e.g., candidateBeamRSList), it may also be the case that SSB and/or CSI-RS could be configured. In this scenario, when the UE sends new Tx beam information over UCI/UCI-like or MAC CE, the new Tx beam information may include a one bit indicator plus the reference signal resource indicator. The reference signal resource indicator could be a SSBRI or CRI, while the one bit indicator may be used to indicate a type of the reference signal resource indicator (e.g., whether it is a SSBRI or a CRI).

In another set of embodiments, it may be the case that the UE can report whether the new beam is identified based on SSB or CSI-RS when delivering the beam failure event. In one example, one PUCCH/PRACH resource can be configured for SSB based new beam identification, and another PUCCH/PRACH resource can be used for CSI-RS based new beam identification. Then the UE can select one of them to report, thus implicitly indicating whether the new beam is identified based on SSB or CSI-RS.

In still another set of embodiments, for SCell BFR, the UE could report several new Tx beams information to the gNB (e.g., N Tx beams) over UCI/UCI-like or MAC-CE. The value of N could be configurable or pre-defined. In some instances, N could specifically be 1. Other values are also possible.

In another set of embodiments, the UE may be able to report the number of new beams to be reported when delivering the beam failure event. In one example, one PUCCH/PRACH resource can be used to indicate that UE identifies 1 new beam, another PUCCH/PRACH resource can be used to indicate that UE identifies 2 new beams, and so on.

Beam management may refer to a set of L1/L2 procedures to acquire and maintain a set of transmission/reception point(s) (TRP or TRxP) and/or UE beams that can be used for DL and UL transmission/reception. Beam management may include various operations or procedures, such as beam determination, beam management, beam reporting, and beam sweeping operations/procedures. Beam determination may refer to the ability of a TRxP(s) or UE to select its own Tx/Rx beam(s). Beam measurement may refer to the ability of a TRP or UE to measure characteristics of received beamformed signals. Beam reporting may refer to the ability of a UE to report information regarding beamformed signal(s), e.g., based on beam measurement. Beam sweeping may refer to the operation(s) of covering a spatial area, with beams transmitted and/or received during a time interval in a predetermined manner.

According to some embodiments, Tx/Rx beam correspondence at a TRxP may be considered to hold if at least one of the following conditions are satisfied: the TRxP is able to determine a TRxP Rx beam for the uplink reception based on the UE's downlink measurement on one or more of the TRxP's Tx beams; and the TRxP is able to determine a TRxP Tx beam for the downlink transmission based on the TRxP's uplink measurement on one or more of the TRxP's Rx beams. Similarly, it may be the case that Tx/Rx beam correspondence at a UE is considered to hold if at least one of the following is satisfied: the UE is able to determine a UE Tx beam for the uplink transmission based on the UE's downlink measurement on one or more of the UE's Rx beams; the UE is able to determine a UE Rx beam for the downlink reception based on the TRxP's indication based on uplink measurement on one or more of the UE's Tx beams; and Capability indication of UE beam correspondence related information to TRxP is supported.

In some implementations, DL beam management may include procedures P-1, P-2, and P-3. Procedure P-1 may be used to enable UE measurement on different TRxP Tx beams to support selection of TRxP Tx beams/UE Rx beam(s). For beamforming at a TRxP, procedure P-1 may typically include a intra/inter-TRxP Tx beam sweep from a set of different beams. For beamforming at the UE, procedure P-1 may typically include a UE Rx beam sweep from a set of different beams.

Procedure P-2 may be used to enable UE measurement on different TRxP Tx beams to possibly change inter/intra-TRxP Tx beam(s). Procedure P-2 may be a special case of procedure P-1 wherein procedure P-2 is used for a possibly smaller set of beams for beam refinement than procedure P-1. Procedure P-3 may be used to enable UE measurement on the same TRxP Tx beam to change UE Rx beam, e.g., in case the UE uses receive beamforming. Procedures P-1, P-2, and P-3 may be used for aperiodic beam reporting.

UE measurements based on RS for beam management (e.g., at least CSI-RS) may be composed of K beams (where K is a total number of configured beams), and the UE may report measurement results of N selected Tx beams (where N may or may not be a fixed number). The procedure based on RS being performed for mobility purpose may not be precluded. Beam information that is to be reported may include measurement quantities for the N beam(s) and information indicating N DL Tx beam(s), if N<K. Other information or data may be included in or with the beam information. When a UE is configured with K'>1 non-zero power (NZP) CSI-RS resources, a UE can report N' CSI-RS Resource Indicator (CRIs).

For beam failure detection, the gNB may configure the UE with beam failure detection reference signals, and it may be the case that the UE declares beam failure when the number of beam failure instance indications from the physical layer reaches a configured threshold within a configured period. After beam failure is detected, the UE may trigger BFR by initiating a Random Access procedure on the Pcell, and may select a suitable beam to perform BFR (if the gNB has provided dedicated Random Access resources for certain beams, it may be the case that those are prioritized by the UE). Upon completion of the Random Access procedure, the BFR may be considered complete.

Beam failure detection may trigger a mechanism to recover from beam failure, which may be referred to as "beam recovery", "BFRQ procedure", and/or the like. A beam failure event may occur when the quality of beam pair link(s) of an associated control channel falls below a threshold, when a time-out of an associated timer occurs, or the like. The beam recovery mechanism may be triggered when beam failure occurs. The network may explicitly configure the UE with resources for UL transmission of signals for recovery purposes. Configurations of resources may be supported where the base station (e.g., a TRP, gNB, or the like) is listening from all or partial directions (e.g., a random access region). The UL transmission/resources to report beam failure can be located in the same time instance as a Physical Random Access Channel (PRACH) or resources orthogonal to PRACH resources, or at a time instance (configurable for a UE) different from PRACH. Transmission of DL signal may be supported for allowing the UE to monitor the beams for identifying new potential beams.

A beam failure may be declared if one, multiple, or all serving PDCCH beams fail. The BFRQ procedure may be initiated when a beam failure is declared. For example, the BFRQ procedure may be used for indicating a new SSB or CSI-RS to a serving gNB (or TRP) when beam failure is detected on a serving SSB(s)/CSI-RS(s). A beam failure may be detected by the lower layers and indicated to a Media Access Control (MAC) entity of the UE.

Beam management may also include providing, or not providing, beam-related indications. When such a beam-related indication is provided, information pertaining to UE-side beamforming/receiving procedure used for CSI-RS-based measurement can be indicated through QCL to the UE. The same or different beams on the control channel and the corresponding data channel transmissions may be supported. DL beam indications may be based on a Transmission Configuration Indication (TCI) state(s). The TCI state(s) may be indicated in a TCI list that is configured by radio resource control (RRC) and/or Media Access Control (MAC) Control Element (CE).

When the radio link quality on all the configured RS resources in set $\bar{q}_0$ is worse than $Q_{out\_LR}$, it may be the case that Layer 1 of the UE sends a beam failure instance indication for the cell to the higher layers. A Layer 3 filter may be applied to the beam failure instance indications. The beam failure instance evaluation for the configured RS resources in the set $\bar{q}_0$ may be performed. It may be the case that two successive indications from Layer 1 are separated by at least $T_{Indication\_interval\_BFB}$. As one possibility, when DRX is not used, $T_{Indication\_interval\_BFB}$ may be max(2 ms, $T_{BFD-RS,M}$), where $T_{BFD-RS,M}$ is the shortest periodicity of all configured RS resources in the set $\bar{q}_0$ for the accessed cell, which may correspond to $T_{SSB}$ if a RS resource in the set $\bar{q}_0$ is SSB, or $T_{CSI-RS}$ if a RS resource in the set $\bar{q}_0$ is CSI-RS. As another possibility, when DRX is used, $T_{Indication\_interval\_BFD}$ may be max(1.5*DRX_cycle_length, 1.5*$T_{BFD-RS,M}$) if DRX cycle_length is less than or equal to 320 ms, and $T_{Indication\_interval}$ is DRX_cycle_length if DRX cycle_length is greater than 320 ms.

A BFRQ could be delivered over dedicated PRACH or PUCCH resources. If the random access procedure is initialized for BFR and if the contention-free Random Access Resources and the contention-free PRACH occasions for BFRQ associated with any of the SSBs and/or CSI-RSs is configured, the UE may have the capability to select the Random Access Preamble corresponding to the selected SSB with SS-RSRP above rsrp-ThresholdSSB among the associated SSBs, or the selected CSI-RS with CSI-RSRP above cfra-csirs-DedicatedRACH-Threshold amongst the associated CSI-RSs, and to transmit a Random Access Preamble on the next available PRACH occasion from the PRACH occasions corresponding to the selected SSB permitted by the restrictions given by the ra-ssb-OccasionMaskIndex if configured, or from the PRACH occasions in ra-OccasionList corresponding to the selected CSI-RS, where the PRACH occasion may be randomly selected with equal probability among the selected SSB associated PRACH occasions or the selected CSI-RS associated PRACH occasions occurring simultaneously but on different subcarriers. The UE may stop monitoring for Random Access Response(s), if the contention-free Random Access Preamble for BFRQ was transmitted and if the PDCCH addressed to UE's C-RNTI is received.

For beam measurement, a UE in RRC_CONNECTED mode may measure one or multiple beams of a cell, and the measurement results (e.g., power values) may be averaged to derive the cell quality. In doing so, the UE may be configured to consider a subset of the detected beams, such as the N best beams above an absolute threshold. Filtering may take place at the physical layer to derive beam quality and then at the RRC level to derive cell quality from the multiple beams. Cell quality from beam measurements may be derived in the same way for the serving cell(s) and for the non-serving cell(s). Measurement reports may contain the measurement results of the X best beams if the UE is configured to do so by the gNB.

The UE may derive cell measurement results by measuring one or multiple beams associated per cell as configured by the network. For all cell measurement results in RRC_CONNECTED mode, it may be the case that the UE applies layer 3 filtering before using the measured results for evaluation of reporting criteria and measurement reporting. For cell measurements, it may be the case that the network can configure RSRP, RSRQ, and/or SINR as a trigger quantity. Reporting quantities can be the same as the trigger quantity or combinations of quantities (e.g., RSRP and RSRQ; RSRP and SINR; RSRQ and SINR; RSRP, RSRQ and SINR).

The network may also configure the UE to report measurement information per beam, which can either include measurement results per beam with respective beam identifier(s) or only beam identifier(s), among various possibilities. If beam measurement information is configured to be included in measurement reports, the UE may apply layer 3 beam filtering. The exact layer 1 filtering of beam measurements used to derive cell measurement results may be implementation dependent.

Measurement reports may contain the measurement results of the X best beams, e.g., if the UE is configured to do so by the gNB. For channel state estimation purposes, the UE may be configured to measure CSI-RS resources and estimate a downlink channel state based on the CSI-RS measurements. The UE may feed the estimated channel state back to the gNB, e.g., to be used in link adaptation.

Figure 10:
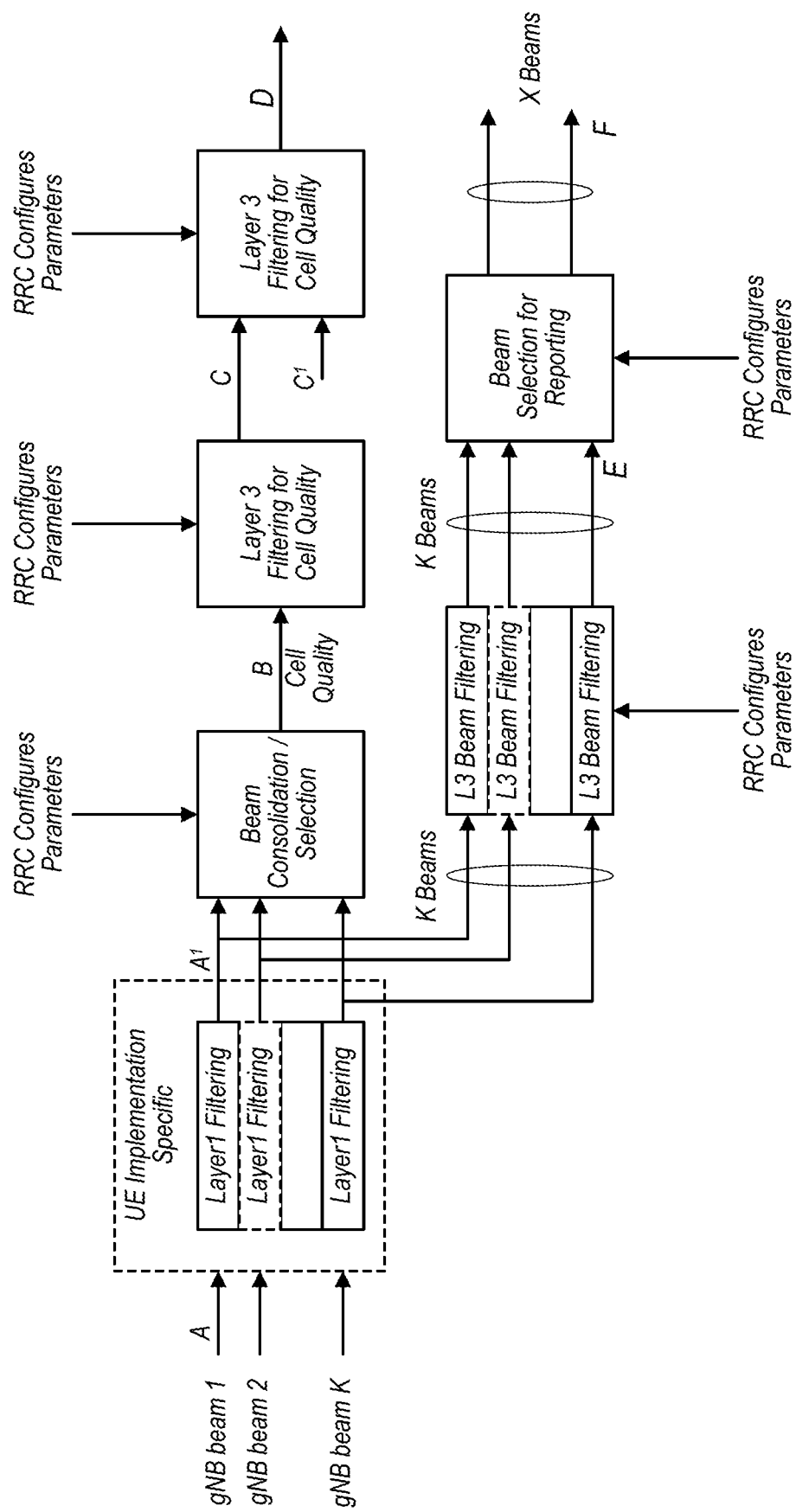
FIG. 10 illustrates aspects of a possible measurement model that could be used for performing beam measurements, according to some embodiments.

An example measurement model is illustrated in FIG. 10. As shown, in FIG. 10, point A includes measurements (e.g., beam specific samples) internal to the PHY. Layer 1 (L1) filtering includes internal layer 1 filtering circuitry for filtering the inputs measured at point A. The exact filtering mechanisms and how the measurements are actually executed at the PHY may be implementation specific. The measurements (e.g., beam specific measurements) are reported by the L1 filtering to layer 3 (L3) beam filtering circuitry and the beam consolidation/selection circuitry at point $A^1$.

The Beam Consolidation/Selection circuitry includes circuitry where beam specific measurements are consolidated to derive cell quality. For example, if N>1, else when N=1 the best beam measurement may be selected to derive cell quality. The configuration of the beam is provided by RRC signaling. A measurement (e.g., cell quality) derived from the beam-specific measurements are then be reported to L3 filtering for cell quality circuitry after beam consolidation/selection. In some embodiments, the reporting period at point B may be equal to one measurement period at point $A^1$.

The L3 filtering for cell quality circuitry is configured to filter the measurements provided at point B. The configuration of the Layer 3 filters is provided by the aforementioned RRC signaling or different/separate RRC signaling. In some embodiments, the filtering reporting period at point C may be equal to one measurement period at point B. A measurement after processing in the layer 3 filter circuitry is provided to the evaluation of reporting criteria circuitry at point C. In some embodiments, the reporting rate may be identical to the reporting rate at point B. This measurement input may be used for one or more evaluation of reporting criteria.

Evaluation of reporting criteria circuitry may be configured to check whether actual measurement reporting is necessary at point D. The evaluation can be based on more than one flow of measurements at reference point C. In one example, the evaluation may involve a comparison between different measurements, such as a measurement provided at point C and another measurement provided at point C'. In embodiments, the UE may evaluate the reporting criteria at least every time a new measurement result is reported at point C, $C^1$. The reporting criteria configuration is provided by the aforementioned RRC signaling (UE measurements) or different/separate RRC signaling. After the evaluation, measurement report information (e.g., as a message) is sent on the radio interface at point D.

Referring back to point $A^1$, measurements at point $A^1$ are provided to L3 Beam filtering circuitry, which is configured to perform beam filtering of the provided measurements (e.g., beam specific measurements). The configuration of the beam filters is provided by the aforementioned RRC signaling or different/separate RRC signaling. In embodiments, the filtering reporting period at point E may be equal to one measurement period at $A^1$. The K beams correspond to the measurements on New Radio (NR)-synchronization signal (SS) block (SSB) or Channel State Information Reference Signal (CSI-RS) resources configured for L3 mobility by a gNB and detected by the UE at L1.

After processing in the beam filter measurement (e.g., beam-specific measurement), a measurement is provided to beam selection for reporting circuitry at point E. This measurement is used as an input for selecting the X measurements to be reported. In embodiments, the reporting rate may be identical to the reporting rate at point $A^1$. The beam selection for beam reporting circuitry is configured to select the X measurements from the measurements provided at point E. The configuration of this module is provided by the aforementioned RRC signaling or different/separate RRC signaling. The beam measurement information to be included in a measurement report is sent or scheduled for transmission on the radio interface at point F.

L1 filtering introduces a certain level of measurement averaging. Exactly how and when the UE performs the required measurements is implementation specific to the point that the output at B fulfils the predefined performance requirements. L3 filtering for cell quality and related parameters do not introduce any delay in the sample availability between B and C. Measurement at point C, C' is the input used in the event evaluation. L3 Beam filtering and related parameters do not introduce any delay in the sample availability between E and F.

The measurement reports include a measurement identity of an associated measurement configuration that triggered the reporting; cell and beam measurement quantities to be included in measurement reports are configured by the network (e.g., using RRC signaling); the number of non-serving cells to be reported can be limited through configuration by the network; cells belonging to a blacklist configured by the network are not used in event evaluation and reporting, and conversely when a whitelist is configured by the network, only the cells belonging to the whitelist are used in event evaluation and reporting; and beam measurements to be included in measurement reports are configured by the network (beam identifier only, measurement result and beam identifier, or no beam reporting).

Intra-frequency neighbour (cell) measurements and inter-frequency neighbour (cell) measurements may include SSB based measurements and CSI-RS based measurements. For SSB based measurements, one measurement object may correspond to one SSB and the UE may consider different SSBs as different cells. A measurement may be defined as an SSB based intra-frequency measurement provided the center frequency of the SSB of the serving cell and the center frequency of the SSB of the neighbour cell are the same, and the subcarrier spacing of the two SSBs is also the same. A measurement may be defined as a CSI-RS based intra-frequency measurement provided the bandwidth of the CSI-RS resource on the neighbour cell configured for measurement is within the bandwidth of the CSI-RS resource on the serving cell configured for measurement, and the subcarrier spacing of the two CSI-RS resources is the same.

Inter-frequency neighbor (cell) measurements may include SSB based inter-frequency measurement(s) and CSI-RS based inter-frequency measurements. For SSB based measurements, one measurement object may correspond to one SSB and the UE may consider different SSBs as different cells. SSB based inter-frequency measurements is/are defined as an SSB based inter-frequency measurement provided the center frequency of the SSB of the serving cell and the center frequency of the SSB of the neighbour cell are different, or the subcarrier spacing of the two SSBs is different. CSI-RS based inter-frequency measurements is/are defined as a CSI-RS based inter-frequency measurement provided the bandwidth of the CSI-RS resource on the neighbour cell configured for measurement is not within the bandwidth of the CSI-RS resource on the serving cell configured for measurement, or the subcarrier spacing of the two CSI-RS resources is different.

Whether a measurement is non-gap-assisted or gap-assisted may depend on the capability of the UE, the active BWP of the UE, and/or the current operating frequency. In non-gap-assisted scenarios, the UE may be able to carry out such measurements without measurement gaps. In gap-assisted scenarios, it may be the case that the UE cannot be assumed to be able to carry out such measurements without measurement gaps.

According to some embodiments, a UE can be configured with a list of up to M TCI-State configurations within the higher layer parameter PDSCH-Config to decode a PDSCH according to a detected PDCCH with DCI intended for the UE and the given serving cell, where M depends on the UE capability. Each TCI-State may contain parameters for configuring a quasi co-location relationship between one or two downlink reference signals and the DM-RS ports of the PDSCH. The quasi co-location relationship may be configured by the higher layer parameter qcl-Type1 for the first DL RS, and qcl-Type2 for the second DL RS (if configured). For the case of two DL RSs, it may be the case that the QCL types are not the same, regardless of whether the references are to the same DL RS or different DL RSs. The quasi co-location types corresponding to each DL RS may be given by the higher layer parameter qcl-Type in QCL-Info and may take one of the following values: QCL-TypeA: {Doppler shift, Doppler spread, average delay, delay spread}; QCL-TypeB: {Doppler shift, Doppler spread}; QCL-TypeC: {average delay, Doppler shift}; QCL-TypeD: {Spatial Rx parameter}.

The UE may receive an activation command used to map up to 8 TCI states to the codepoints of the DCI field 'Transmission Configuration Indication'. When the HARQ-ACK corresponding to the PDSCH carrying the activation command is transmitted in slot n, it may be the case that the indicated mapping between TCI states and codepoints of the DCI field 'Transmission Configuration Indication' should be applied starting from slot $n+3N_{slot}^{subframe,\mu}+1$. After the UE receives the higher layer configuration of TCI states and before reception of the activation command, the UE may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

If a UE is configured with the higher layer parameter tci-PresentInDCI that is set as 'enabled' for the CORESET scheduling the PDSCH, the UE may assume that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, for determining PDSCH antenna port quasi co-location, the UE may assume that the TCI state for the PDSCH is identical to the TCI state applied for the CORESET used for the PDCCH transmission.

If the tci-PresentInDCI is set as 'enabled', when the PDSCH is scheduled by DCI format 1_1, it may be the case that the UE uses the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold Threshold-Sched-Offset, where the threshold is based on reported UE capability.

For both the cases when tci-PresentInDCI is set to 'enabled' and tci-PresentInDCI is not configured, if the offset between the reception of the DL DCI and the corresponding PDSCH is less than the threshold Threshold-Sched-Offset, the UE may assume that the DM-RS ports of PDSCH of a serving cell are quasi co-located with the RS(s) in the TCI state with respect to the QCL parameter(s) used for PDCCH quasi co-location indication of the lowest CORESET-ID in the latest slot in which one or more CORESETs within the active BWP of the serving cell are configured for the UE. If none of configured TCI states contains 'QCL-TypeD', it may be the case that the UE obtains the other QCL assumptions from the indicated TCI states for its scheduled PDSCH irrespective of the time offset between the reception of the DL DCI and the corresponding PDSCH.

For a periodic CSI-RS resource in a NZP-CSI-RS-ResourceSet configured with higher layer parameter trs-Info, it may be the case that the UE expects that a TCI-State indicates one of the following quasi-colocation type(s):
  'QCL-TypeC' with an SS/PBCH block and, when applicable, 'QCL-TypeD' with the same SS/PBCH block, or
  'QCL-TypeC' with an SS/PBCH block and, when applicable, 'QCL-TypeD' with a CSI-RS resource in an NZP-CSI-RS-ResourceSet configured with higher layer parameter repetition.

For an aperiodic CSI-RS resource in a NZP-CSI-RS-ResourceSet configured with higher layer parameter trs-Info, it may be the case that the UE expects that a TCI-State indicates 'QCL-TypeA' with a periodic CSI-RS resource in a NZP-CSI-RS-ResourceSet configured with higher layer parameter trs-Info and, when applicable, 'QCL-TypeD' with the same periodic CSI-RS resource.

For a CSI-RS resource in a NZP-CSI-RS-ResourceSet configured without higher layer parameter trs-Info and without the higher layer parameter repetition, it may be the case that the UE expects that a TCI-State indicates one of the following quasi co-location type(s):
  'QCL-TypeA' with a CSI-RS resource in a NZP-CSI-RS-ResourceSet configured with higher layer parameter trs-Info and, when applicable, 'QCL-TypeD' with an SS/PBCH block, or
  'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or
  'QCL-TypeB' with a CSI-RS resource in a NZP-CSI-RS-ResourceSet configured with higher layer parameter trs-Info when 'QCL-TypeD' is not applicable.

For a CSI-RS resource in a NZP-CSI-RS-ResourceSet configured with higher layer parameter repetition, it may be the case that the UE expects that a TCI-State indicates one of the following quasi co-location type(s):
  'QCL-TypeA' with a CSI-RS resource in a NZP-CSI-RS-ResourceSet configured with higher layer parameter trs-Info and, when applicable, 'QCL-TypeD' with the same CSI-RS resource, or
  'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or
  'QCL-TypeC' with an SS/PBCH block and, when applicable, 'QCL-TypeD' with the same SS/PBCH block.

For the DM-RS of PDCCH, it may be the case that the UE expects that a TCI-State indicates one of the following quasi co-location type(s):
  'QCL-TypeA' with a CSI-RS resource in a NZP-CSI-RS-ResourceSet configured with higher layer parameter trs-Info and, when applicable, 'QCL-TypeD' with the same CSI-RS resource, or
  'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or
  'QCL-TypeA' with a CSI-RS resource in a NZP-CSI-RS-ResourceSet configured without higher layer parameter trs-Info and without higher layer parameter repetition, when 'QCL-TypeD' is not applicable.

For the DM-RS of PDSCH, it may be the case that the UE expects that a TCI-State indicates one of the following quasi co-location type(s):

'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with CSI-RS resource in a NZP-CSI-RS-ResourceSet configured without higher layer parameter trs-Info and without repetition and, when applicable, 'QCL-TypeD' with the same CSI-RS resource.

The UE may assess the downlink link quality of a serving cell based on the reference signal in the set $\bar{q}_0$ as specified herein in order to detect a beam failure instance. The RS resources in the set $\bar{q}_0$ can be periodic CSI-RS resources and/or SSBs. It may be the case that a UE is not required to perform beam failure detection outside the active DL BWP. On each RS resource in the set $\bar{q}_0$, the UE may estimate the radio link quality and compare it to a threshold $Q_{out\_LR}$ for the purpose of accessing downlink radio link quality of the serving cell.

The threshold $Q_{out\_LR}$ may be defined as the level at which the downlink radio level link cannot be reliably received, and may correspond to the $BLER_{out}$ block error rate of a hypothetical PDCCH transmission. For SSB based beam failure detection, $Q_{out\_LR}$ SSB may be derived based on the hypothetical PDCCH transmission parameters listed in the table illustrated in FIG. 11, at least according to some embodiments. For CSI-RS based beam failure detection, $Q_{out\_LR}$ CSI-RS may be derived based on the hypothetical PDCCH transmission parameters listed in the table illustrated in FIG. 12, at least according to some embodiments.

The UE may perform L1-RSRP measurements based on the reference signal in the set $\bar{q}_1$ as specified herein in order to detect candidate beam. The RS resources in the set $\bar{q}_1$ can be periodic CSI-RS resources and/or SSBs. It may be the case that a UE is not required to perform candidate beam detection outside the active DL BWP. On each RS resource in the set $\bar{q}_1$, the UE may perform L1-RSRP measurements and compare it to a threshold $Q_{in\_LR}$ for the purpose of selecting new beam(s) for BFR. The threshold $Q_{in\_LR}$ may correspond to the value of a higher layer parameter candidateBeamThreshold.

As alluded to previously herein, the UE may be provided, for a serving cell, with a set $\bar{q}_0$ of periodic CSI-RS resource configuration indexes by a higher layer parameter failureDetectionResources and with a set $\bar{q}_1$ of periodic CSI-RS resource configuration indexes and/or SS/PBCH block indexes by a higher layer parameter candidateBeamRSList for radio link quality measurements on the serving cell. If the UE is not provided with the higher layer parameter failureDetectionResources, the UE may determine the set $\bar{q}_0$ to include periodic CSI-RS resource configuration indexes with same values as the RS indexes in the RS sets indicated by the higher layer parameter TCI-states for respective control resource sets that the UE uses for monitoring PDCCH. The UE may expect the set $\bar{q}_0$ to include up to two RS indexes and, if there are two RS indexes in a TCI state, the set $\bar{q}_0$ may include RS indexes with QCL-TypeD configuration for the corresponding TCI states. The UE may expect single port RS in the set $\bar{q}_0$. The thresholds $Q_{out,LR}$ and $Q_{in,LR}$ may correspond to the default value of higher layer parameter rlmInSyncOutOlSyncThreshold for $Q_{out}$, and to the value provided by higher layer parameter rsrp-ThresholdSSB, respectively.

The physical layer in the UE may assess the radio link quality according to the set $\bar{q}_0$ of resource configurations against the threshold $Q_{out,LR}$. For the set $\bar{q}_0$ the UE may assess the radio link quality only according to periodic CSI-RS resource configurations or SS/PBCH blocks that are quasi co-located with the DM-RS of PDCCH receptions monitored by the UE. The UE may apply the $Q_{in,LR}$ threshold to the L1-RSRP measurement obtained from a SS/PBCH block. The UE may apply the $Q_{in,LR}$ threshold to the L1-RSRP measurement obtained for a CSI-RS resource after scaling a respective CSI-RS reception power with a value provided by higher layer parameter powerControlOffsetSS.

The physical layer in the UE may provide an indication to higher layers when the radio link quality for all corresponding resource configurations in the set $\bar{q}_0$ that the UE uses to assess the radio link quality is worse than the threshold $Q_{out,LR}$. The physical layer may inform the higher layers when the radio link quality is worse than the threshold $Q_{out,LR}$ with a periodicity determined by the maximum between the shortest periodicity among the periodic CSI-RS configurations and/or SS/PBCH blocks in the set $q_0$ that the UE uses to assess the radio link quality and 2 msec.

Upon request from higher layers, the UE may provide to higher layers the periodic CSI-RS configuration indexes and/or SS/PBCH block indexes from the set $\bar{q}_1$ and the corresponding L1-RSRP measurements that are larger than or equal to the $Q_{in,LR}$ threshold.

The UE can be provided with a control resource set through a link to a search space set provided by a higher layer parameter recoverySearchSpaceId, for monitoring PDCCH in the control resource set. If the UE is provided with the higher layer parameter recoverySearchSpaceId, it may be the case that the UE does not expect to be provided another search space set for monitoring PDCCH in the control resource set associated with the search space set provided by recoverySearchSpaceId.

The UE may receive by higher layer parameter PRACH-ResourceDedicatedBFR, a configuration for PRACH transmission. For PRACH transmission in slot n and according to antenna port quasi co-location parameters associated with periodic CSI-RS resource configuration or with SS/PBCH block associated with index $q_{new}$ provided by higher layers, the UE may monitor PDCCH in a search space set provided by higher layer parameter recoverySearchSpaceId for detection of a DCI format with CRC scrambled by C-RNTI or MCS-C-RNTI starting from slot n+4 within a window configured by higher layer parameter BeamFailureRecoveryConfig. For the PDCCH monitoring and for the corresponding PDSCH reception, the UE may assume the same antenna port quasi-collocation parameters as the ones associated with index $q_{new}$ until the UE receives by higher layers an activation for a TCI state or any of the parameters TCI-StatesPDCCH-ToAddlist and/or TCI-StatesPDCCH-ToReleaseList. After the UE detects a DCI format with CRC scrambled by C-RNTI or MCS-C-RNTI in the search space set provided by recoverySearchSpaceId, the UE may continue to monitor PDCCH candidates in the search space set provided by recoverySearchSpaceId until the UE receives a MAC CE activation command for a TCI state or higher layer parameters TCI-StatesPDCCH-ToAddlist and/or TCI-StatesPDCCH-ToReleaseList.

If a beam failure indication has been received by a MAC entity from lower layers, then the MAC entity may start a BFR timer (beamFailureRecoveryTimer) and initiate a Random Access procedure. If the beamFailureRecoveryTimer expires, then the MAC entity may indicate a BFRQ failure to upper layers. If a DL assignment or UL grant has been received (e.g., on a PDCCH addressed for a cell radio network temporary identifier (C-RNTI)), then the MAC entity may stop and reset beamFailureRecoveryTimer and consider the BFRQ procedure to be successfully completed.

For SSB based beam failure detection, the UE may evaluate whether the downlink radio link quality on the configured SSB resource in set $\bar{q}_0$ estimated over the last $T_{Evaluate\_BFD\_SSB}$ [ms] period becomes worse than the threshold $Q_{out\_LR\_SSB}$ within $T_{Evaluate\_BFD\_SSB}$ [ms] period. The value of $T_{Evaluate\_BFD\_SSB}$ may be defined in the table illustrated in FIG. 13 for 3GPP frequency range 1 (FR1), at least as one possibility. The value of $T_{Evaluate\_BFD\_SSB}$ may be defined in the table illustrated in FIG. 14 for 3GPP frequency range 2 (FR2) with N=1, at least as one possibility, if the UE is not provided with the higher layer parameter failureDetectionResource and the UE is provided with the higher layer parameter TCI-state for PDCCH SSB that has QCL-TypeD, or if the SSB configured for BFD is QCL-Type D with DM-RS for PDCCH and the QCL association is known to the UE, or if the SSB configured for BFD is QCL-Type D and TDMed to CSI-RS resources configured for L1-RSRP reporting and the QCL association is known to the UE, and a CSI report with L1-RSRP measurement for the SSB configured for BFD has been made within a certain specified amount of time.

For FR1, it may be the case that $P=1/(1-T_{SSB}/MGRP)$, when in the monitored cell there are measurement gaps configured for intra-frequency, inter-frequency or inter-RAT measurements, which are overlapping with some but not all occasions of the SSB; and P=1 when in the monitored cell there are no measurement gaps overlapping with any occasion of the SSB.

For FR2, it may be the case that $P=1/(1-T_{SSB}/T_{SMTCperiod})$, when BFD-RS is not overlapped with measurement gap and BFD-RS is partially overlapped with SMTC occasion ($T_{SSB}<T_{SMTCperiod}$). P may be $P_{sharing\ factor}$, when BFD-RS is not overlapped with measurement gap and BFD-RS is fully overlapped with SMTC period ($T_{SSB}=T_{SMTCperiod}$). P may be $1/(1-T_{SSB}/MGRP-T_{SSB}/T_{SMTCperiod})$, when BFD-RS is partially overlapped with measurement gap and BFD-RS is partially overlapped with SMTC occasion ($T_{SSB}<T_{SMTCperiod}$) and SMTC occasion is not overlapped with measurement gap and $T_{SMTCperiod}$ MGRP or $T_{SMTCperiod}=$MGRP and $T_{SSB}<0.5*T_{SMTCperiod}$. P is $1/(1-T_{SSB}/MGRP)*P_{sharing\ factor}$, when BFD-RS is partially overlapped with measurement gap and BFD-RS is partially overlapped with SMTC occasion ($T_{SSB}<T_{SMTCperiod}$) and SMTC occasion is not overlapped with measurement gap and $T_{SMTCperiod}=$MGRP and $T_{SSB}=0.5*T_{SMTCperiod}$. P is $1/\{1-T_{SSB}/\text{Min}(T_{SMTCperiod},\text{MGRP})\}$, when BFD-RS is partially overlapped with measurement gap ($T_{SSB}<$MGRP) and BFD-RS is partially overlapped with SMTC occasion ($T_{SSB}<T_{SMTCperiod}$) and SMTC occasion is partially or fully overlapped with measurement gap. P may be $1/(1-T_{SSB}/MGRP)*P_{sharing\ factor}$, when BFD-RS is partially overlapped with measurement gap and BFD-RS is fully overlapped with SMTC occasion ($T_{SSB}=T_{SMTCperiod}$) and SMTC occasion is partially overlapped with measurement gap ($T_{SMTCperiod}<$MGRP). It may be the case that $P_{sharing\ factor}=3$.

If the high layer signaling of smtc2 is configured, $T_{SMTCperiod}$ may correspond to the value of the higher layer parameter smtc2; Otherwise $T_{SMTCperiod}$ may correspond to the value of the higher layer parameter smtc1. It may be the case that a longer evaluation period would be expected if the combination of BFD-RS, SMTC occasion and measurement gap configurations does not meet pervious conditions.

For CSI-RS based beam failure detection, the UE may evaluates whether the downlink radio link quality on the configured CSI-RS resource in set $\bar{q}_0$ estimated over the last $T_{Evaluate\_BFD\_CSI-RS}$ [ms] period becomes worse than the threshold $Q_{out\_LR\_CSI-RS}$ within $T_{Evaluate\_BFD\_CSI-RS}$ [ms] period. The value of $T_{Evaluate\_BFD\_CSI-RS}$ may be defined in the table illustrated in FIG. 15 for FR1, at least as one possibility. The value of $T_{Evaluate\_BFD\_CSI-RS}$ may be defined in the table illustrated in FIG. 16 for FR2 with N=1, at least as one possibility, if the UE is not provided with a higher layer parameter RadioLinkMonitoringRS and the UE is provided with a higher layer parameter TCI-state for PDCCH CSI-RS that has QCL-TypeD, or if the CSI-RS configured for BFD is QCL-Type D with DM-RS for PDCCH and the QCL association is known to UE, or if the CSI-RS resource configured for BFD is QCL-Type D and TDMed to CSI-RS resources configured for L1-RSRP reporting or SSBs configured for L1-RSRP reporting, all CSI-RS resources configured for BFD are mutually TDMed, and the QCL association is known to UE and a CSI report with L1-RSRP measurement for the CSI-RS configured for BFD has been made within a certain specified amount of time.

For FR1, it may be the case that $P=1/(1-T_{CSI-RS}/MGRP)$, when in the monitored cell there are measurement gaps configured for intra-frequency, inter-frequency or inter-RAT measurements, which are overlapping with some but not all occasions of the CSI-RS; and P=1 when in the monitored cell there are no measurement gaps overlapping with any occasion of the CSI-RS.

For FR2, it may be the case that P=1, when BFD-RS is not overlapped with measurement gap and also not overlapped with SMTC occasion. It may be the case that $P=1/(1-T_{CSI-RS}/MGRP)$, when BFD-RS is partially overlapped with measurement gap and BFD-RS is not overlapped with SMTC occasion ($T_{CSI-RS}<$MGRP) $P=1/(1-T_{CSI-RS}/T_{SMTCperiod})$, when BFD-RS is not overlapped with measurement gap and BFD-RS is partially overlapped with SMTC occasion ($T_{CSI-RS}<T_{SMTCperiod}$). P may be $P_{sharing\ factor}$, when BFD-RS is not overlapped with measurement gap and BFD-RS is fully overlapped with SMTC occasion ($T_{CSI-RS}=T_{SMTCperiod}$). P is $1/(1-T_{CSI-RS}/MGRP-T_{CSI-RS}/T_{SMTCperiod})$, when BFD-RS is partially overlapped with measurement gap and BFD-RS is partially overlapped with SMTC occasion ($T_{CSI-RS}<T_{SMTCperiod}$) and SMTC occasion is not overlapped with measurement gap and $T_{SMTCperiod}$ MGRP or $T_{SMTCperiod}=$MGRP and $T_{CSI-RS}<0.5*T_{SMTCperiod}$. P may be $1/(1-T_{CSI-RS}/MGRP)*P_{sharing\ factor}$, when BFD-RS is partially overlapped with measurement gap and BFD-RS is partially overlapped with SMTC occasion ($T_{CSI-RS}<T_{SMTCperiod}$) and SMTC occasion is not overlapped with measurement gap and $T_{SMTCperiod}=$MGRP and $T_{CSI-RS}=0.5*T_{SMTCperiod}$. P may be $1/\{1-T_{CSI-RS}/\text{min}(T_{SMTCperiod},\text{MGRP})\}$, when BFD-RS is partially overlapped with measurement gap ($T_{CSI-RS}<$MGRP) and BFD-RS is partially overlapped with SMTC occasion ($T_{CSI-RS}<T_{SMTCperiod}$) and SMTC occasion is partially or fully overlapped with measurement gap. P may be $1/(1-T_{CSI-RS}/MGRP)*P_{sharing\ factor}$, when BFD-RS is partially overlapped with measurement gap and BFD-RS is fully overlapped with SMTC occasion ($T_{CSI-RS}= T_{SMTCperiod}$) and SMTC occasion is partially overlapped with measurement gap ($T_{SMTCperiod}$<MGRP). It may be the case that $P_{sharing\,factor}$ is 3.

If the high layer signaling of smtc2 is configured, $T_{SMTCperiod}$ may correspond to the value of the higher layer parameter smtc2; otherwise, $T_{SMTCperiod}$ may correspond to the value of the higher layer parameter smtc1. It may be the case that a longer evaluation period would be expected if the combination of BFD-RS, SMTC occasion and measurement gap configurations does not meet the previous conditions. The values of MBFD used in the tables illustrated in FIGS. 15-16 may be defined as MBFD=10, if the CSI-RS resource configured for BFD is transmitted with Density=3, at least as one possibility.

In some embodiments, scheduling availability restrictions may apply when the UE is performing beam failure detection. For example, it may be the case that there are no scheduling restrictions due to beam failure detection performed on SSB configured as BFD-RS with the same SCS as PDSCH/PDCCH in FR1. When the UE supports simultaneousRxDataSSB-DiffNumerology, it may be the case that there are no restrictions on scheduling availability due to beam failure detection based on SSB as BFD-RS. However, when the UE does not support simultaneousRxDataSSB-DiffNumerology, it may be the case that the following restrictions apply due to beam failure detection based on SSB configured as BFD-RS: the UE is not expected to transmit PUCCH/PUSCH or receive PDCCH/PDSCH on SSB symbols to be measured for beam failure detection.

The following scheduling restrictions may apply due to beam failure detection based on CSI-RS as BFD-RS: The UE is not expected to transmit PUCCH/PUSCH or receive PDCCH/PDSCH on CSI-RS symbols to be measured for beam failure detection. When intra-band carrier aggregation in FR1 is configured, it may be the case that the scheduling restrictions apply to all SCells that are aggregated in the same band as the PCell or PSCell. When inter-band carrier aggregation within FR1 is configured, it may be the case that there are no scheduling restrictions on FR1 serving cell(s) configured in other bands than the bands in which PCell or PSCell is configured.

The following scheduling restriction may apply due to beam failure detection on an FR2 PCell and/or PSCell: if the UE is not provided with a higher layer parameter failure-DetectionResources and the UE is provided with a higher layer parameter TCI-state for PDCCH SSB/CSI-RS that has QCL-Type D, or if the SSB/CSI-RS for BFD is QCL-Type D with DM-RS for PDCCH. It may be the case that there are no scheduling restrictions due to beam failure detection performed with same SCS as PDSCH/PDCCH. Otherwise, it may be the case that the UE is not expected to transmit PUCCH/PUSCH or receive PDCCH/PDSCH on BFD-RS symbols to be measured for beam failure detection, except for RMSI PDCCH/PDSCH and PDCCH/PDSCH which is not required to be received by a RRC_CONNECTED mode UE.

When intra-band carrier aggregation is configured, the following scheduling restrictions may apply to all SCells configured in the same band as the PCell and/or PSCell on which beam failure is detected. For the case where no RSs are provided for BFD, or where BFD-RS is explicitly configured and is QCLed with active TCI state for PDCCH/PDSCH. It may be the case that there are no scheduling restrictions due to beam failure detection performed with a same SCS as PDSCH/PDCCH. When performing beam failure detection with a different SCS than PDSCH/PDCCH, for UEs which support simultaneousRxDataSSB-DiffNumerology, it may be the case that there are no restrictions on scheduling availability due to beam failure detection. For UEs that do not support simultaneousRxDataSSB-DiffNumerology, it may be the case that the UE is not expected to transmit PUCCH/PUSCH or receive PDCCH/PDSCH on SSB symbols to be measured for beam failure detection. For the case where BFD-RS is explicitly configured and is not QCLed with active TCI state for PDCCH/PDSCH, the UE may not be expected to transmit PUCCH/PUSCH or receive PDCCH/PDSCH on BFD-RS symbols to be measured for beam failure detection.

It may be the case that there are no scheduling restrictions on FR1 serving cell(s) due to beam failure detection performed on FR2 serving PCell and/or PSCell. It may be the case that there are no scheduling restrictions on FR2 serving cell(s) due to beam failure detection performed on FR1 serving PCell and/or PSCell.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example 1 may include a gNB configured to operate with multiple component carriers, including a PCell and SCell.

Example 2 includes a User Equipment (UE) to operate with multiple component carriers, including PCell and SCell; perform beam failure detection on SCell; and send beam failure recovery request to a gNB.

Example 3 includes the gNB of example 1 and/or some other example(s) herein, wherein the gNB is to configure multiple reference signals (SSB, CSI-RS) as candidate Tx beams.

Example 4 includes the UE of example 2 and/or some other example(s) herein, wherein the UE is to measure the candidate Tx beams; select one or several as identified Tx beams; and send back the information of the identified Tx beams to the gNB.

Example 5 includes the gNB of example 3, the UE of example 4, and/or some other example(s) herein, wherein for SCell beam failure recovery, in the RRC configuration for new beam identification (candidateBeamRSList) only SSB or only CSI-RS could be configured, wherein if CSI-RS is configured, the UE should report CRI in the new Tx beam information delivered to gNB, wherein if SSB is configured, the UE is to report SSBRI in the new Tx beam information delivered to gNB.

Example 6 includes the gNB of example 3, the UE of example 4, and/or some other example(s) herein, wherein the gNB is to configure multiple candidateBeamRSList, where each list can include either a group of SSB or a group of CSI-RS, and the corresponding list used for UE to report new beam information can be indicated by DCI or MAC CE or RRC signaling.

Example 7 includes the gNB of example 3, the UE of example 4, and/or some other example(s) herein, wherein for SCell beam failure recovery, in the RRC configuration for new beam identification (candidateBeamRSList) SSB and/or CSI-RS could be configured, and Candidate Beam Resource Indicator (CBRI) is defined, to indicate one RS resource contained in the reference signal resource set provided by candidateBeamRSList including SSB and/or CSI-RS, and the UE should report CBRI in the new Tx beam information delivered to gNB by UCI/UCI-like or MAC-CE, wherein when the UE cannot identify a new beam, a default CBRI can be considered as "no new beam identified".

Example 8 includes the gNB of example 3, the UE of example 4, and/or some other example(s) herein, wherein for SCell beam failure recovery, in the RRC configuration for new beam identification (candidateBeamRSList) SSB and/or CSI-RS could be configured, wherein when the UE sends new Tx beam information over UCI/UCI-like or MAC-CE, the new Tx beam information should include a one bit indicator plus the reference signal resource indicator, wherein the reference signal resource indicator could be SSBRI or CRI, and wherein the one bit indicator is to indicate whether the type of the reference signal resource indicator to indicate whether it is SSBRI or CRI.

Example 9 includes the gNB of example 3, the UE of example 4, and/or some other example(s) herein, wherein the UE is to report whether the new beam is identified based on SSB or CSI-RS when delivering the beam failure event, wherein one PUCCH/PRACH resource can be configured for SSB based new beam identification, and another PUCCH/PRACH resource can be used for CSI-RS based new beam identification, and then the UE is to select one of them to report.

Example 10 includes the UE of examples 2 and 4 and/or some other example(s) herein, wherein for SCell beam failure recovery, the UE could report several new Tx beams information to the gNB over UCI/UCI-like or MAC-CE, wherein the Tx beams information to indicate N Tx beams, and a value of N could be configurable or pre-defined.

Example 11 includes the UE of example 10 and/or some other example(s) herein, wherein N is 1.

Example 12 includes the UE of examples 2 and 4 and/or some other example(s) herein, wherein the UE is to report the number of new beams to be reported when delivering the beam failure event. In one example, one PUCCH/PRACH resource can be used to indicate that the UE identifies 1 new beam, another PUCCH/PRACH resource can be used to indicate that the UE identifies 2 new beams, and so on.

Example 13 includes a method comprising: performing or causing to perform beam failure detection on a secondary cell (SCell); generating or causing to generate a beam failure recovery request (BFRQ) based on detection of the beam failure of the SCell; and transmitting or causing to transmit the BFRQ to a next generation NodeB (gNB).

Example 14 includes the method of example 13 and/or some other example(s) herein, further comprising: measuring or causing to measure one or more candidate Tx beams; selecting or causing to select the one or more of the one or more candidate Tx beams as identified Tx beams; and transmitting or causing to transmit information of the identified Tx beams in the BFRQ.

Example 15 includes the UE of examples 13-14 and/or some other example(s) herein, further comprising: determining or causing to determine a configuration of one or more reference signals as candidate Tx beams, the one or more reference signals including SSB and/or CSI-RS.

Example 16 includes the method of example 15 and/or some other example(s) herein, wherein the configuration for new beam identification (candidateBeamRSList) only configures SSB or only CSI-RS, wherein the BFRQ is to include CRI in new Tx beam information when the CSI-RS is configured, and wherein the BFRQ is to include SSBRI in the new Tx beam information when the SSB is configured.

Example 17 includes the method of example 15 and/or some other example(s) herein, wherein the configuration is to configure one or more candidateBeamRSList IEs, where each candidateBeamRSList IE includes a group of SSB or a group of CSI-RS, and a candidateBeamRSList IE of the one or more candidateBeamRSList IEs used to report new beam information is indicated by DCI, a MAC CE, or RRC signaling.

Example 18 includes the method of example 15 and/or some other example(s) herein, wherein the configuration for new beam identification (candidateBeamRSList) configures SSB and/or CSI-RS, and includes a Candidate Beam Resource Indicator (CBRI) to indicate one RS resource contained in a reference signal resource set provided by the candidateBeamRSList including SSB and/or CSI-RS, and the method comprises transmitting or causing to transmit UCI or MAC CE including the CBRI in new Tx beam information, and wherein a default CBRI can be considered as "no new beam identified" when a new beam cannot be identified.

Example 19 includes the method of example 18 and/or some other example(s) herein, wherein the new Tx beam information includes a one bit indicator plus a reference signal resource indicator, wherein the reference signal resource indicator is an SSBRI or CRI, and wherein the one bit indicator is to indicate whether the reference signal resource indicator is the SSBRI or the CRI.

Example 20 includes the method of example 15 and/or some other example(s) herein, further comprising: reporting or causing to report whether the new beam is identified based on the SSB or the CSI-RS when delivering the BFRQ, wherein a first PUCCH/PRACH resource can be configured for SSB based new beam identification and a second PUCCH/PRACH resource can be used for CSI-RS based new beam identification, and the method comprises selecting or causing to select one of the first PUCCH/PRACH resource or the second PUCCH/PRACH resource to whether the new beam is identified based on the SSB or the CSI-RS.

Example 21 includes the method of example 15 and/or some other example(s) herein, further comprising: reporting or causing to report one or more new Tx beams information over UCI or MAC CE, wherein the new Tx beams information is to indicate N Tx beams, and a value of N is configurable or predefined.

Example 22 includes the method of example 21 and/or some other example(s) herein, wherein N is 1.

Example 23 includes the method of example 15 and/or some other example(s) herein, further comprising: reporting or causing to report a number of new beams when delivering the BFRQ, wherein a first PUCCH/PRACH resource can be used to indicate that one new beam has been identified, a second PUCCH/PRACH resource can be used to indicate that two new beams have been identified, and so on to a Nth PUCCH/PRACH resource can be used to indicate that N new beams have been identified.

Example 24 includes the method of examples 15-23 and/or some other example(s) herein, wherein the method is to be performed by a user equipment (UE).

Example 25 includes a method comprising: generating or causing to generate a Radio Resource Control (RRC) message to include a beam failure configuration (BeamFailureRecoveryConfig) information element (IE), the BeamFailureRecoveryConfig IE to include candidateBeamRSList IE, the candidateBeamRSList IE to include a list of reference signals identifying one or more candidate beams for secondary cell (SCell) beam failure recovery (BFR); transmitting or causing to transmit the RRC message to a user equipment (UE); and receiving new transmission (Tx) beam information with a BFR request (BFRQ).

Example 26 includes the method of example 25 and/or some other example(s) herein, wherein the list of reference signals in the candidateBeamRSList IE includes only one or more synchronization signal blocks (SSBs) or only one or more channel state information reference signals (CSI-RSs).

Example 27 includes the method of example 26 and/or some other example(s) herein, wherein, further comprising: when the one or more CSI-RSs are listed, receiving a CSI-RS Resource Indicator (CRI) in the new Tx beam information; and when the one or more SSBs are listed, receiving a SSB Resource Indicator (SSBRI) in the new Tx beam information.

Example 28 includes the method of example 25 and/or some other example(s) herein, wherein the BeamFailureRecoveryConfig IE to include one or more candidateBeamRSList IEs including the candidateBeamRSList IE, wherein each candidateBeamRSList IE of the one or more candidateBeamRSList IEs includes one or more SSBs and/or one or more CSI-RSs.

Example 29 includes the method of example 28 and/or some other example(s) herein, further comprising: generating or causing to generate one of downlink control information (DCI), a Media Access Control (MAC) Control Element (CE), or another RRC message to indicate the one or more SSBs or the one or more CSI-RSs to be used to report the new Tx beam information; and transmitting or causing to transmit the generated one of the DCI, the MAC CE, or the other RRC message to the UE.

Example 30 includes the method of examples 25, 28, and/or some other example(s) herein, wherein the candidateBeamRSList IE is to include one or more SSBs and/or one or more CSI-RSs, and the method comprises: receiving the new Tx beam information in uplink control information (UCI) or a MAC CE, the new Tx beam information including a Candidate Beam Resource Indicator (CBRI) indicating one SSB resource or one CSI-RS resource included in the candidateBeamRSList IE.

Example 31 includes the method of example 30 and/or some other example(s) herein, wherein the CBRI is a default CBRI value when no new beam is identified.

Example 32 includes the method of examples 30-31 and/or some other example(s) herein, wherein the new Tx beam information includes a one bit indicator plus a reference signal resource indicator, wherein the reference signal resource indicator is an SSBRI or CRI, and the one bit indicator is to indicate a type of the reference signal resource indicator.

Example 33 includes the method of examples 26-32 and/or some other example(s) herein, wherein the new Tx beam information is to indicate whether a new beam is identified based on SSB or CSI-RS.

Example 34 includes the method of example 33 and/or some other example(s) herein, wherein the RRC message is to indicate a first Physical Uplink Control Channel (PUCCH) or Physical Random Access Channel (PRACH) resource configured for SSB based new beam identification and a second PUCCH/PRACH resource configured for CSI-RS based new beam identification, and the method comprises: receiving the new Tx beam information over the first PUCCH/PRACH resource or the second PUCCH/PRACH resource.

Example 35 includes the method of examples 25-34 and/or some other example(s) herein, wherein the new Tx beam information is to indicate N Tx beams in UCI or a MAC-CE, wherein a value of N is configurable or predefined.

Example 36 includes the method of examples 25-35 and/or some other example(s) herein, wherein the new Tx beam information is included in the BFRQ.

Example 37 includes the method of example 36 and/or some other example(s) herein, wherein receipt of the BFRQ over a first PUCCH/PRACH resource indicates identification of one new beam, receipt of the BFRQ over a second PUCCH/PRACH resource indicates identification of two new beams, . . . , receipt of the BFRQ over an Nth PUCCH/PRACH resource indicates identification of N new beams.

Example 38 includes the method of examples 25-37 and/or some other example(s) herein, wherein the method is to be performed by a next generation NodeB (gNB).

Example 39 may include an apparatus comprising means to perform one or more elements of a method described in or related to any of examples 1-38, or any other method or process described herein.

Example 40 may include one or more non-transitory computer-readable media comprising instructions to cause an electronic device, upon execution of the instructions by one or more processors of the electronic device, to perform one or more elements of a method described in or related to any of examples 1-38, or any other method or process described herein.

Example 41 may include an apparatus comprising logic, modules, or circuitry to perform one or more elements of a method described in or related to any of examples 1-38, or any other method or process described herein.

Example 42 may include a method, technique, or process as described in or related to any of examples 1-38, or portions or parts thereof.

Example 43 may include an apparatus comprising: one or more processors and one or more computer-readable media comprising instructions that, when executed by the one or more processors, cause the one or more processors to perform the method, techniques, or process as described in or related to any of examples 1-38, or portions thereof.

Example 44 may include a signal as described in or related to any of examples 1-38, or portions or parts thereof.

Example 45 may include a signal in a wireless network as shown and described herein.

Example 46 may include a method of communicating in a wireless network as shown and described herein.

Example 47 may include a system for providing wireless communication as shown and described herein.

Example 48 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Systems and Implementations

Figure 17:
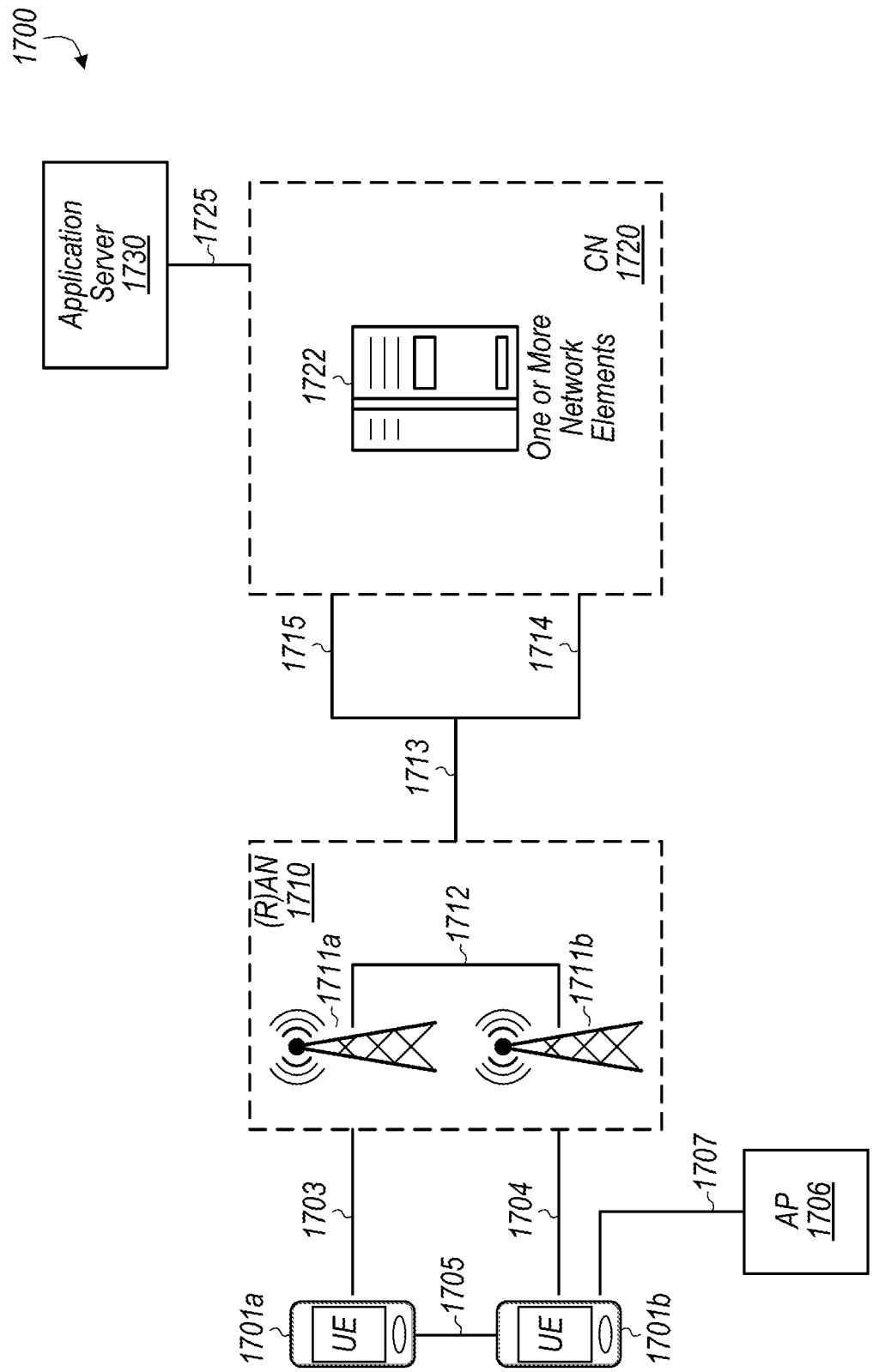
FIG. 17 illustrates an example architecture of a wireless communication system, according to some embodiments.

FIG. 17 illustrates an example architecture of a system 1700 of a network, in accordance with various embodiments. The following description is provided for an example system 1700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 17, the system 1700 includes UE 1701a and UE 1701b (collectively referred to as "UEs 1701" or "UE 1701"). In this example, UEs 1701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some of these embodiments, the UEs 1701 may be NB-IoT UEs 1701. NB-IoT provides access to network services using physical layer optimized for very low power consumption (e.g., full carrier BW is 180 kHz, subcarrier spacing can be 3.75 kHz or 15 kHz). A number of E-UTRA functions are not used for NB-IoT and need not be supported by RAN nodes 1711 and UEs 1701 only using NB-IoT. Examples of such E-UTRA functions may include inter-RAT mobility, handover, measurement reports, public warning functions, GBR, CSG, support of HeNBs, relaying, carrier aggregation, dual connectivity, NAICS, MBMS, real-time services, interference avoidance for in-device coexistence, RAN assisted WLAN interworking, sidelink communication/discovery, MDT, emergency call, CS fallback, self-configuration/self-optimization, among others. For NB-IoT operation, a UE 1701 operates in the DL using 12 sub-carriers with a sub-carrier BW of 15 kHz, and in the UL using a single sub-carrier with a sub-carrier BW of either 3.75 kHz or 15 kHz or alternatively 3, 6 or 12 sub-carriers with a sub-carrier BW of 15 kHz.

In various embodiments, the UEs 1701 may be MF UEs 1701. MF UEs 1701 are LTE-based UEs 1701 that operate (exclusively) in unlicensed spectrum. This unlicensed spectrum is defined in MF specifications provided by the MulteFire Forum, and may include, for example, 1.9 GHz (Japan), 3.5 GHz, and 5 GHz. MultiFire is tightly aligned with 3GPP standards and builds on elements of the 3GPP specifications for LAA/eLAA, augmenting standard LTE to operate in global unlicensed spectrum. In some embodiments, LBT may be implemented to coexist with other unlicensed spectrum networks, such as WiFi, other LAA networks, or the like. In various embodiments, some or all UEs 1701 may be NB-IoT UEs 1701 that operate according to MF. In such embodiments, these UEs 1701 may be referred to as "MF NB-IoT UEs 1701," however, the term "NB-IoT UE 1701" may refer to an "MF UE 1701" or an "MF and NB-IoT UE 1701" unless stated otherwise. Thus, the terms "NB-IoT UE 1701," "MF UE 1701," and "MF NB-IoT UE 1701" may be used interchangeably throughout the present disclosure.

The UEs 1701 may be configured to connect, for example, communicatively couple, with an or RAN 1710. In embodiments, the RAN 1710 may be an NG RAN or a 5G RAN, an E-UTRAN, an MF RAN, or a legacy RAN, such as a UTRAN or GERAN. As used herein, the term "NG RAN" or the like may refer to a RAN 1710 that operates in an NR or 5G system 1700, the term "E-UTRAN" or the like may refer to a RAN 1710 that operates in an LTE or 4G system 1700, and the term "MF RAN" or the like refers to a RAN 1710 that operates in an MF system 100. The UEs 1701 utilize connections (or channels) 1703 and 1704, respectively, each of which comprises a physical communications interface or layer (discussed in further detail below). The connections 103 and 104 may include several different physical DL channels and several different physical UL channels. As examples, the physical DL channels include the PDSCH, PMCH, PDCCH, EPDCCH, MPDCCH, R-PDCCH, SPDCCH, PBCH, PCFICH, PHICH, NPBCH, NPDCCH, NPDSCH, and/or any other physical DL channels mentioned herein. As examples, the physical UL channels include the PRACH, PUSCH, PUCCH, SPUCCH, NPRACH, NPUSCH, and/or any other physical UL channels mentioned herein.

In this example, the connections 1703 and 1704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1701 may directly exchange communication data via a ProSe interface 1705. The ProSe interface 1705 may alternatively be referred to as a SL interface 1705 and may comprise one or more physical and/or logical channels, including but not limited to the PSCCH, PSSCH, PSDCH, and PSBCH.

The UE 1701b is shown to be configured to access an AP 1706 (also referred to as "WLAN node 1706," "WLAN 1706," "WLAN Termination 1706," "WT 1706" or the like) via connection 1707. The connection 1707 can comprise a local wireless connection, such as a connection consistent with any IEEE 802.11 protocol, wherein the AP 1706 would comprise a wireless fidelity (Wi-Fi®) router. In this example, the AP 1706 is shown to be connected to the Internet without connecting to the core network of the wireless system (described in further detail below). In various embodiments, the UE 1701b, RAN 1710, and AP 1706 may be configured to utilize LWA operation and/or LWIP operation. The LWA operation may involve the UE 1701b in RRC_CONNECTED being configured by a RAN node 1711a-b to utilize radio resources of LTE and WLAN. LWIP operation may involve the UE 1701b using WLAN radio resources (e.g., connection 1707) via IPsec protocol tunneling to authenticate and encrypt packets (e.g., IP packets) sent over the connection 1707. IPsec tunneling may include encapsulating the entirety of original IP packets and adding a new packet header, thereby protecting the original header of the IP packets.

The RAN 1710 can include one or more AN nodes or RAN nodes 1711a and 1711b (collectively referred to as "RAN nodes 1711" or "RAN node 1711") that enable the connections 1703 and 1704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, MF-APs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1711 that operates in an NR or 5G system 1700 (e.g., a gNB), and the term "E-UTRAN node" or the like may refer to a RAN node 1711 that operates in an LTE or 4G system 1700 (e.g., an eNB). According to various embodiments, the RAN nodes 1711 may be implemented as one or more of a dedicated physical device such as a macrocell base station, and/or a low power (LP) base station for providing femtocells, picocells or other like cells having smaller coverage areas, smaller user capacity, or higher BW compared to macrocells.

In some embodiments, all or parts of the RAN nodes 1711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1711; a MAC/PHY split wherein RRC, PDCP, RLC, and MAC layers are operated by the CRAN/vBBUP and the PHY layer is operated by individual RAN nodes 1711; or a "lower PHY" split wherein RRC, PDCP, RLC, MAC layers and upper portions of the PHY layer are operated by the CRAN/vBBUP and lower portions of the PHY layer are operated by individual RAN nodes 1711. This virtualized framework allows the freed-up processor cores of the RAN nodes 1711 to perform other virtualized applications. In some implementations, an individual RAN node 1711 may represent individual gNB-DUs that are connected to a gNB-CU via individual F1 interfaces (not shown by FIG. 17). In these implementations, the gNB-DUs may include one or more remote radio heads or RFEMs (see e.g., FIG. 20), and the gNB-CU may be operated by a server that is located in the RAN 1710 (not shown) or by a server pool in a similar manner as the CRAN/vBBUP. Additionally or alternatively, one or more of the RAN nodes 1711 may be next generation eNBs (ng-eNBs), which are RAN nodes that provide E-UTRA user plane and control plane protocol terminations toward the UEs 1701, and are connected to a 5GC (e.g., CN 1920 of FIG. 19) via an NG interface (discussed infra). In MF implementations, the MF-APs 1711 are entities that provide MulteFire radio services, and may be similar to eNBs 1711 in an 3GPP architecture. Each MF-AP 1711 includes or provides one or more MF cells.

In V2X scenarios one or more of the RAN nodes 1711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1701 (vUEs 1701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1711 can terminate the air interface protocol and can be the first point of contact for the UEs 1701. In some embodiments, any of the RAN nodes 1711 can fulfill various logical functions for the RAN 1710 including, but not limited to, radio network controller (RNC) functions such as radio bearer management, uplink and downlink dynamic radio resource management and data packet scheduling, and mobility management.

In embodiments, the UEs 1701 can be configured to communicate using OFDM communication signals with each other or with any of the RAN nodes 1711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal sub carriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In LTE implementations, a DL resource grid can be used for DL transmissions from any of the RAN nodes 1711 to the UEs 1701, while UL transmissions from the UEs 1701 to RAN nodes 1711 can utilize a suitable UL resource grid in a similar manner. These resource grids may refer to time-frequency grids, and indicate physical resource in the DL or UL in each slot. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. The duration of the resource grid in the time domain corresponds to one slot in a radio frame. The resource grids comprises a number of RBs, which describe the mapping of certain physical channels to REs. In the frequency domain, this may represent the smallest quantity of resources that currently can be allocated. Each RB comprises a collection of REs. An RE is the smallest time-frequency unit in a resource grid. Each RE is uniquely identified by the index pair (k,l) in a slot where k=0, ..., $N_{RB}^{DL}N_{sc}^{RB}-1$ and l=0, ..., $N_{symb}^{DL}-1$ are the indices in the frequency and time domains, respectively. RE (k,l) on antenna port p corresponds to the complex value $a_{k,l}^{(p)}$. An antenna port is defined such that the channel over which a symbol on the antenna port is conveyed can be inferred from the channel over which another symbol on the same antenna port is conveyed. There is one resource grid per antenna port. The set of antenna ports supported depends on the reference signal configuration in the cell, and these aspects are discussed in more detail in 3GPP TS 36.211.

In NR/5G implementations, DL and UL transmissions are organized into frames with 10 ms durations each of which includes ten 1 ms subframes. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with half-frame 0 comprising subframes 0-4 and half-frame 1 comprising subframes 5-9. There is one set of frames in the UL and one set of frames in the DL on a carrier. Uplink frame number i for transmission from the UE shall start $T_{TA}=(N_{TA}+N_{TA,offset})T_c$ before the start of the corresponding downlink frame at the UE where $N_{TA,offset}$ is given by 3GPP TS 38.213. For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by tables 4.3.2-1 and 4.3.2-2 of 3GPP TS 38.211. The start of slot $n_s^\mu$ in a subframe is aligned in time with the start of OFDM symbol $n_s^\mu N_{symb}^{slot}$ in the same subframe. OFDM symbols in a slot can be classified as 'downlink', 'flexible', or 'uplink', where downlink transmissions only occur in 'downlink' or 'flexible' symbols and the UEs 1701 only transmit in 'uplink' or 'flexible' symbols.

For each numerology and carrier, a resource grid of $N_{grid,x}^{size,\mu}N_{sc}^{RB}$ subcarriers and $N_{symb}^{subframe,\mu}$ OFDM symbols is defined, starting at common RB $N_{grid}^{start,\mu}$ indicated by higher-layer signaling. There is one set of resource grids per transmission direction (e.g., uplink or downlink) with the subscript x set to DL for downlink and x set to UL for uplink. There is one resource grid for a given antenna port p, subcarrier spacing configuration μ, and transmission direction (e.g., downlink or uplink).

An RB is defined as $N_{sc}^{RB}=12$ consecutive subcarriers in the frequency domain. Common RBs are numbered from 0 and upwards in the frequency domain for subcarrier spacing configuration μ. The center of subcarrier 0 of common resource block 0 for subcarrier spacing configuration μ coincides with 'point A'. The relation between the common resource block number $n_{CRB}^\mu$ in the frequency domain and resource elements (k,l) for subcarrier spacing configuration μ is given by $$n_{CRB}^\mu = \left\lfloor \frac{k}{N_{sc}^{RB}} \right\rfloor$$

where k is defined relative to point A such that k=0 corresponds to the subcarrier centered around point A. Point A serves as a common reference point for resource block grids and is obtained from offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2; and absoluteFrequencyPointA for all other cases where absoluteFrequencyPointA represents the frequency-location of point A expressed as in ARFCN.

A PRB for subcarrier configuration μ are defined within a BWP and numbered from 0 to $N_{BWP,i}^{size}-1$ where i is the number of the BWP. The relation between the physical resource block $n_{PRB}^\mu$ in BWPi and the common RB $n_{CRB}^\mu$ is given by $n_{CRB}^\mu = n_{PRB}^\mu + N_{BWP,i}^{start,\mu}$ where $N_{BWP,i}^{start,\mu}$ is the common RB where BWP starts relative to common RB 0. VRBs are defined within a BWP and numbered from 0 to $N_{BWP,i}^{size}-1$ where i is the number of the BWP.

Each element in the resource grid for antenna port p and subcarrier spacing configuration μ is called an RE and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $a_{k,l}^{(p,\mu)}$. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A BWP is a subset of contiguous common resource blocks defined in subclause 4.4.4.3 of 3GPP TS 38.211 for a given numerology $\mu_i$ in BWP i on a given carrier. The starting position $N_{BWP,i}^{start,\mu}$ and the number of resource blocks $N_{BWP,i}^{size,\mu}$ in a BWP shall fulfil $N_{grid,x}^{start,\mu} \leq N_{BWP,i}^{start,\mu} < N_{grid,x}^{start,\mu}+N_{grid,x}^{size,\mu}$ and $N_{grid,x}^{start,\mu} < N_{BWP,i}^{start,\mu}+N_{BWP,i}^{size,\mu} \leq N_{grid,x}^{start,\mu}+N_{grid,x}^{size,\mu}$, respectively. Configuration of a BWP is described in clause 12 of 3GPP TS 38.213. The UEs 1701 can be configured with up to four BWPs in the DL with a single DL BWP being active at a given time. The UEs 1701 are not expected to receive PDSCH, PDCCH, or CSI-RS (except for RRM) outside an active BWP. The UEs 1701 can be configured with up to four BWPs in the UL with a single UL BWP being active at a given time. If a UE 1701 is configured with a supplementary UL, the UE 1701 can be configured with up to four additional BWPs in the supplementary UL with a single supplementary UL BWP being active at a given time. The UEs 1701 do not transmit PUSCH or PUCCH outside an active BWP, and for an active cell, the UEs do not transmit SRS outside an active BWP.

An NB is defined as six non-overlapping consecutive PRBs in the frequency domain. The total number of DL NBs in the DL transmission BW configured in the cell is given by $$N_{NB}^{DL} = \left\lfloor \frac{N_{RB}^{DL}}{6} \right\rfloor.$$

The NBs are numbered $n_{NB}=0, \ldots, N_{NB}^{DL}-1$ in order of increasing PRB number where narrowband is comprises PRB indices:

$$\begin{cases} 6n_{NB} + i_0 + i & \text{if } N_{RB}^{UL} \bmod 2 = 0 \\ 6n_{NB} + i_0 + i & \text{if } N_{RB}^{UL} \bmod 2 = 1 \text{ and } n_{NB} < N_{NB}^{UL}/2 \\ 6n_{NB} + i_0 + i + 1 & \text{if } N_{RB}^{UL} \bmod 2 = 1 \text{ and } n_{NB} \geq N_{NB}^{UL}/2 \end{cases}$$

$$i = 0, 1, \ldots, 5 \text{ where } i_0 = \left\lfloor \frac{N_{RB}^{UL}}{2} \right\rfloor - \frac{6 N_{NB}^{UL}}{2}.$$

If $N_{NB}^{UL} \geq 4$, a wideband is defined as four non-overlapping narrowbands in the frequency domain. The total number of uplink widebands in the uplink transmission bandwidth configured in the cell is given by $$N_{WB}^{UL} = \left\lfloor \frac{N_{NB}^{UL}}{4} \right\rfloor$$

and the widebands are numbered $n_{WB}=0, \ldots, N_{WB}^{UL}-1$ in order of increasing narrowband number where wideband $n_{WB}$ is composed of narrowband indices $4n_{WB}+i$ where $i=0, 1, \ldots, 3$. If $N_{NB}^{UL} < 4$, then $N_{WB}^{UL}=1$ and the single wideband is composed of the $N_{NB}^{UL}$ non-overlapping narrowband(s).

There are several different physical channels and physical signals that are conveyed using RBs and/or individual REs. A physical channel corresponds to a set of REs carrying information originating from higher layers. Physical UL channels may include PUSCH, PUCCH, PRACH, and/or any other physical UL channel(s) discussed herein, and physical DL channels may include PDSCH, PBCH, PDCCH, and/or any other physical DL channel(s) discussed herein. A physical signal is used by the physical layer (e.g., PHY 2310 of FIG. 23) but does not carry information originating from higher layers. Physical UL signals may include DMRS, PTRS, SRS, and/or any other physical UL signal(s) discussed herein, and physical DL signals may include DMRS, PTRS, CSI-RS, PSS, SSS, and/or any other physical DL signal(s) discussed herein.

The PDSCH carries user data and higher-layer signaling to the UEs 1701. Typically, DL scheduling (assigning control and shared channel resource blocks to the UE 1701 within a cell) may be performed at any of the RAN nodes 1711 based on channel quality information fed back from any of the UEs 1701. The downlink resource assignment information may be sent on the PDCCH used for (e.g., assigned to) each of the UEs 1701. The PDCCH uses CCEs to convey control information (e.g., DCI), and a set of CCEs may be referred to a "control region." Control channels are formed by aggregation of one or more CCEs, where different code rates for the control channels are realized by aggregating different numbers of CCEs. The CCEs are numbered from 0 to $N_{CCE,k}-1$, where $N_{CCE,k}-1$ is the number of CCEs in the control region of subframe k. Before being mapped to REs, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical REs known as REGs. Four QPSK symbols may be mapped to each REG. The PDCCH can be transmitted using one or more CCEs, depending on the size of the DCI and the channel condition. There can be four or more different PDCCH formats defined with different numbers of CCEs (e.g., aggregation level, L=1, 2, 4, or 8 in LTE and L=1, 2, 4, 8, or 16 in NR). The UE 1701 monitors a set of PDCCH candidates on one or more activated serving cells as configured by higher layer signaling for control information (e.g., DCI), where monitoring implies attempting to decode each of the PDCCHs (or PDCCH candidates) in the set according to all the monitored DCI formats (e.g., DCI formats 0 through 6-2 as discussed in section 5.3.3 of 3GPP TS 38.212, DCI formats 0_0 through 2_3 as discussed in section 7.3 of 3GPP TS 38.212, or the like). The UEs 1701 monitor (or attempt to decode) respective sets of PDCCH candidates in one or more configured monitoring occasions according to the corresponding search space configurations. A DCI transports DL, UL, or SL scheduling information, requests for aperiodic CQI reports, LAA common information, notifications of MCCH change, UL power control commands for one cell and/or one RNTI, notification of a group of UEs 1701 of a slot format, notification of a group of UEs of the PRB(s) and OFDM symbol(s) where UE may assume no transmission is intended for the UE, TPC commands for PUCCH and PUSCH, and/or TPC commands for PUCCH and PUSCH. The DCI coding steps are discussed in 3GPP TS 38.212.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

As alluded to previously, the PDCCH can be used to schedule DL transmissions on PDSCH and UL transmissions on PUSCH, wherein the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission(s) with configured grant; activation and deactivation of PDSCH semi-persistent transmission; notifying one or more UEs 1701 of a slot format; notifying one or more UEs 1701 of the PRB(s) and OFDM symbol(s) where a UE 1701 may assume no transmission is intended for the UE; transmission of TPC commands for PUCCH and PUSCH; transmission of one or more TPC commands for SRS transmissions by one or more UEs 1701; switching an active BWP for a UE 1701; and initiating a random access procedure.

In NR implementations, the UEs 1701 monitor (or attempt to decode) respective sets of PDCCH candidates in one or more configured monitoring occasions in one or more configured CORESETs according to the corresponding search space configurations. A CORESET may include a set of PRBs with a time duration of 1 to 3 OFDM symbols. A CORESET may additionally or alternatively include $N_{RB}^{CORESET}$ RBs in the frequency domain and $N_{symb}^{CORESET} \in \{1, 2, 3\}$ symbols in the time domain. A CORESET includes six REGs numbered in increasing order in a time-first manner, wherein an REG equals one RB during one OFDM symbol. The UEs 1701 can be configured with multiple CORESETS where each CORESET is associated with one CCE-to-REG mapping only. Interleaved and non-interleaved CCE-to-REG mapping are supported in a CORESET. Each REG carrying a PDCCH carries its own DMRS.

According to various embodiments, the UEs 1701 and the RAN nodes 1711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1701 and the RAN nodes 1711 may operate using LAA, eLAA, and/or feLAA mechanisms. In these implementations, the UEs 1701 and the RAN nodes 1711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1701 RAN nodes 1711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1701, AP 1706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the BWs of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The RAN nodes 1711 may be configured to communicate with one another via interface 1712. In embodiments where the system 1700 is an LTE system (e.g., when CN 1720 is an EPC 1820 as in FIG. 18), the interface 1712 may be an X2 interface 1712. The X2 interface may be defined between two or more RAN nodes 1711 (e.g., two or more eNBs and the like) that connect to EPC 1720, and/or between two eNBs connecting to EPC 1720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1701 from an SeNB for user data; information of PDCP PDUs that were not delivered to a UE 1701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality. In embodiments where the system 100 is an MF system (e.g., when CN 1720 is an NHCN 1720), the interface 1712 may be an X2 interface 1712. The X2 interface may be defined between two or more RAN nodes 1711 (e.g., two or more MF-APs and the like) that connect to NHCN 1720, and/or between two MF-APs connecting to NHCN 1720. In these embodiments, the X2 interface may operate in a same or similar manner as discussed previously.

In embodiments where the system 1700 is a 5G or NR system (e.g., when CN 1720 is an 5GC 1920 as in FIG. 19), the interface 1712 may be an Xn interface 1712. The Xn interface is defined between two or more RAN nodes 1711 (e.g., two or more gNBs and the like) that connect to 5GC 1720, between a RAN node 1711 (e.g., a gNB) connecting to 5GC 1720 and an eNB, and/or between two eNBs connecting to 5GC 1720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1701 in a connected mode (e.g., CM-CONNECTED) including functionality to manage the UE mobility for connected mode between one or more RAN nodes 1711. The mobility support may include context transfer from an old (source) serving RAN node 1711 to new (target) serving RAN node 1711; and control of user plane tunnels between old (source) serving RAN node 1711 to new (target) serving RAN node 1711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1710 is shown to be communicatively coupled to a core network—in this embodiment, CN 1720. The CN 1720 may comprise a plurality of network elements 1722, which are configured to offer various data and telecommunications services to customers/subscribers (e.g., users of UEs 1701) who are connected to the CN 1720 via the RAN 1710. The components of the CN 1720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1720 may be referred to as a network slice, and a logical instantiation of a portion of the CN 1720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1730 may be an element offering applications that use IP bearer resources with the core network (e.g., UMTS PS domain, LTE PS data services, etc.). The application server 1730 can also be configured to support one or more communication services (e.g., VoIP sessions, PTT sessions, group communication sessions, social networking services, etc.) for the UEs 1701 via the EPC 1720.

In embodiments, the CN 1720 may be a 5GC (referred to as "5GC 1720" or the like), and the RAN 1710 may be connected with the CN 1720 via an NG interface 1713. In embodiments, the NG interface 1713 may be split into two parts, an NG user plane (NG-U) interface 1714, which carries traffic data between the RAN nodes 1711 and a UPF, and the S1 control plane (NG-C) interface 1715, which is a signaling interface between the RAN nodes 1711 and AMFs. Embodiments where the CN 1720 is a 5GC 1720 are discussed in more detail with regard to FIG. 19.

In embodiments, the CN 1720 may be a 5G CN (referred to as "5GC 1720" or the like), while in other embodiments, the CN 1720 may be an EPC). Where CN 1720 is an EPC (referred to as "EPC 1720" or the like), the RAN 1710 may be connected with the CN 1720 via an S1 interface 1713. In embodiments, the S1 interface 1713 may be split into two parts, an S1 user plane (S1-U) interface 1714, which carries traffic data between the RAN nodes 1711 and the S-GW, and the S1-MME interface 1715, which is a signaling interface between the RAN nodes 1711 and MMES.

In embodiments where the CN 1720 is an MF NHCN 1720, the one or more network elements 1722 may include or operate one or more NH-MMES, local AAA proxies, NH-GWs, and/or other like MF NHCN elements. The NH-MME provides similar functionality as an MME in EPC 1720. A local AAA proxy is an AAA proxy that is part of an NHN that provides AAA functionalities required for interworking with PSP AAA and 3GPP AAAs. A PSP AAA is an AAA server (or pool of servers) using non-USIM credentials that is associated with a PSP, and may be either internal or external to the NHN, and the 3GPP AAA is discussed in more detail in 3GPP TS 23.402. The NH-GW provides similar functionality as a combined S-GW/P-GW for non-EPC routed PDN connections. For EPC Routed PDN connections, the NHN-GW provides similar functionality as the S-GW discussed previously in interactions with the MF-APs over the S1 interface 1713 and is similar to the TWAG in interactions with the PLMN PDN-GWs over the S2a interface. In some embodiments, the MF APs 1711 may connect with the EPC 1720 discussed previously. Additionally, the RAN 1710 (referred to as an "MF RAN 1710" or the like) may be connected with the NHCN 1720 via an S1 interface 1713. In these embodiments, the S1 interface 1713 may be split into two parts, the S1-U interface 1714 that carries traffic data between the RAN nodes 1711 (e.g., the "MF-APs 1711") and the NH-GW, and the S1-MME-N interface 1715, which is a signaling interface between the RAN nodes 1711 and NH-MMEs. The S1-U interface 1714 and the S1-MME-N interface 1715 have the same or similar functionality as the S1-U interface 1714 and the S1-MME interface 1715 of the EPC 1720 discussed herein.

Figure 18:
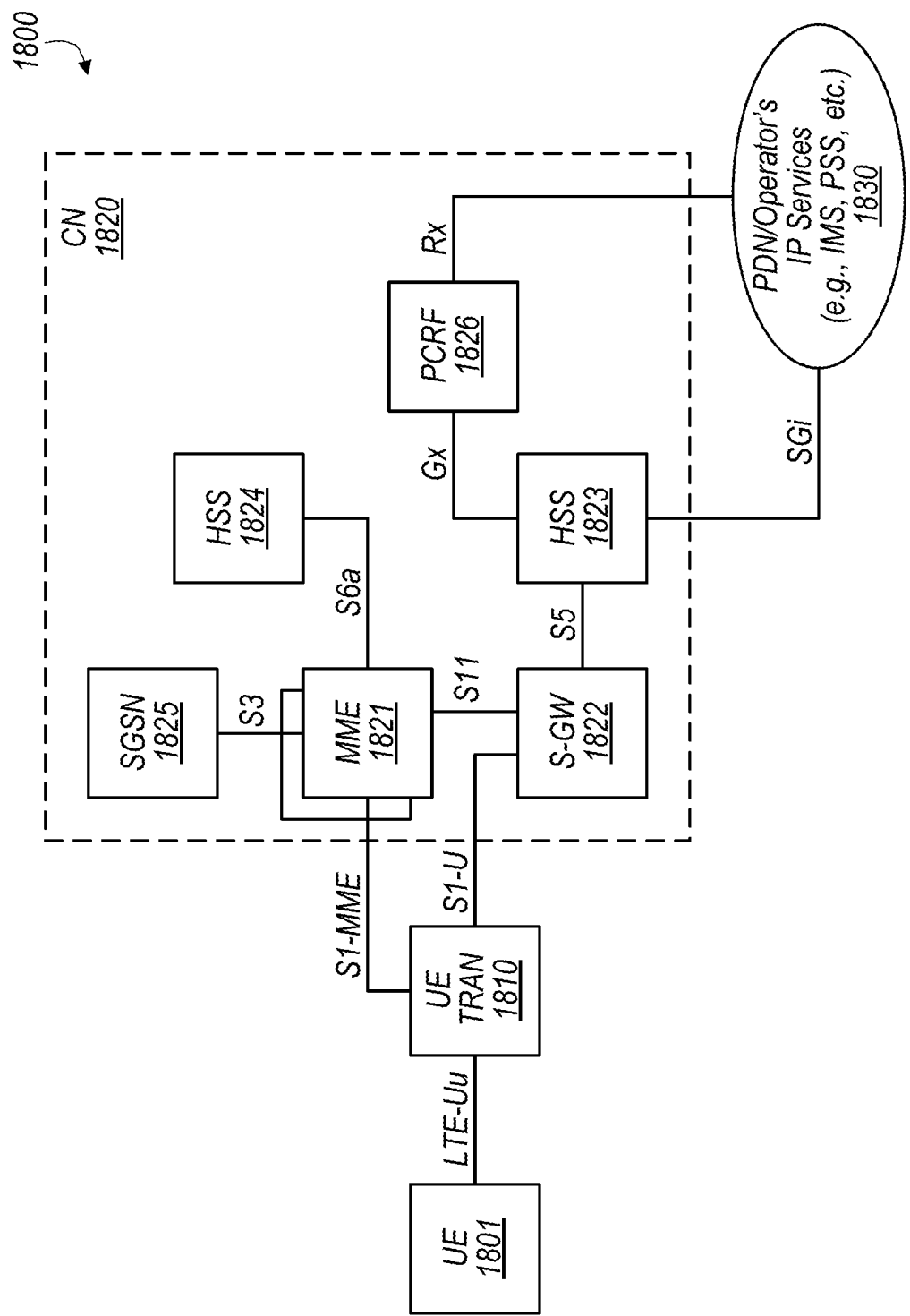
FIG. 18 illustrates an example architecture of a system including a first cellular core network, according to some embodiments

FIG. 18 illustrates an example architecture of a system 1800 including a first CN 1820, in accordance with various embodiments. In this example, system 1800 may implement the LTE standard wherein the CN 1820 is an EPC 1820 that corresponds with CN 1720 of FIG. 17. Additionally, the UE 1801 may be the same or similar as the UEs 1701 of FIG. 17, and the E-UTRAN 1810 may be a RAN that is the same or similar to the RAN 1710 of FIG. 17, and which may include RAN nodes 1711 discussed previously. The CN 1820 may comprise MMES 1821, an S-GW 1822, a P-GW 1823, a HSS 1824, and a SGSN 1825.

The MMES 1821 may be similar in function to the control plane of legacy SGSN, and may implement MM functions to keep track of the current location of a UE 1801. The MMES 1821 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 1801, provide user identity confidentiality, and/or perform other like services to users/subscribers. Each UE 1801 and the MME 1821 may include an MM or EMM sublayer, and an MM context may be established in the UE 1801 and the MME 1821 when an attach procedure is successfully completed. The MM context may be a data structure or database object that stores MM-related information of the UE 1801. The MMES 1821 may be coupled with the HSS 1824 via an Sha reference point, coupled with the SGSN 1825 via an S3 reference point, and coupled with the S-GW 1822 via an S11 reference point.

The SGSN 1825 may be a node that serves the UE 1801 by tracking the location of an individual UE 1801 and performing security functions. In addition, the SGSN 1825 may perform Inter-EPC node signaling for mobility between 2G/3G and E-UTRAN 3GPP access networks; PDN and S-GW selection as specified by the MMEs 1821; handling of UE 1801 time zone functions as specified by the MMEs 1821; and MME selection for handovers to E-UTRAN 3GPP access network. The S3 reference point between the MMEs 1821 and the SGSN 1825 may enable user and bearer information exchange for inter-3GPP access network mobility in idle and/or active states.

The HSS 1824 may comprise a database for network users, including subscription-related information to support the network entities' handling of communication sessions. The EPC 1820 may comprise one or several HSSs 1824, depending on the number of mobile subscribers, on the capacity of the equipment, on the organization of the network, etc. For example, the HSS 1824 can provide support for routing/roaming, authentication, authorization, naming/addressing resolution, location dependencies, etc. An Sha reference point between the HSS 1824 and the MMEs 1821 may enable transfer of subscription and authentication data for authenticating/authorizing user access to the EPC 1820 between HSS 1824 and the MMEs 1821.

The S-GW 1822 may terminate the S1 interface 1713 ("S1-U" in FIG. 18) toward the RAN 1810, and routes data packets between the RAN 1810 and the EPC 1820. In addition, the S-GW 1822 may be a local mobility anchor point for inter-RAN node handovers and also may provide an anchor for inter-3GPP mobility. Other responsibilities may include lawful intercept, charging, and some policy enforcement. The S11 reference point between the S-GW 1822 and the MMEs 1821 may provide a control plane between the MMEs 1821 and the S-GW 1822. The S-GW 1822 may be coupled with the P-GW 1823 via an S5 reference point.

The P-GW 1823 may terminate an SGi interface toward a PDN 1830. The P-GW 1823 may route data packets between the EPC 1820 and external networks such as a network including the application server 1730 (alternatively referred to as an "AF") via an IP interface 1725 (see e.g., FIG. 17). In embodiments, the P-GW 1823 may be communicatively coupled to an application server (application server 1730 of FIG. 17 or PDN 1830 in FIG. 18) via an IP communications interface 1725 (see, e.g., FIG. 17). The S5 reference point between the P-GW 1823 and the S-GW 1822 may provide user plane tunneling and tunnel management between the P-GW 1823 and the S-GW 1822. The S5 reference point may also be used for S-GW 1822 relocation due to UE 1801 mobility and if the S-GW 1822 needs to connect to a non-collocated P-GW 1823 for the required PDN connectivity. The P-GW 1823 may further include a node for policy enforcement and charging data collection (e.g., PCEF (not shown)). Additionally, the SGi reference point between the P-GW 1823 and the packet data network (PDN) 1830 may be an operator external public, a private PDN, or an intra operator packet data network, for example, for provision of IMS services. The P-GW 1823 may be coupled with a PCRF 1826 via a Gx reference point.

PCRF 1826 is the policy and charging control element of the EPC 1820. In a non-roaming scenario, there may be a single PCRF 1826 in the Home Public Land Mobile Network (HPLMN) associated with a UE 1801's Internet Protocol Connectivity Access Network (IP-CAN) session. In a roaming scenario with local breakout of traffic, there may be two PCRFs associated with a UE 1801's IP-CAN session, a Home PCRF (H-PCRF) within an HPLMN and a Visited PCRF (V-PCRF) within a Visited Public Land Mobile Network (VPLMN). The PCRF 1826 may be communicatively coupled to the application server 1830 via the P-GW 1823. The application server 1830 may signal the PCRF 1826 to indicate a new service flow and select the appropriate QoS and charging parameters. The PCRF 1826 may provision this rule into a PCEF (not shown) with the appropriate TFT and QCI, which commences the QoS and charging as specified by the application server 1830. The Gx reference point between the PCRF 1826 and the P-GW 1823 may allow for the transfer of QoS policy and charging rules from the PCRF 1826 to PCEF in the P-GW 1823. An Rx reference point may reside between the PDN 1830 (or "AF 1830") and the PCRF 1826.

Figure 19:
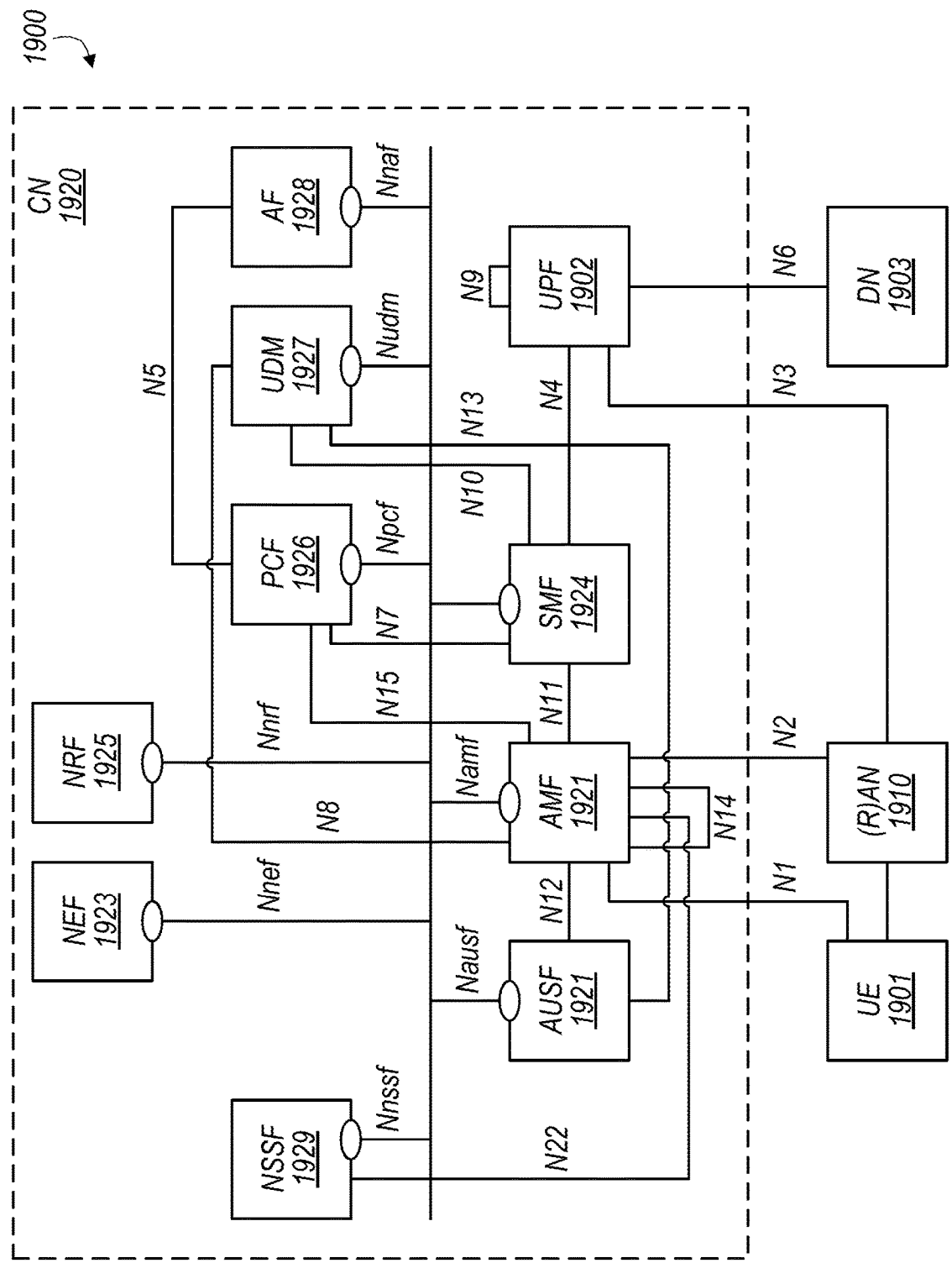
FIG. 19 illustrates an example architecture of a system including a second cellular core network, according to some embodiments.

FIG. 19 illustrates an architecture of a system 1900 including a second CN 1920 in accordance with various embodiments. The system 1900 is shown to include a UE 1901, which may be the same or similar to the UEs 1701 and UE 1801 discussed previously; a (R)AN 1910, which may be the same or similar to the RAN 1710 and RAN 1810 discussed previously, and which may include RAN nodes 1711 discussed previously; and a DN 1903, which may be, for example, operator services, Internet access or 3rd party services; and a 5GC 1920. The 5GC 1920 may include an AUSF 1922; an AMF 1921; a SMF 1924; a NEF 1923; a PCF 1926; a NRF 1925; a UDM 1927; an AF 1928; a UPF 1902; and a NSSF 1929.

The UPF 1902 may act as an anchor point for intra-RAT and inter-RAT mobility, an external PDU session point of interconnect to DN 1903, and a branching point to support multi-homed PDU session. The UPF 1902 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 1902 may include an uplink classifier to support routing traffic flows to a data network. The DN 1903 may represent various network operator services, Internet access, or third party services. DN 1903 may include, or be similar to, application server 1730 discussed previously. The UPF 1902 may interact with the SMF 1924 via an N4 reference point between the SMF 1924 and the UPF 1902.

The AUSF 1922 may store data for authentication of UE 1901 and handle authentication-related functionality. The AUSF 1922 may facilitate a common authentication framework for various access types. The AUSF 1922 may communicate with the AMF 1921 via an N12 reference point between the AMF 1921 and the AUSF 1922; and may communicate with the UDM 1927 via an N13 reference point between the UDM 1927 and the AUSF 1922. Additionally, the AUSF 1922 may exhibit an Nausf service-based interface.

The AMF 1921 may be responsible for registration management (e.g., for registering UE 1901, etc.), connection management, reachability management, mobility management, and lawful interception of AMF-related events, and access authentication and authorization. The AMF 1921 may be a termination point for the an N11 reference point between the AMF 1921 and the SMF 1924. The AMF 1921 may provide transport for SM messages between the UE 1901 and the SMF 1924, and act as a transparent proxy for routing SM messages. AMF 1921 may also provide transport for SMS messages between UE 1901 and an SMSF (not shown by FIG. 19). AMF 1921 may act as SEAF, which may include interaction with the AUSF 1922 and the UE 1901, receipt of an intermediate key that was established as a result of the UE 1901 authentication process. Where USIM based authentication is used, the AMF 1921 may retrieve the security material from the AUSF 1922. AMF 1921 may also include a SCM function, which receives a key from the SEA that it uses to derive access-network specific keys. Furthermore, A M F 1921 may be a termination point of a RAN CP interface, which may include or be an N2 reference point between the (R)AN 1910 and the AMF 1921; and the AMF 1921 may be a termination point of NAS (N1) signalling, and perform NAS ciphering and integrity protection.

AMF 1921 may also support NAS signalling with a UE 1901 over an N3 IWF interface. The N3IWF may be used to provide access to untrusted entities. N3IWF may be a termination point for the N2 interface between the (R)AN 1910 and the AMF 1921 for the control plane, and may be a termination point for the N3 reference point between the (R)AN 1910 and the UPF 1902 for the user plane. As such, the AMF 1921 may handle N2 signalling from the SMF 1924 and the AMF 1921 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 1901 and AMF 1921 via an N1 reference point between the UE 1901 and the AMF 1921, and relay uplink and downlink user-plane packets between the UE 1901 and UPF 1902. The N3IWF also provides mechanisms for IPsec tunnel establishment with the UE 1901. The AMF 1921 may exhibit an Namf service-based interface, and may be a termination point for an N14 reference point between two AMFs 1921 and an N17 reference point between the AMF 1921 and a 5G-EIR (not shown by FIG. 19).

The UE 1901 may need to register with the AMF 1921 in order to receive network services. RM is used to register or deregister the UE 1901 with the network (e.g., AMF 1921), and establish a UE context in the network (e.g., AMF 1921). The UE 1901 may operate in an RM-REGISTERED state or an RM-DEREGISTERED state. In the RM-DEREGISTERED state, the UE 1901 is not registered with the network, and the UE context in AMF 1921 holds no valid location or routing information for the UE 1901 so the UE 1901 is not reachable by the AMF 1921. In the RM-REGISTERED state, the UE 1901 is registered with the network, and the UE context in AMF 1921 may hold a valid location or routing information for the UE 1901 so the UE 1901 is reachable by the AMF 1921. In the RM-REGISTERED state, the UE 1901 may perform mobility Registration Update procedures, perform periodic Registration Update procedures triggered by expiration of the periodic update timer (e.g., to notify the network that the UE 1901 is still active), and perform a Registration Update procedure to update UE capability information or to re-negotiate protocol parameters with the network, among others.

The AMF 1921 may store one or more RM contexts for the UE 1901, where each RM context is associated with a specific access to the network. The RM context may be a data structure, database object, etc. that indicates or stores, inter alia, a registration state per access type and the periodic update timer. The AMF 1921 may also store a 5GC MM context that may be the same or similar to the (E)MM context discussed previously. In various embodiments, the AMF 1921 may store a CE mode B Restriction parameter of the UE 1901 in an associated MM context or RM context. The AMF 1921 may also derive the value, when needed, from the UE's usage setting parameter already stored in the UE context (and/or MM/RM context).

CM may be used to establish and release a signaling connection between the UE 1901 and the AMF 1921 over the N1 interface. The signaling connection is used to enable NAS signaling exchange between the UE 1901 and the CN 1920, and comprises both the signaling connection between the UE and the AN (e.g., RRC connection or UE-N3IWF connection for non-3GPP access) and the N2 connection for the UE 1901 between the AN (e.g., RAN 1910) and the AMF 1921. The UE 1901 may operate in one of two CM states, CM-IDLE mode or CM-CONNECTED mode. When the UE 1901 is operating in the CM-IDLE state/mode, the UE 1901 may have no NAS signaling connection established with the AMF 1921 over the N1 interface, and there may be (R)AN 1910 signaling connection (e.g., N2 and/or N3 connections) for the UE 1901. When the UE 1901 is operating in the CM-CONNECTED state/mode, the UE 1901 may have an established NAS signaling connection with the AMF 1921 over the N1 interface, and there may be a (R)AN 1910 signaling connection (e.g., N2 and/or N3 connections) for the UE 1901. Establishment of an N2 connection between the (R)AN 1910 and the AMF 1921 may cause the UE 1901 to transition from CM-IDLE mode to CM-CONNECTED mode, and the UE 1901 may transition from the CM-CONNECTED mode to the CM-IDLE mode when N2 signaling between the (R)AN 1910 and the AMF 1921 is released.

The SMF 1924 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 1901 and a data network (DN) 1903 identified by a Data Network Name (DNN). PDU sessions may be established upon UE 1901 request, modified upon UE 1901 and 5GC 1920 request, and released upon UE 1901 and 5GC 1920 request using NAS SM signaling exchanged over the N1 reference point between the UE 1901 and the SMF 1924. Upon request from an application server, the 5GC 1920 may trigger a specific application in the UE 1901. In response to receipt of the trigger message, the UE 1901 may pass the trigger message (or relevant parts/information of the trigger message) to one or more identified applications in the UE

1901. The identified application(s) in the UE 1901 may establish a PDU session to a specific DNN. The SMF 1924 may check whether the UE 1901 requests are compliant with user subscription information associated with the UE 1901. In this regard, the SMF 1924 may retrieve and/or request to receive update notifications on SMF 1924 level subscription data from the UDM 1927.

The SMF 1924 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 1924 may be included in the system 1900, which may be between another SMF 1924 in a visited network and the SMF 1924 in the home network in roaming scenarios. Additionally, the SMF 1924 may exhibit the Nsmf service-based interface.

The NEF 1923 may provide means for securely exposing the services and capabilities provided by 3GPP network functions for third party, internal exposure/re-exposure, Application Functions (e.g., AF 1928), edge computing or fog computing systems, etc. In such embodiments, the NEF 1923 may authenticate, authorize, and/or throttle the AFs. NEF 1923 may also translate information exchanged with the AF 1928 and information exchanged with internal network functions. For example, the NEF 1923 may translate between an AF-Service-Identifier and an internal 5GC information. NEF 1923 may also receive information from other network functions (NFs) based on exposed capabilities of other network functions. This information may be stored at the NEF 1923 as structured data, or at a data storage NF using standardized interfaces. The stored information can then be re-exposed by the NEF 1923 to other NFs and AFs, and/or used for other purposes such as analytics. Additionally, the NEF 1923 may exhibit an Nnef service-based interface.

The NRF 1925 may support service discovery functions, receive NF discovery requests from NF instances, and provide the information of the discovered NF instances to the NF instances. NRF 1925 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1925 may exhibit the Nnrf service-based interface.

The PCF 1926 may provide policy rules to control plane function(s) to enforce them, and may also support unified policy framework to govern network behaviour. The PCF 1926 may also implement an FE to access subscription information relevant for policy decisions in a UDR of the UDM 1927. The PCF 1926 may communicate with the AMF 1921 via an N15 reference point between the PCF 1926 and the AMF 1921, which may include a PCF 1926 in a visited network and the AMF 1921 in case of roaming scenarios. The PCF 1926 may communicate with the AF 1928 via an N5 reference point between the PCF 1926 and the AF 1928; and with the SMF 1924 via an N7 reference point between the PCF 1926 and the SMF 1924. The system 1900 and/or CN 1920 may also include an N24 reference point between the PCF 1926 (in the home network) and a PCF 1926 in a visited network. Additionally, the PCF 1926 may exhibit an Npcf service-based interface.

The UDM 1927 may handle subscription-related information to support the network entities' handling of communication sessions, and may store subscription data of UE 1901. For example, subscription data may be communicated between the UDM 1927 and the AMF 1921 via an N8 reference point between the UDM 1927 and the AMF. The UDM 1927 may include two parts, an application FE and a UDR (the FE and UDR are not shown by FIG. 19). The UDR may store subscription data and policy data for the UDM 1927 and the PCF 1926, and/or structured data for exposure and application data (including PFDs for application detection, application request information for multiple UEs 1901) for the NEF 1923. The Nudr service-based interface may be exhibited by the UDR 221 to allow the UDM 1927, PCF 1926, and NEF 1923 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 1924 via an N10 reference point between the UDM 1927 and the SMF 1924. UDM 1927 may also support SMS management, wherein an SMS-FE implements the similar application logic as discussed previously. Additionally, the UDM 1927 may exhibit the Nudm service-based interface.

The AF 1928 may provide application influence on traffic routing, provide access to the NCE, and interact with the policy framework for policy control. The NCE may be a mechanism that allows the 5GC 1920 and AF 1928 to provide information to each other via NEF 1923, which may be used for edge computing implementations. In such implementations, the network operator and third party services may be hosted close to the UE 1901 access point of attachment to achieve an efficient service delivery through the reduced end-to-end latency and load on the transport network. For edge computing implementations, the 5GC may select a UPF 1902 close to the UE 1901 and execute traffic steering from the UPF 1902 to DN 1903 via the N6 interface. This may be based on the UE subscription data, UE location, and information provided by the AF 1928. In this way, the AF 1928 may influence UPF (re)selection and traffic routing. Based on operator deployment, when AF 1928 is considered to be a trusted entity, the network operator may permit AF 1928 to interact directly with relevant NFs. Additionally, the AF 1928 may exhibit an Naf service-based interface.

The NSSF 1929 may select a set of network slice instances serving the UE 1901. The NSSF 1929 may also determine allowed NSSAI and the mapping to the subscribed S-NSSAIs, if needed. The NSSF 1929 may also determine the AMF set to be used to serve the UE 1901, or a list of candidate AMF(s) 1921 based on a suitable configuration and possibly by querying the NRF 1925. The selection of a set of network slice instances for the UE 1901 may be triggered by the AMF 1921 with which the UE 1901 is registered by interacting with the NSSF 1929, which may lead to a change of AMF 1921. The NSSF 1929 may interact with the AMF 1921 via an N22 reference point between AMF 1921 and NSSF 1929; and may communicate with another NSSF 1929 in a visited network via an N31 reference point (not shown by FIG. 19). Additionally, the NSSF 1929 may exhibit an Nnssf service-based interface.

As discussed previously, the CN 1920 may include an SMSF, which may be responsible for SMS subscription checking and verification, and relaying SM messages to/from the UE 1901 to/from other entities, such as an SMS-GMSC/IWMSC/SMS-router. The SMS may also interact with AMF 1921 and UDM 1927 for a notification procedure that the UE 1901 is available for SMS transfer (e.g., set a UE not reachable flag, and notifying UDM 1927 when UE 1901 is available for SMS).

The CN 1720 may also include other elements that are not shown by FIG. 19, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 19). Individual NFs may share a UDSF for storing their respective unstructured data or individual NFs may each have their own UDSF located at or near the individual NFs. Additionally, the UDSF may exhibit an Nudsf service-based interface (not shown by FIG. 19). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 19 for clarity. In one example, the CN 1920 may include an Nx interface, which is an inter-CN interface between the MME (e.g., MME 1821) and the AMF 1921 in order to enable interworking between CN 1920 and CN 1820. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 20:
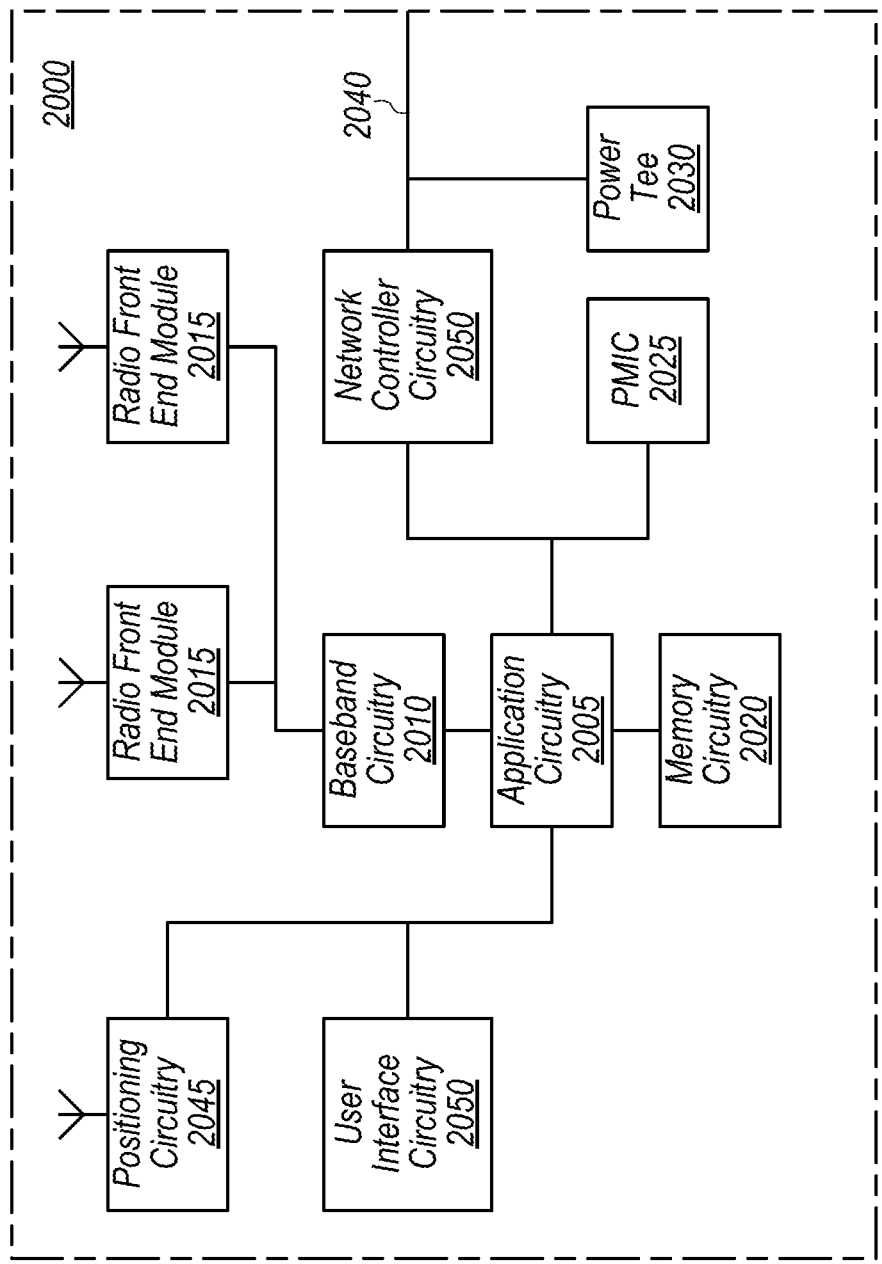
FIG. 20 illustrates an example of infrastructure equipment, according to some embodiments.

FIG. 20 illustrates an example of infrastructure equipment 2000 in accordance with various embodiments. The infrastructure equipment 2000 (or "system 2000") may be implemented as a base station, radio head, RAN node such as the RAN nodes 1711 and/or AP 1706 shown and described previously, application server(s) 1730, and/or any other element/device discussed herein. In other examples, the system 2000 could be implemented in or by a UE.

The system 2000 includes application circuitry 2005, baseband circuitry 2010, one or more radio front end modules (RFEMs) 2015, memory circuitry 2020, power management integrated circuitry (PMIC) 2025, power tee circuitry 2030, network controller circuitry 2035, network interface connector 2040, satellite positioning circuitry 2045, and user interface 2050. In some embodiments, the device 2000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 2005 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 2005 may be coupled with or may include memory/storage elements and may be configured to execute instructions stored in the memory/storage to enable various applications or operating systems to run on the system 2000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 2005 may comprise, or may be, a special-purpose processor/controller to operate according to the various embodiments herein. As examples, the processor(s) of application circuitry 2005 may include one or more Apple® processor(s), such as A5-A9 processor(s); Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 2000 may not utilize application circuitry 2005, and instead may include a special-purpose processor/controller to process IP data received from an EPC or 5GC, for example.

In some implementations, the application circuitry 2005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 2005 may comprise logic blocks or logic fabric, and other interconnected resources that may be programmed to perform various functions, such as the procedures, methods, functions, etc. of the various embodiments discussed herein. In such embodiments, the circuitry of application circuitry 2005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 2010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2010 are discussed infra with regard to FIG. 22.

User interface circuitry 2050 may include one or more user interfaces designed to enable user interaction with the system 2000 or peripheral component interfaces designed to enable peripheral component interaction with the system 2000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 2015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 22111 of FIG. 22 infra), and the RFEM may be connected to multiple antennas. In alternative implementations, both mmWave and sub-mmWave radio functions may be implemented in the same physical RFEM 2015, which incorporates both mmWave antennas and sub-mmWave.

The memory circuitry 2020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 2020 may be implemented as one or more of solder down packaged integrated circuits, socketed memory modules and plug-in memory cards.

The PMIC 2025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 2030 may provide for electrical power drawn from a network cable to provide both power supply and data connectivity to the infrastructure equipment 2000 using a single cable.

The network controller circuitry 2035 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 2000 via network interface connector 2040 using a physical connection, which may be electrical (commonly referred to as a "copper interconnect"), optical, or wireless. The network controller circuitry 2035 may include one or more dedicated processors and/or FPGAs to communicate using one or more of the aforementioned protocols. In some implementations, the network controller circuitry 2035 may include multiple controllers to provide connectivity to other networks using the same or different protocols.

The positioning circuitry 2045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The positioning circuitry 2045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2045 may include a Micro-Technology for Positioning, Navigation, and Timing (Micro-PNT) IC that uses a master timing clock to perform position tracking/estimation without GNSS assistance. The positioning circuitry 2045 may also be part of, or interact with, the baseband circuitry 2010 and/or RFEMs 2015 to communicate with the nodes and components of the positioning network. The positioning circuitry 2045 may also provide position data and/or time data to the application circuitry 2005, which may use the data to synchronize operations with various infrastructure (e.g., RAN nodes 1711, etc.), or the like.

The components shown by FIG. 20 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 21:
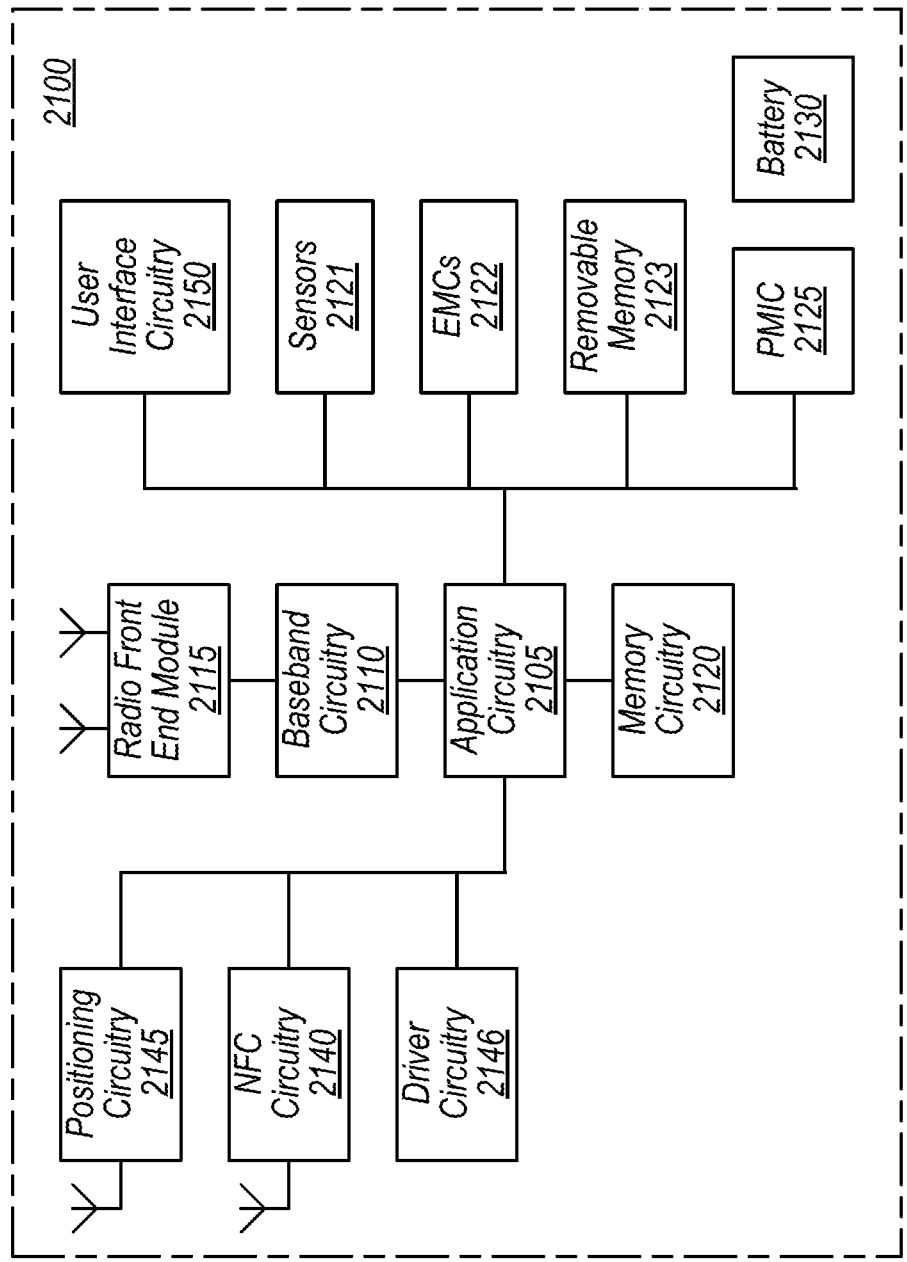
FIG. 21 illustrates an example of a platform or device, according to some embodiments.

FIG. 21 illustrates an example of a platform 2100 (or "device 2100") in accordance with various embodiments. In embodiments, the computer platform 2100 may be suitable for use as UEs 1701, 1801, 1901, application servers 1730, and/or any other element/device discussed herein. The platform 2100 may include any combinations of the components shown in the example. The components of platform 2100 may be implemented as integrated circuits (ICs), portions thereof, discrete electronic devices, or other modules, logic, hardware, software, firmware, or a combination thereof adapted in the computer platform 2100, or as components otherwise incorporated within a chassis of a larger system. The block diagram of FIG. 21 is intended to show a high level view of components of the computer platform 2100. However, some of the components shown may be omitted, additional components may be present, and different arrangement of the components shown may occur in other implementations.

Application circuitry 2105 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 2105 may be coupled with or may include memory/storage elements and may be configured to execute instructions stored in the memory/storage to enable various applications or operating systems to run on the system 2100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2005 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 2005 may comprise, or may be, a special-purpose processor/controller to operate according to the various embodiments herein.

As examples, the processor(s) of application circuitry 2105 may include one or more Apple® processor(s) such as A5-A9 processor(s). The processors of the application circuitry 2105 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc.; Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 2105 may be a part of a system on a chip (SoC) in which the application circuitry 2105 and other components are formed into a single integrated circuit, or a single package, such as the Edison™ or Galileo™ SoC boards from Intel® Corporation.

Additionally or alternatively, application circuitry 2105 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 2105 may comprise logic blocks or logic fabric, and other interconnected resources that may be programmed to perform various functions, such as the procedures, methods, functions, etc. of the various embodiments discussed herein. In such embodiments, the circuitry of application circuitry 2105 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 2110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2110 are discussed infra with regard to FIG. 22.

The RFEMs 2115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 22111 of FIG. 22 infra), and the RFEM may be connected to multiple antennas. In alternative implementations, both mmWave and sub-mmWave radio functions may be implemented in the same physical RFEM 2115, which incorporates both mmWave antennas and sub-mmWave.

The memory circuitry 2120 may include any number and type of memory devices used to provide for a given amount of system memory. As examples, the memory circuitry 2120 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 2120 may be developed in accordance with a Joint Electron Devices Engineering Council (JEDEC) low power double data rate (LPDDR)-based design, such as LPDDR2, LPDDR3, LPDDR4, or the like. Memory circuitry 2120 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 2120 may be on-die memory or registers associated with the application circuitry 2105. To provide for persistent storage of information such as data, applications, operating systems and so forth, memory circuitry 2120 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 2100 may incorporate the three-dimensional (3D) cross-point (XPOINT) memories from Intel® and Micron®.

Removable memory circuitry 2123 may include devices, circuitry, enclosures/housings, ports or receptacles, etc. used to couple portable data storage devices with the platform 2100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 2100 may also include interface circuitry (not shown) that is used to connect external devices with the platform 2100. The external devices connected to the platform 2100 via the interface circuitry include sensor circuitry 2121 and electro-mechanical components (EMCs) 2122, as well as removable memory devices coupled to removable memory circuitry 2123.

The sensor circuitry 2121 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 2122 include devices, modules, or subsystems whose purpose is to enable platform 2100 to change its state, position, and/or orientation, or move or control a mechanism or (sub)system. Additionally, EMCs 2122 may be configured to generate and send messages/signalling to other components of the platform 2100 to indicate a current state of the EMCs 2122. Examples of the EMCs 2122 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 2100 is configured to operate one or more EMCs 2122 based on one or more captured events and/or instructions or control signals received from a service provider and/or various clients.

In some implementations, the interface circuitry may connect the platform 2100 with positioning circuitry 2145. The positioning circuitry 2145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 2145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2145 may include a Micro-PNT IC that uses a master timing clock to perform position tracking/estimation without GNSS assistance. The positioning circuitry 2145 may also be part of, or interact with, the baseband circuitry 2010 and/or RFEMs 2115 to communicate with the nodes and components of the positioning network. The positioning circuitry 2145 may also provide position data and/or time data to the application circuitry 2105, which may use the data to synchronize operations with various infrastructure (e.g., radio base stations), for turn-by-turn navigation applications, or the like In some implementations, the interface circuitry may connect the platform 2100 with Near-Field Communication (NFC) circuitry 2140. NFC circuitry 2140 is configured to provide contactless, short-range communications based on radio frequency identification (RFID) standards, wherein magnetic field induction is used to enable communication between NFC circuitry 2140 and NFC-enabled devices external to the platform 2100 (e.g., an "NFC touchpoint"). NFC circuitry 2140 comprises an NFC controller coupled with an antenna element and a processor coupled with the NFC controller. The NFC controller may be a chip/IC providing NFC functionalities to the NFC circuitry 2140 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 2140, or initiate data transfer between the NFC circuitry 2140 and another active NFC device (e.g., a smartphone or an NFC-enabled POS terminal) that is proximate to the platform 2100.

The driver circuitry 2146 may include software and hardware elements that operate to control particular devices that are embedded in the platform 2100, attached to the platform 2100, or otherwise communicatively coupled with the platform 2100. The driver circuitry 2146 may include individual drivers allowing other components of the platform 2100 to interact with or control various input/output (I/O) devices that may be present within, or connected to, the platform 2100. For example, driver circuitry 2146 may include a display driver to control and allow access to a display device, a touchscreen driver to control and allow access to a touchscreen interface of the platform 2100, sensor drivers to obtain sensor readings of sensor circuitry 2121 and control and allow access to sensor circuitry 2121, EMC drivers to obtain actuator positions of the EMCs 2122 and/or control and allow access to the EMCs 2122, a camera driver to control and allow access to an embedded image capture device, audio drivers to control and allow access to one or more audio devices.

The power management integrated circuitry (PMIC) 2125 (also referred to as "power management circuitry 2125") may manage power provided to various components of the platform 2100. In particular, with respect to the baseband circuitry 2110, the PMIC 2125 may control power-source selection, voltage scaling, battery charging, or DC-to-DC conversion. The PMIC 2125 may often be included when the platform 2100 is capable of being powered by a battery 2130, for example, when the device is included in a UE 1701, 1801, 1901.

In some embodiments, the PMIC 2125 may control, or otherwise be part of, various power saving mechanisms of the platform 2100. For example, if the platform 2100 is in an RRC_Connected state, where it is still connected to the RAN node as it expects to receive traffic shortly, then it may enter a state known as Discontinuous Reception Mode (DRX) after a period of inactivity. During this state, the platform 2100 may power down for brief intervals of time and thus save power. If there is no data traffic activity for an extended period of time, then the platform 2100 may transition off to an RRC_Idle state, where it disconnects from the network and does not perform operations such as channel quality feedback, handover, etc. The platform 2100 goes into a very low power state and it performs paging where again it periodically wakes up to listen to the network and then powers down again. The platform 2100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2130 may power the platform 2100, although in some examples the platform 2100 may be mounted deployed in a fixed location, and may have a power supply coupled to an electrical grid. The battery 2130 may be a lithium ion battery, a metal-air battery, such as a zinc-air battery, an aluminum-air battery, a lithium-air battery, and the like. In some implementations, such as in V2X applications, the battery 2130 may be a typical lead-acid automotive battery.

In some implementations, the battery 2130 may be a "smart battery," which includes or is coupled with a Battery Management System (BMS) or battery monitoring integrated circuitry. The BMS may be included in the platform 2100 to track the state of charge (SoCh) of the battery 2130. The BMS may be used to monitor other parameters of the battery 2130 to provide failure predictions, such as the state of health (SoH) and the state of function (SoF) of the battery 2130. The BMS may communicate the information of the battery 2130 to the application circuitry 2105 or other components of the platform 2100. The BMS may also include an analog-to-digital (ADC) convertor that allows the application circuitry 2105 to directly monitor the voltage of the battery 2130 or the current flow from the battery 2130. The battery parameters may be used to determine actions that the platform 2100 may perform, such as transmission frequency, network operation, sensing frequency, and the like.

A power block, or other power supply coupled to an electrical grid may be coupled with the BMS to charge the battery 2130. In some examples, the power block XS30 may be replaced with a wireless power receiver to obtain the power wirelessly, for example, through a loop antenna in the computer platform 2100. In these examples, a wireless battery charging circuit may be included in the BMS. The specific charging circuits chosen may depend on the size of the battery 2130, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 2150 includes various input/output (I/O) devices present within, or connected to, the platform 2100, and includes one or more user interfaces designed to enable user interaction with the platform 2100 and/or peripheral component interfaces designed to enable peripheral component interaction with the platform 2100. The user interface circuitry 2150 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2100. The output device circuitry may also include speakers or other audio emitting devices, printer(s), and/or the like. In some embodiments, the sensor circuitry 2121 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 2100 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an $I^2C$ interface, an SPI interface, point-to-point interfaces, and a power bus, among others.

Figure 22:
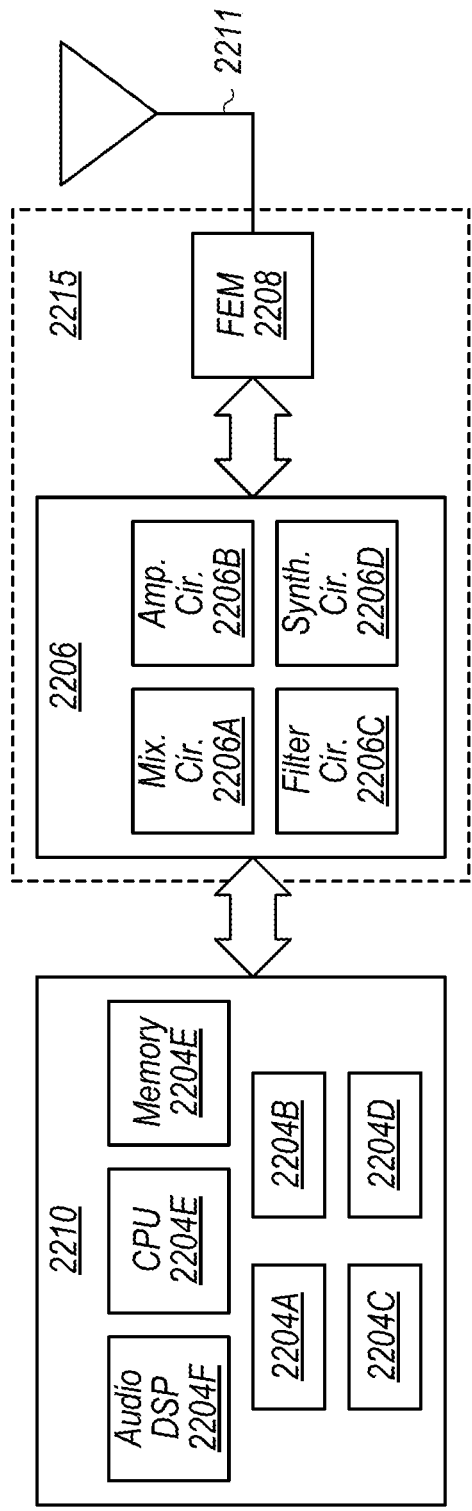
FIG. 22 illustrates example components of baseband circuitry and radio front end modules, according to some embodiments.

FIG. 22 illustrates example components of baseband circuitry 2210 and radio front end modules (RFEM) 2215 in accordance with various embodiments. The baseband circuitry 2210 corresponds to the baseband circuitry 2010 and 2110 of FIGS. 20 and 21, respectively. The RFEM 2215 corresponds to the RFEM 2015 and 2115 of FIGS. 20 and 21, respectively. As shown, the RFEMs 2215 may include Radio Frequency (RF) circuitry 2206, front-end module (FEM) circuitry 2208, antenna array 2211 coupled together at least as shown.

The baseband circuitry 2210 includes circuitry and/or control logic configured to carry out various radio/network protocol and radio control functions that enable communication with one or more radio networks via the RF circuitry 2206. The radio control functions may include, but are not limited to, signal modulation/demodulation, encoding/decoding, radio frequency shifting, etc. In some embodiments, modulation/demodulation circuitry of the baseband circuitry 2210 may include Fast-Fourier Transform (FFT), precoding, or constellation mapping/demapping functionality. In some embodiments, encoding/decoding circuitry of the baseband circuitry 2210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 2210 is configured to process baseband signals received from a receive signal path of the RF circuitry 2206 and to generate baseband signals for a transmit signal path of the RF circuitry 2206. The baseband circuitry 2210 is configured to interface with application circuitry 2005/2105 (see FIGS. 20 and 21) for generation and processing of the baseband signals and for controlling operations of the RF circuitry 2206. The baseband circuitry 2210 may handle various radio control functions.

The aforementioned circuitry and/or control logic of the baseband circuitry 2210 may include one or more single or multi-core processors. For example, the one or more processors may include a 3G baseband processor 2204A, a 4G/LTE baseband processor 2204B, a 5G/NR baseband processor 2204C, or some other baseband processor(s) 2204D for other existing generations, generations in development or to be developed in the future (e.g., sixth generation (6G), etc.). In other embodiments, some or all of the functionality of baseband processors 2204A-D may be included in modules stored in the memory 2204G and executed via a Central Processing Unit (CPU) 2204E. In other embodiments, some or all of the functionality of baseband processors 2204A-D may be provided as hardware accelerators (e.g., FPGAs, ASICs, etc.) loaded with the appropriate bit streams or logic blocks stored in respective memory cells. In various embodiments, the memory 2204G may store program code of a real-time OS (RTOS), which when executed by the CPU 2204E (or other baseband processor), is to cause the CPU 2204E (or other baseband processor) to manage resources of the baseband circuitry 2210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 2210 includes one or more audio digital signal processor(s) (DSP) 2204F. The audio DSP(s) 2204F include elements for compression/decompression and echo cancellation and may include other suitable processing elements in other embodiments.

In some embodiments, each of the processors 2204A-2204E include respective memory interfaces to send/receive data to/from the memory 2204G. The baseband circuitry 2210 may further include one or more interfaces to communicatively couple to other circuitries/devices, such as an interface to send/receive data to/from memory external to the baseband circuitry 2210; an application circuitry interface to send/receive data to/from the application circuitry 2005/2105 of FIGS. 20-22); an RF circuitry interface to send/receive data to/from RF circuitry 2206 of FIG. 22; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 2125.

In alternate embodiments (which may be combined with the above described embodiments), baseband circuitry 2210 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 2210 may include protocol processing circuitry with one or more instances of control circuitry (not shown) to provide control functions for the digital baseband circuitry and/or radio frequency circuitry (e.g., the radio front end modules 2215).

Although not shown by FIG. 22, in some embodiments, the baseband circuitry 2210 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 2210 and/or RF circuitry 2206 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 2210 and/or RF circuitry 2206 are part of a Wi-Fi communication system. In the second example, the protocol processing circuitry would operate Wi-Fi MAC and logical link control (LLC) functions. The protocol processing circuitry may include one or more memory structures (e.g., 2204G) to store program code and data for operating the protocol functions, as well as one or more processing cores to execute the program code and perform various operations using the data. The baseband circuitry 2210 may also support radio communications for more than one wireless protocol.

The various hardware elements of the baseband circuitry 2210 discussed herein may be implemented, for example, as a solder-down substrate including one or more integrated circuits (ICs), a single packaged IC soldered to a main circuit board or a multi-chip module containing two or more ICs. In one example, the components of the baseband circuitry 2210 may be suitably combined in a single chip or chipset, or disposed on a same circuit board. In another example, some or all of the constituent components of the baseband circuitry 2210 and RF circuitry 2206 may be implemented together such as, for example, a system on a chip (SoC) or System-in-Package (SiP). In another example, some or all of the constituent components of the baseband circuitry 2210 may be implemented as a separate SoC that is communicatively coupled with and RF circuitry 2206 (or multiple instances of RF circuitry 2206). In yet another example, some or all of the constituent components of the baseband circuitry 2210 and the application circuitry 2005/2105 may be implemented together as individual SoCs mounted to a same circuit board (e.g., a "multi-chip package").

In some embodiments, the baseband circuitry 2210 may provide for communication compatible with one or more radio technologies. For example, in some embodiments, the baseband circuitry 2210 may support communication with an E-UTRAN or other WMAN, a WLAN, a WPAN. Embodiments in which the baseband circuitry 2210 is configured to support radio communications of more than one wireless protocol may be referred to as multi-mode baseband circuitry.

RF circuitry 2206 may enable communication with wireless networks using modulated electromagnetic radiation through a non-solid medium. In various embodiments, the RF circuitry 2206 may include switches, filters, amplifiers, etc. to facilitate the communication with the wireless network. RF circuitry 2206 may include a receive signal path, which may include circuitry to down-convert RF signals received from the FEM circuitry 2208 and provide baseband signals to the baseband circuitry 2210. RF circuitry 2206 may also include a transmit signal path, which may include circuitry to up-convert baseband signals provided by the baseband circuitry 2210 and provide RF output signals to the FEM circuitry 2208 for transmission.

In some embodiments, the receive signal path of the RF circuitry 2206 may include mixer circuitry 2206a, amplifier circuitry 2206b and filter circuitry 2206c. In some embodiments, the transmit signal path of the RF circuitry 2206 may include filter circuitry 2206c and mixer circuitry 2206a. RF circuitry 2206 may also include synthesizer circuitry 2206d for synthesizing a frequency for use by the mixer circuitry 2206a of the receive signal path and the transmit signal path. In some embodiments, the mixer circuitry 2206a of the receive signal path may be configured to down-convert RF signals received from the FEM circuitry 2208 based on the synthesized frequency provided by synthesizer circuitry 2206d. The amplifier circuitry 2206b may be configured to amplify the down-converted signals and the filter circuitry 2206c may be a low-pass filter (LPF) or band-pass filter (BPF) configured to remove unwanted signals from the down-converted signals to generate output baseband signals. Output baseband signals may be provided to the baseband circuitry 2210 for further processing. In some embodiments, the output baseband signals may be zero-frequency baseband signals, although this is not a requirement. In some embodiments, mixer circuitry 2206a of the receive signal path may comprise passive mixers, although the scope of the embodiments is not limited in this respect.

In some embodiments, the mixer circuitry 2206a of the transmit signal path may be configured to up-convert input baseband signals based on the synthesized frequency provided by the synthesizer circuitry 2206d to generate RF output signals for the FEM circuitry 2208. The baseband signals may be provided by the baseband circuitry 2210 and may be filtered by filter circuitry 2206c.

In some embodiments, the mixer circuitry 2206a of the receive signal path and the mixer circuitry 2206a of the transmit signal path may include two or more mixers and may be arranged for quadrature downconversion and upconversion, respectively. In some embodiments, the mixer circuitry 2206a of the receive signal path and the mixer circuitry 2206a of the transmit signal path may include two or more mixers and may be arranged for image rejection (e.g., Hartley image rejection). In some embodiments, the mixer circuitry 2206a of the receive signal path and the mixer circuitry 2206a of the transmit signal path may be arranged for direct downconversion and direct upconversion, respectively. In some embodiments, the mixer circuitry 2206a of the receive signal path and the mixer circuitry 2206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2206 may include analog-to-digital converter (ADC) and digital-to-analog converter (DAC) circuitry and the baseband circuitry 2210 may include a digital baseband interface to communicate with the RF circuitry 2206.

In some dual-mode embodiments, a separate radio IC circuitry may be provided for processing signals for each spectrum, although the scope of the embodiments is not limited in this respect.

In some embodiments, the synthesizer circuitry 2206d may be a fractional-N synthesizer or a fractional N/N+1 synthesizer, although the scope of the embodiments is not limited in this respect as other types of frequency synthesizers may be suitable. For example, synthesizer circuitry 2206d may be a delta-sigma synthesizer, a frequency multiplier, or a synthesizer comprising a phase-locked loop with a frequency divider.

The synthesizer circuitry 2206d may be configured to synthesize an output frequency for use by the mixer circuitry 2206a of the RF circuitry 2206 based on a frequency input and a divider control input. In some embodiments, the synthesizer circuitry 2206d may be a fractional N/N+1 synthesizer.

In some embodiments, frequency input may be provided by a voltage controlled oscillator (VCO), although that is not a requirement. Divider control input may be provided by either the baseband circuitry 2210 or the application circuitry 2005/2105 depending on the desired output frequency. In some embodiments, a divider control input (e.g., N) may be determined from a look-up table based on a channel indicated by the application circuitry 2005/2105.

Synthesizer circuitry 2206d of the RF circuitry 2206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2206 may include an IQ/polar converter.

FEM circuitry 2208 may include a receive signal path, which may include circuitry configured to operate on RF signals received from antenna array 2211, amplify the received signals and provide the amplified versions of the received signals to the RF circuitry 2206 for further processing. FEM circuitry 2208 may also include a transmit signal path, which may include circuitry configured to amplify signals for transmission provided by the RF circuitry 2206 for transmission by one or more of antenna elements of antenna array 2211. In various embodiments, the amplification through the transmit or receive signal paths may be done solely in the RF circuitry 2206, solely in the FEM circuitry 2208, or in both the RF circuitry 2206 and the FEM circuitry 2208.

In some embodiments, the FEM circuitry 2208 may include a TX/RX switch to switch between transmit mode and receive mode operation. The FEM circuitry 2208 may include a receive signal path and a transmit signal path. The receive signal path of the FEM circuitry 2208 may include an LNA to amplify received RF signals and provide the amplified received RF signals as an output (e.g., to the RF circuitry 2206). The transmit signal path of the FEM circuitry 2208 may include a power amplifier (PA) to amplify input RF signals (e.g., provided by RF circuitry 2206), and one or more filters to generate RF signals for subsequent transmission by one or more antenna elements of the antenna array 2211.

The antenna array 2211 comprises one or more antenna elements, each of which is configured convert electrical signals into radio waves to travel through the air and to convert received radio waves into electrical signals. For example, digital baseband signals provided by the baseband circuitry 2210 is converted into analog RF signals (e.g., modulated waveform) that will be amplified and transmitted via the antenna elements of the antenna array 2211 including one or more antenna elements (not shown). The antenna elements may be omnidirectional, direction, or a combination thereof. The antenna elements may be formed in a multitude of arranges as are known and/or discussed herein. The antenna array 2211 may comprise microstrip antennas or printed antennas that are fabricated on the surface of one or more printed circuit boards. The antenna array 2211 may be formed in as a patch of metal foil (e.g., a patch antenna) in a variety of shapes, and may be coupled with the RF circuitry 2206 and/or FEM circuitry 2208 using metal transmission lines or the like.

Processors of the application circuitry 2005/2105 and processors of the baseband circuitry 2210 may be used to execute elements of one or more instances of a protocol stack. For example, processors of the baseband circuitry 2210, alone or in combination, may be used execute Layer 3, Layer 2, or Layer 1 functionality, while processors of the application circuitry 2005/2105 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 23:
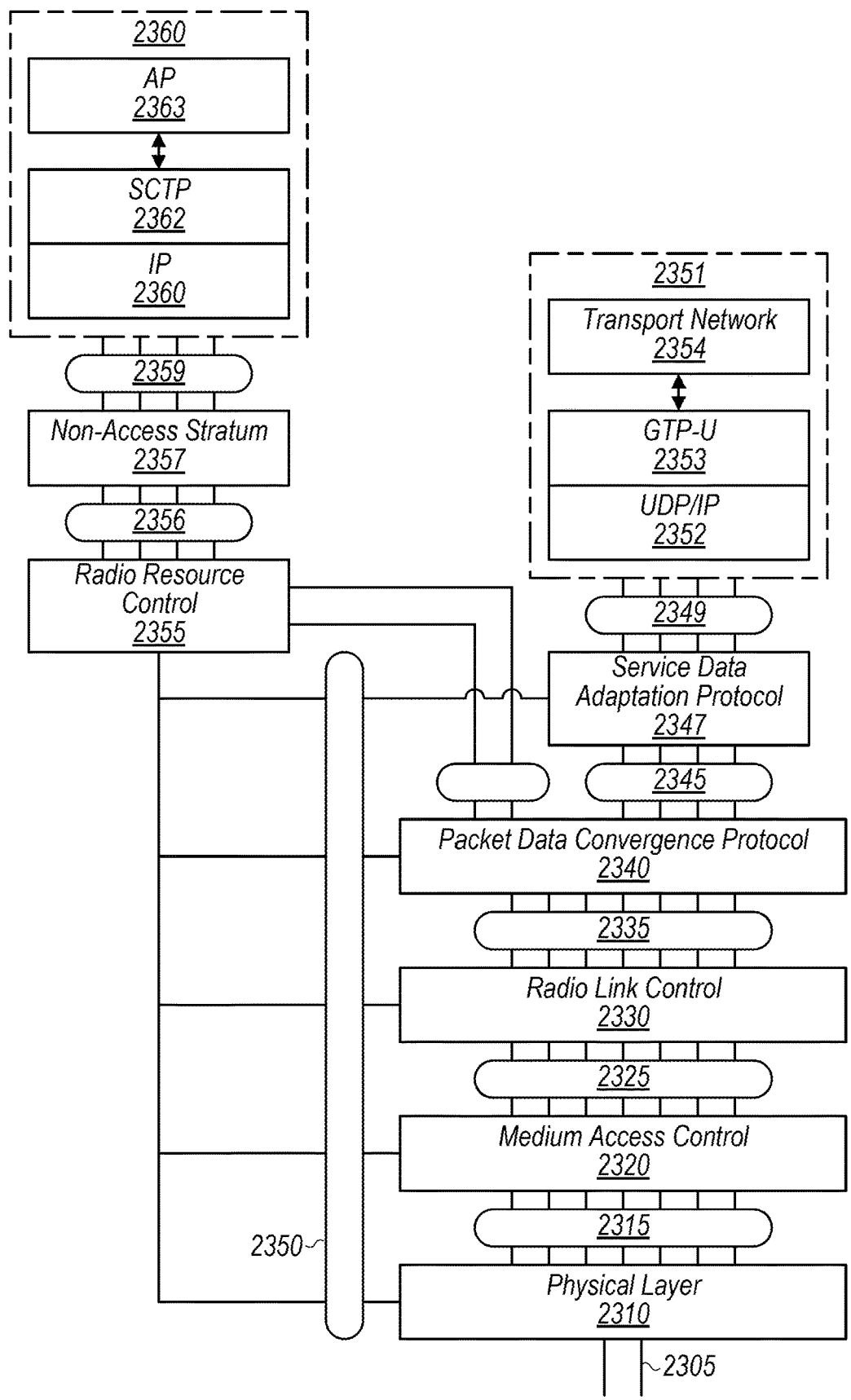
FIG. 23 illustrates various protocol functions that may be implemented in a wireless communication device, according to some embodiments.

FIG. 23 illustrates various protocol functions that may be implemented in a wireless communication device according to various embodiments. In particular, FIG. 23 includes an arrangement 2300 showing interconnections between various protocol layers/entities. The following description of FIG. 23 is provided for various protocol layers/entities that operate in conjunction with the 5G/NR system standards and LTE system standards, but some or all of the aspects of FIG. 23 may be applicable to other wireless communication network systems as well.

The protocol layers of arrangement 2300 may include one or more of PHY 2310, MAC 2320, RLC 2330, PDCP 2340, SDAP 2347, RRC 2355, and NAS layer 2357, in addition to other higher layer functions not illustrated. The protocol layers may include one or more service access points (e.g., items 2359, 2356, 2350, 2349, 2345, 2335, 2325, and 2315 in FIG. 23) that may provide communication between two or more protocol layers.

The PHY 2310 may transmit and receive physical layer signals 2305 that may be received from or transmitted to one or more other communication devices. The physical layer signals 2305 may comprise one or more physical channels, such as those discussed herein. The PHY 2310 may further perform link adaptation or adaptive modulation and coding (AMC), power control, cell search (e.g., for initial synchronization and handover purposes), and other measurements used by higher layers, such as the RRC 2355. The PHY 2310 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 2310 may process requests from and provide indications to an instance of MAC 2320 via one or more PHY-SAP 2315. According to some embodiments, requests and indications communicated via PHY-SAP 2315 may comprise one or more transport channels.

Instance(s) of MAC 2320 may process requests from, and provide indications to, an instance of RLC 2330 via one or more MAC-SAPs 2325. These requests and indications communicated via the MAC-SAP 2325 may comprise one or more logical channels. The MAC 2320 may perform mapping between the logical channels and transport channels, multiplexing of MAC SDUs from one or more logical channels onto TBs to be delivered to PHY 2310 via the transport channels, de-multiplexing MAC SDUs to one or more logical channels from TBs delivered from the PHY 2310 via transport channels, multiplexing MAC SDUs onto TBs, scheduling information reporting, error correction through HARQ, and logical channel prioritization.

Instance(s) of RLC 2330 may process requests from and provide indications to an instance of PDCP 2340 via one or more radio link control service access points (RLC-SAP) 2335. These requests and indications communicated via RLC-SAP 2335 may comprise one or more RLC channels. The RLC 2330 may operate in a plurality of modes of operation, including: Transparent Mode (TM), Unacknowledged Mode (UM), and Acknowledged Mode (AM). The RLC 2330 may execute transfer of upper layer protocol data units (PDUs), error correction through automatic repeat request (ARQ) for AM data transfers, and concatenation, segmentation and reassembly of RLC SDUs for UM and AM data transfers. The RLC 2330 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 2340 may process requests from and provide indications to instance(s) of RRC 2355 and/or instance(s) of SDAP 2347 via one or more packet data convergence protocol service access points (PDCP-SAP) 2345. These requests and indications communicated via PDCP-SAP 2345 may comprise one or more radio bearers. The PDCP 2340 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 2347 may process requests from and provide indications to one or more higher layer protocol entities via one or more SDAP-SAP 2349. These requests and indications communicated via SDAP-SAP 2349 may comprise one or more QoS flows. The SDAP 2347 may map QoS flows to DRBs, and vice versa, and may also mark QFIs in DL and UL packets. A single SDAP entity 2347 may be configured for an individual PDU session. In the UL direction, the NG-RAN 1710 may control the mapping of QoS Flows to DRB(s) in two different ways, reflective mapping or explicit mapping. For reflective mapping, the SDAP 2347 of a UE 1701 may monitor the QFIs of the DL packets for each DRB, and may apply the same mapping for packets flowing in the UL direction. For a DRB, the SDAP 2347 of the UE 1701 may map the UL packets belonging to the QoS flows(s) corresponding to the QoS flow ID(s) and PDU session observed in the DL packets for that DRB. To enable reflective mapping, the NG-RAN 1910 may mark DL packets over the Uu interface with a QoS flow ID. The explicit mapping may involve the RRC 2355 configuring the SDAP 2347 with an explicit QoS flow to DRB mapping rule, which may be stored and followed by the SDAP 2347. In embodiments, the SDAP 2347 may only be used in NR implementations and may not be used in LTE implementations.

The RRC 2355 may configure, via one or more management service access points (M-SAP), aspects of one or more protocol layers, which may include one or more instances of PHY 2310, MAC 2320, RLC 2330, PDCP 2340 and SDAP 2347. In embodiments, an instance of RRC 2355 may process requests from and provide indications to one or more NAS entities 2357 via one or more RRC-SAPs 2356. The main services and functions of the RRC 2355 may include broadcast of system information (e.g., included in MIBs or SIBs related to the NAS), broadcast of system information related to the access stratum (AS), paging, establishment, maintenance and release of an RRC connection between the UE 1701 and RAN 1710 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 2357 may form the highest stratum of the control plane between the UE 1701 and the AMF 1921. The NAS 2357 may support the mobility of the UEs 1701 and the session management procedures to establish and maintain IP connectivity between the UE 1701 and a P-GW in LTE systems.

According to various embodiments, one or more protocol entities of arrangement 2300 may be implemented in UEs 1701, RAN nodes 1711, AMF 1921 in NR implementations or MME 1821 in LTE implementations, UPF 1902 in NR implementations or S-GW 1822 and P-GW 1823 in LTE implementations, or the like to be used for control plane or user plane communications protocol stack between the aforementioned devices. In such embodiments, one or more protocol entities that may be implemented in one or more of UE 1701, gNB 1711, AMF 1921, etc. may communicate with a respective peer protocol entity that may be implemented in or on another device using the services of respective lower layer protocol entities to perform such communication. In some embodiments, a gNB-CU of the gNB 1711 may host the RRC 2355, SDAP 2347, and PDCP 2340 of the gNB that controls the operation of one or more gNB-DUs, and the gNB-DUs of the gNB 1711 may each host the RLC 2330, MAC 2320, and PHY 2310 of the gNB 1711.

In a first example, a control plane protocol stack may comprise, in order from highest layer to lowest layer, NAS 2357, RRC 2355, PDCP 2340, RLC 2330, MAC 2320, and PHY 2310. In this example, upper layers 2360 may be built on top of the NAS 2357, which includes an IP layer 2361, an SCTP 2362, and an application layer signaling protocol (AP) 2363.

In NR implementations, the AP 2363 may be an NG application protocol layer (NGAP or NG-AP) 2363 for the NG interface 1713 defined between the NG-RAN node 1711 and the AMF 1921, or the AP 2363 may be an Xn application protocol layer (XnAP or Xn-AP) 2363 for the Xn interface 1712 that is defined between two or more RAN nodes 1711.

The NG-AP 2363 may support the functions of the NG interface 1713 and may comprise Elementary Procedures (EPs). An NG-AP EP may be a unit of interaction between the NG-RAN node 1711 and the AMF 1921. The NG-AP 2363 services may comprise two groups: UE-associated services (e.g., services related to a UE 1701) and non-UE-associated services (e.g., services related to the whole NG interface instance between the NG-RAN node 1711 and AMF 1921). These services may include functions including, but not limited to: a paging function for the sending of paging requests to NG-RAN nodes 1711 involved in a particular paging area; a UE context management function for allowing the AMF 1921 to establish, modify, and/or release a UE context in the AMF 1921 and the NG-RAN node 1711; a mobility function for UEs 1701 in ECM-CONNECTED mode for intra-system HOs to support mobility within NG-RAN and inter-system HOs to support mobility from/to EPS systems; a NAS Signaling Transport function for transporting or rerouting NAS messages between UE 1701 and AMF 1921; a NAS node selection function for determining an association between the AMF 1921 and the UE 1701; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 1711 via CN 1720; and/or other like functions.

The XnAP 2363 may support the functions of the Xn interface 1712 and may comprise XnAP basic mobility procedures and XnAP global procedures. The XnAP basic mobility procedures may comprise procedures used to handle UE mobility within the NG RAN 1711 (or E-UTRAN 1810), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 1701, such as Xn interface setup and reset procedures, NG-RAN update procedures, cell activation procedures, and the like.

In LTE implementations, the AP 2363 may be an S1 Application Protocol layer (S1-AP) 2363 for the S1 interface 1713 defined between an E-UTRAN node 1711 and an MME, or the AP 2363 may be an X2 application protocol layer (X2AP or X2-AP) 2363 for the X2 interface 1712 that is defined between two or more E-UTRAN nodes 1711.

The S1 Application Protocol layer (S1-AP) 2363 may support the functions of the S1 interface, and similar to the NG-AP discussed previously, the S1-AP may comprise S1-AP EPs. An S1-AP EP may be a unit of interaction between the E-UTRAN node 1711 and an MME 1821 within an LTE CN 1720. The S1-AP 2363 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 2363 may support the functions of the X2 interface 1712 and may comprise X2AP basic mobility procedures and X2AP global procedures. The X2AP basic mobility procedures may comprise procedures used to handle UE mobility within the E-UTRAN 1720, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 1701, such as X2 interface setup and reset procedures, load indication procedures, error indication procedures, cell activation procedures, and the like.

The SCTP layer (alternatively referred to as the SCTP/IP layer) 2362 may provide guaranteed delivery of application layer messages (e.g., NGAP or XnAP messages in NR implementations, or S1-AP or X2AP messages in LTE implementations). The SCTP 2362 may ensure reliable delivery of signaling messages between the RAN node 1711 and the AMF 1921/MME 1821 based, in part, on the IP protocol, supported by the IP 2361. The Internet Protocol layer (IP) 2361 may be used to perform packet addressing and routing functionality. In some implementations the IP layer 2361 may use point-to-point transmission to deliver and convey PDUs. In this regard, the RAN node 1711 may comprise L2 and L1 layer communication links (e.g., wired or wireless) with the MME/AMF to exchange information.

In a second example, a user plane protocol stack may comprise, in order from highest layer to lowest layer, SDAP 2347, PDCP 2340, RLC 2330, MAC 2320, and PHY 2310. The user plane protocol stack may be used for communication between the UE 1701, the RAN node 1711, and UPF 1902 in NR implementations or an S-GW 1822 and P-GW 1823 in LTE implementations. In this example, upper layers 2351 may be built on top of the SDAP 2347, and may include a user datagram protocol (UDP) and IP security layer (UDP/IP) 2352, a General Packet Radio Service (GPRS) Tunneling Protocol for the user plane layer (GTP-U) 2353, and a User Plane PDU layer (UP PDU) 2363.

The transport network layer 2354 (also referred to as a "transport layer") may be built on IP transport, and the GTP-U 2353 may be used on top of the UDP/IP layer 2352 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 2353 may be used for carrying user data within the GPRS core network and between the radio access network and the core network. The user data transported can be packets in any of IPv4, IPv6, or PPP formats, for example. The UDP/IP 2352 may provide checksums for data integrity, port numbers for addressing different functions at the source and destination, and encryption and authentication on the selected data flows. The RAN node 1711 and the S-GW 1822 may utilize an S1-U interface to exchange user plane data via a protocol stack comprising an L1 layer (e.g., PHY 2310), an L2 layer (e.g., MAC 2320, RLC 2330, PDCP 2340, and/or SDAP 2347), the UDP/IP layer 2352, and the GTP-U 2353. The S-GW 1822 and the P-GW 1823 may utilize an S5/S8a interface to exchange user plane data via a protocol stack comprising an L1 layer, an L2 layer, the UDP/IP layer 2352, and the GTP-U 2353. As discussed previously, NAS protocols may support the mobility of the UE 1701 and the session management procedures to establish and maintain IP connectivity between the UE 1701 and the P-GW 1823.

Moreover, although not shown by FIG. 23, an application layer may be present above the AP 2363 and/or the transport network layer 2354. The application layer may be a layer in which a user of the UE 1701, RAN node 1711, or other network element interacts with software applications being executed, for example, by application circuitry 2005 or application circuitry 2105, respectively. The application layer may also provide one or more interfaces for software applications to interact with communications systems of the UE 1701 or RAN node 1711, such as the baseband circuitry 2210. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 24:
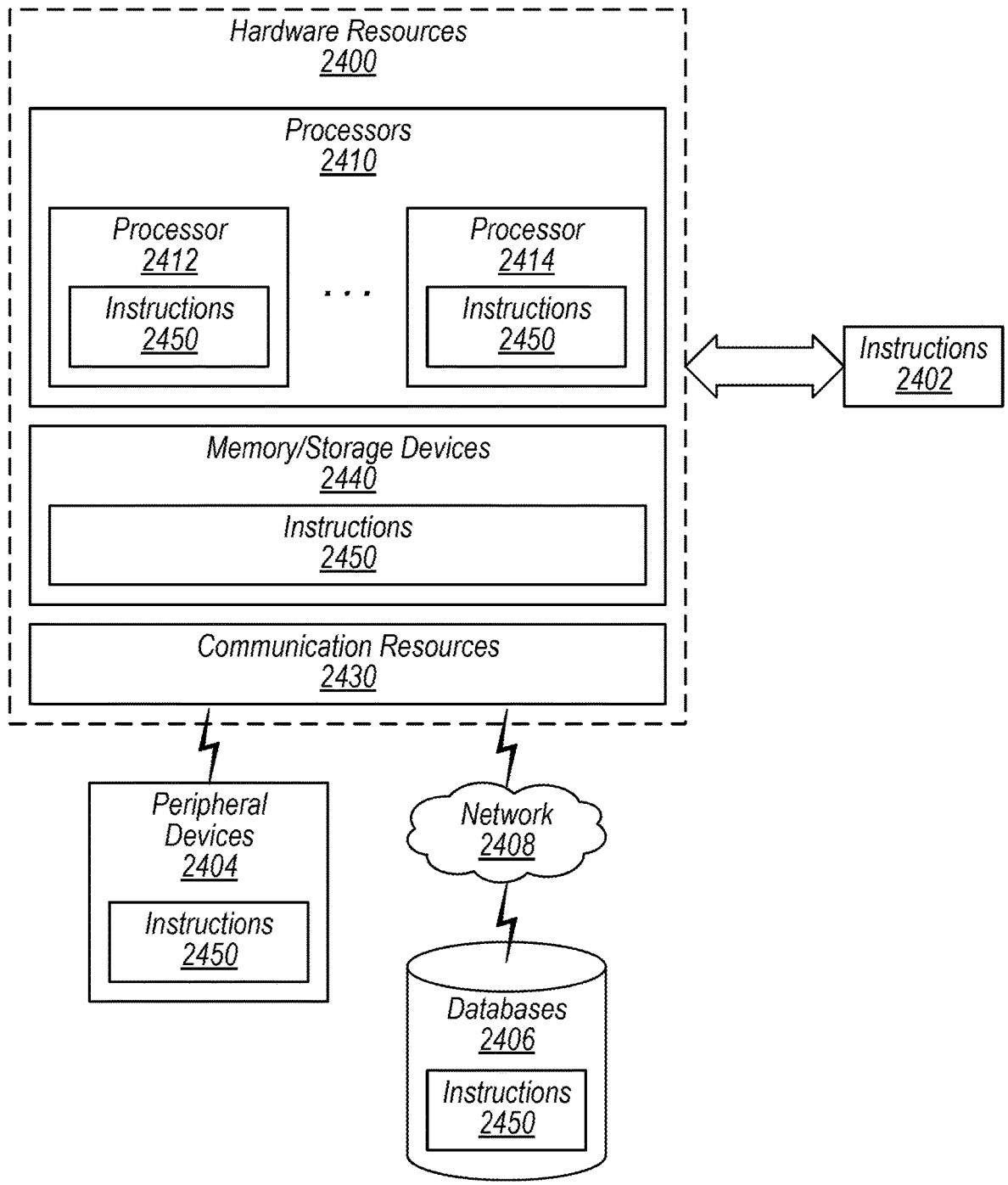
FIG. 24 is a block diagram illustrating components that may be able to read instructions from a machine-readable or computer-readable medium and perform any one or more of the methods described herein, according to some embodiments.

FIG. 24 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 24 shows a diagrammatic representation of hardware resources 2400 including one or more processors (or processor cores) 2410, one or more memory/storage devices 2420, and one or more communication resources 2430, each of which may be communicatively coupled via a bus 2440. For embodiments where node virtualization (e.g., NFV) is utilized, a hypervisor 2402 may be executed to provide an execution environment for one or more network slices/sub-slices to utilize the hardware resources 2400.

The processors 2410 may include, for example, a processor 2412 and a processor 2414. The processor(s) 2410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2420 may include main memory, disk storage, or any suitable combination thereof. The memory/storage devices 2420 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2430 may include interconnection or network interface components or other suitable devices to communicate with one or more peripheral devices 2404 or one or more databases 2406 via a network 2408. For example, the communication resources 2430 may include wired communication components (e.g., for coupling via USB), cellular communication components, NFC components, Bluetooth® (or Bluetooth® Low Energy) components, Wi-Fi® components, and other communication components.

Instructions 2450 may comprise software, a program, an application, an applet, an app, or other executable code for causing at least any of the processors 2410 to perform any one or more of the methodologies discussed herein. The instructions 2450 may reside, completely or partially, within at least one of the processors 2410 (e.g., within the processor's cache memory), the memory/storage devices 2420, or any suitable combination thereof. Furthermore, any portion of the instructions 2450 may be transferred to the hardware resources 2400 from any combination of the peripheral devices 2404 or the databases 2406. Accordingly, the memory of processors 2410, the memory/storage devices 2420, the peripheral devices 2404, and the databases 2406 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband processor comprising circuitry configured to:
    establish a wireless link with a cellular base station, wherein according to the wireless link the baseband processor is configured to communicate using at least a primary cell and a secondary cell;
    detect beam failure on the secondary cell;
    send an indication of the beam failure for the secondary cell to the cellular base station;
    receive information configuring multiple types of reference signals as candidate transmit beams for the baseband processor for performing beam failure recovery on the secondary cell, wherein the information comprises a first list that includes only a first type of reference signals and a second list that includes only a second type of reference signals;
    perform beam identification using the configured candidate transmit beams to identify a new transmit beam; and
    provide an indication of the new transmit beam to the cellular base station, wherein the indication of the new transmit beam includes an indication of whether the new transmit beam is associated with the first list or the second list.

2. The baseband processor of claim 1, wherein the indication of the new transmit beam includes a reference signal resource indicator, and wherein the indication of the new transmit beam is provided to the cellular base station using a resource configured to indicate a reference signal type associated with the new transmit beam.

3. The baseband processor of claim 1, wherein to perform beam identification using the configured candidate transmit beams to identify a new transmit beam, the circuitry is configured to:
    perform beam identification using the configured candidate transmit beams to identify one or more new transmit beams; and
    provide an indication of the one or more new transmit beams to the cellular base station, wherein the indication of the one or more new transmit beams is provided to the cellular base station using a resource configured to indicate a number of new transmit beams indicated.

4. The baseband processor of claim 1, wherein the indication of the new transmit beam includes a candidate beam resource indicator associated with the new transmit beam, and
    wherein each of a plurality of possible values of the candidate beam resource indicator are associated with each of a plurality of candidate transmit beams, and one possible value of the candidate beam resource indicator is associated with no new beam being identified.

5. The baseband processor of claim 1, wherein the indication of the new transmit beam includes a reference signal resource indicator and an indicator of a reference signal type associated with the new transmit beam.

6. The baseband processor of claim 1,
wherein the multiple types of reference signals include at least a synchronization signal block (SSB) and a channel state information reference signal (CSI-RS).

7. A wireless device, comprising:
an antenna;
a radio coupled to the antenna; and
a processor coupled to the radio;
wherein the wireless device is configured to:
    establish a wireless link with a cellular base station, wherein according to the wireless link the wireless device is configured to communicate using at least a primary cell and a secondary cell;
    detect beam failure on the secondary cell;
    send an indication of the beam failure for the secondary cell to the cellular base station; and
    receive an indication of a first type of reference signals included in a first list and a second type of reference signals included in a second list configuring candidate transmit beam reference signals for performing beam failure recovery on the secondary cell, wherein the first list includes only the first type of reference signals and the second list that includes only the second type of reference signals.

8. The wireless device of claim 7, wherein the wireless device is further configured to:
    receive a second list configuring candidate transmit beam reference signals for performing beam failure recovery on the secondary cell; and
    receive an indication of a second type of reference signals included in the second list configuring candidate transmit beam reference signals for performing beam failure recovery on the secondary cell, wherein the second list configuring candidate transmit beam reference signals for performing beam failure recovery on the secondary cell includes only the second type of reference signals.

9. The wireless device of claim 8, wherein the wireless device is further configured to:
    perform beam identification using the configured candidate transmit beam reference signals to identify a new transmit beam; and
    provide an indication of the new transmit beam to the cellular base station, wherein the indication of the new transmit beam includes an indication of whether the new transmit beam is associated with the first list configuring candidate transmit beam reference signals for performing beam failure recovery on the secondary cell or the second list configuring candidate transmit beam reference signals for performing beam failure recovery on the secondary cell.

10. The wireless device of claim 7,
wherein the multiple types of reference signals include at least a synchronization signal block (SSB) and a channel state information reference signal (CSI-RS).

11. The wireless device of claim 7,
wherein the wireless device is further configured to:
    perform beam identification using the configured candidate transmit beam reference signals to identify a new transmit beam; and
    provide an indication of the new transmit beam to the cellular base station, wherein the indication of the new transmit beam includes a reference signal resource indicator.

12. The wireless device of claim 11,
wherein the indication of the new transmit beam is provided to the cellular base station using a resource configured to indicate a reference signal type associated with the new transmit beam.

13. The wireless device of claim 7,
wherein the wireless device is further configured to:
    perform beam identification using the configured candidate transmit beams to identify one or more new transmit beams; and
    provide an indication of the one or more new transmit beams to the cellular base station, wherein the indication of the one or more new transmit beams is provided to the cellular base station using a resource configured to indicate a number of new transmit beams indicated.

14. The wireless device of claim 7,
wherein the wireless device is further configured to:
    perform beam identification using the configured candidate transmit beam reference signals to identify a new transmit beam; and
    provide an indication of the new transmit beam to the cellular base station wherein the indication of the new transmit beam includes a candidate beam resource indicator associated with the new transmit beam, and wherein each of a plurality of possible values of the candidate beam resource indicator are associated with each of a plurality of candidate transmit beams, and one possible value of the candidate beam resource indicator is associated with no new beam being identified.

15. A method, comprising:
    establishing a wireless link with a wireless device, wherein according to the wireless link the wireless device is configured to communicate using at least a primary cell and a secondary cell;
    receiving an indication of a beam failure on the secondary cell from a wireless device;
    configuring multiple types of reference signals as candidate transmit beams for the wireless device for performing beam failure recovery on the secondary cell in response to the indication, wherein the multiple types of reference signals are configured as candidate transmit beams using multiple lists of candidate transmit beams, including a first list that includes only a first type of reference signals and a second list that includes only a second type of reference signals; and
    receiving an indication of a new transmit beam from the wireless device, wherein the indication of the new transmit beam includes an indication of whether the new transmit beam is associated with the first list or the second list.

16. The method of claim 15, wherein the indication of the new transmit beam includes a candidate beam resource indicator associated with the new transmit beam.

17. The method of claim 15, wherein the indication of the new transmit beam includes a reference signal resource indicator and an indicator of a reference signal type associated with the new transmit beam.

18. The method of claim 15, wherein the indication of the new transmit beam includes a reference signal resource indicator, and wherein the indication of the new transmit beam is received using a resource configured to indicate a reference signal type associated with the new transmit beam.

19. The method of claim 15, wherein the method further comprises:

receiving an indication of one or more new transmit beams from the wireless device, wherein the indication of the one or more new transmit beams is received using a resource configured to indicate a number of new transmit beams indicated.

20. The method of claim 15, wherein the multiple types of reference signals include at least a synchronization signal block (SSB) and a channel state information reference signal (CSI-RS).

* * * * *